United States Patent
Leung et al.

(10) Patent No.: US 10,402,759 B2
(45) Date of Patent: Sep. 3, 2019

(54) SYSTEMS AND METHODS OF ADDING AND RECONCILING DIMENSION MEMBERS

(71) Applicant: VISIER SOLUTIONS, INC., Vancouver (CA)

(72) Inventors: Ronald Chi Man Leung, Vancouver (CA); Ju Wu, Coquitlam (CA)

(73) Assignee: Visier Solutions, Inc., Vancouver, British Columbia ( * ) Notice: Subject to any disclaimer, the term of this patent is extended or adjusted under 35 U.S.C. 154(b) by 0 days.

(21) Appl. No.: 14/809,067

(22) Filed: Jul. 24, 2015

(65) Prior Publication Data

US 2016/0217401 A1    Jul. 28, 2016

Related U.S. Application Data

(63) Continuation-in-part of application No. 14/603,120, filed on Jan. 22, 2015.

(51) Int. Cl.
  *G06Q 10/06* (2012.01)

(52) U.S. Cl.
  CPC .............. *G06Q 10/06311* (2013.01)

(58) Field of Classification Search
  CPC ......... G06Q 10/06311; G06Q 10/0631; G06Q 10/063118; G06Q 10/06316; G06Q 10/06313
  See application file for complete search history.

(56) References Cited

U.S. PATENT DOCUMENTS

| | | | | |
|---|---|---|---|---|
| 5,918,232 A | * | 6/1999 | Pouschine | G06F 16/283 |
| 6,151,604 A | * | 11/2000 | Wlaschin | G06F 16/221 |
| | | | | 707/741 |
| 6,732,079 B1 | * | 5/2004 | Kintner | G06Q 10/06311 |
| | | | | 705/7.13 |
| 6,757,867 B2 | * | 6/2004 | Bauchot | G06F 17/246 |
| | | | | 707/999.001 |

(Continued)

OTHER PUBLICATIONS

"Field Manual 1-0: Human Resources Support", Headquarters, Department of the Army, Apr. 2010.*

(Continued)

*Primary Examiner* — Tyler W Knox
(74) *Attorney, Agent, or Firm* — Toler Law Group, PC

(57) ABSTRACT

A method includes generating a workforce plan including forecasted headcount values associated with a plurality of dimension members of a plurality of dimensions and receiving input to create a first dimension member of a particular dimension of the plurality of dimensions. The particular dimension has an associated dimension level in a hierarchy corresponding to the particular dimension. The method includes storing data associated with the first dimension member to a data store associated with the workforce plan and receiving headcount values associated with a second dimension member that differs from the first dimension member. The method includes generating a graphical user interface (GUI) indicating that the first dimension member is determined to be a potential match for the second dimension member based on the first dimension member being a member of the particular dimension and having the same dimension level as the second dimension member.

20 Claims, 50 Drawing Sheets

(56) References Cited

U.S. PATENT DOCUMENTS

| | | | |
|---|---|---|---|
| 6,791,585 B1* | 9/2004 | Brecher | G06F 16/10 715/765 |
| 7,007,020 B1* | 2/2006 | Chen | G06Q 30/0201 706/6 |
| 7,752,070 B2* | 7/2010 | Hatcher | G06Q 10/063 705/7.38 |
| 7,805,382 B2* | 9/2010 | Rosen | G06Q 10/1053 705/321 |
| 7,962,358 B1* | 6/2011 | Fernandez | G06Q 10/0631 705/7.23 |
| 8,015,043 B2* | 9/2011 | Cao | G06Q 10/00 705/7.12 |
| 8,078,486 B1 | 12/2011 | McLean et al. | |
| 8,386,300 B2 | 2/2013 | April et al. | |
| 8,566,206 B2* | 10/2013 | Stolerman | G06Q 10/067 705/36 R |
| 8,595,154 B2* | 11/2013 | Breckenridge | G06N 20/00 706/12 |
| 8,744,933 B2* | 6/2014 | Shortridge | G06Q 10/06 705/32 |
| 8,849,685 B2 | 9/2014 | Oden | |
| 9,760,860 B2* | 9/2017 | Thompson | G06Q 10/063112 |
| 2002/0042786 A1* | 4/2002 | Scarborough | G06Q 10/063 706/21 |
| 2002/0062240 A1 | 5/2002 | Morinville | |
| 2002/0143599 A1* | 10/2002 | Nourbakhsh | G06Q 10/06 705/7.31 |
| 2003/0229529 A1* | 12/2003 | Mui | G06Q 10/06 705/328 |
| 2004/0138934 A1* | 7/2004 | Johnson | G06Q 10/06 705/7.36 |
| 2004/0162748 A1* | 8/2004 | Vogel | G06Q 10/06 705/7.13 |
| 2005/0049911 A1* | 3/2005 | Engelking | G06Q 10/06 705/7.37 |
| 2005/0065837 A1* | 3/2005 | Kosiba | G06Q 10/04 705/7.13 |
| 2005/0080802 A1* | 4/2005 | Cras | G06F 16/283 |
| 2005/0165930 A1* | 7/2005 | Whitman, Jr. | G06Q 10/06311 709/226 |
| 2006/0235737 A1 | 10/2006 | Fleurant et al. | |
| 2006/0235738 A1 | 10/2006 | Doyle et al. | |
| 2007/0021999 A1* | 1/2007 | Whalen | G06Q 10/06 705/7.13 |
| 2007/0033060 A1 | 2/2007 | Gopalan et al. | |
| 2007/0067204 A1* | 3/2007 | Brown | G06Q 10/06315 705/7.13 |
| 2007/0124190 A1* | 5/2007 | Chen-Ritzo | G06Q 10/063 705/7.22 |
| 2007/0250417 A1* | 10/2007 | Lane | G06Q 30/02 705/30 |
| 2007/0276717 A1* | 11/2007 | Alburey | G06Q 10/06 705/7.13 |
| 2008/0140688 A1 | 6/2008 | Clayton et al. | |
| 2008/0167929 A1* | 7/2008 | Cao | G06Q 10/06 705/7.11 |
| 2008/0167930 A1* | 7/2008 | Cao | G06Q 10/06 705/7.14 |
| 2008/0243581 A1* | 10/2008 | Jennings | G06Q 30/0203 705/7.12 |
| 2009/0019014 A1* | 1/2009 | Sugimoto | G06F 16/283 |
| 2009/0157462 A1 | 6/2009 | Morinville | |
| 2009/0157463 A1 | 6/2009 | Morinville | |
| 2009/0182598 A1* | 7/2009 | An | G06Q 10/04 705/7.14 |
| 2009/0254389 A1* | 10/2009 | Teal | G06Q 10/04 705/7.12 |
| 2009/0271240 A1* | 10/2009 | Kumar | G06Q 10/0631 705/7.12 |
| 2009/0299808 A1* | 12/2009 | Gilmour | G06Q 10/06 705/7.23 |
| 2009/0307052 A1* | 12/2009 | Mankani | G06Q 10/06 705/7.17 |
| 2010/0037161 A1* | 2/2010 | Stading | G06F 16/283 715/764 |
| 2010/0106566 A1* | 4/2010 | Al-Otaibi | G06Q 10/06 705/7.36 |
| 2010/0312605 A1 | 12/2010 | Mitchell et al. | |
| 2011/0015958 A1* | 1/2011 | April | G06Q 10/06 705/321 |
| 2011/0040697 A1* | 2/2011 | Constantinou | G06Q 10/06 705/348 |
| 2011/0202382 A1* | 8/2011 | Santos | G06Q 10/06 705/7.17 |
| 2012/0016710 A1* | 1/2012 | Santos | G06Q 10/06 705/7.22 |
| 2012/0130768 A1* | 5/2012 | Rajagopal | G06Q 10/06 705/7.25 |
| 2012/0278212 A1* | 11/2012 | Upadhyaya | G06Q 10/00 705/32 |
| 2013/0013369 A1* | 1/2013 | Deich | G06Q 10/06 705/7.25 |
| 2013/0013602 A1* | 1/2013 | Manner | G06F 17/30 707/737 |
| 2013/0080202 A1* | 3/2013 | Cameron | G06Q 10/00 705/7.16 |
| 2013/0179244 A1 | 7/2013 | Lafoon et al. | |
| 2014/0046956 A1* | 2/2014 | Zenger | G06Q 10/063 707/748 |
| 2014/0278754 A1* | 9/2014 | Cronin | G06Q 30/0201 705/7.29 |
| 2014/0330605 A1* | 11/2014 | Connolly | G06Q 10/063116 705/7.16 |
| 2014/0372161 A1* | 12/2014 | Ulrich | G06Q 10/06311 705/7.17 |
| 2015/0354201 A1* | 12/2015 | Gruetering | E04H 5/02 52/79.1 |
| 2016/0098666 A1* | 4/2016 | Hojby | G06Q 10/063112 705/7.14 |
| 2016/0132816 A1* | 5/2016 | Lush | G06Q 10/063112 705/7.14 |
| 2016/0352860 A1* | 12/2016 | Deb | G06Q 50/01 |

OTHER PUBLICATIONS

14809067 NPL Search, Google Patents, May 14, 2019.*
14809067 NPL Search, Google Scholar, May 14, 2019.*
"7 Reasons to Choose Anaplan to Replace Your Planning Spreadsheets", Anaplan, 2014, 7 pages.
"Anaplan for Workday", Anaplan, 2014, 2 pages.
"Anaplan makes workforce planning strategic at a fast-growing cloud computing company", Case Study: Cloud Computing Company, Anaplan, 2013, 5 pages.
"Keep your staffing costs tightly aligned with demand using real-time planning for headcount and capacity", Anaplan Finance, Workforce Planning, anaplan.com (2014), 2 pages.
A Supply Chain Approach to Workforce Planning | HR Performance Sites; https://hrperformancesites.wordpress.com/2009/03/09/a-supply-chain-approach-to-workforce-planning/; as retrieved on Jul. 24, 2015, 13 pages.
Workforce Planning | HRBoss; https://hrboss.com/panel/workforce-planning; as retrieved on Jul. 24, 2015, 8 pages.
"Human Resources Support", Field Manual (FM) 1-0, Headquarters, Department of the Army, Apr. 2010, Appendix C., pp. C-1 to C-5.

* cited by examiner

| Sarah Jones ▼ | *BlueCircle Enterprises* |
|---|---|
| | Create New Plan |

Search My Plans

My plans ▶

My tasks (plans assigned to me) ▶

| Name | Status | Last edited | Due date | Assigned from | Assigned to |
|---|---|---|---|---|---|
| 2015 - Products | NEW | 2014-12-01 | 2014-12-15 | John Smith | Sarah Jones |

User default settings ▶

Turnover Assumptions ▶

Submit and update

This plan was started on Dec 31, 2014. It is due on Jan 15, 2015

Submit plan

The plan data of the following scenarios will be submitted for review :

- Heavy Turnover
- Seasonal Turnover

Comments?

Fit to cost limit in both scenarios

Submit

*FIG. 36*

| Search My Plans | | | John Smith ▼ | *BlueCircle Enterprises* |
|---|---|---|---|---|
| My plans ▼ | | | | Create New Plan |

My tasks (plans assigned to me) ▼

| Name | Status | Last edited | Due date | Assigned from | Assigned to |
|---|---|---|---|---|---|
| 2015 - Products | SUBMITTED | 2014-12-04 | 2014-12-15 | John Smith | Sarah Jones |

User default settings ▼

Turnover Assumptions ◀

- Resignation rate
  - seasonal resignation rate
  - 2% Resignation
  - ss resignation rate
- Involuntary turnover rate
  - seasonal invol. turn. rate
  - 1.5% Involuntary Turnover
- Retirement rate
  - seasonal retirement rate
  - 1% Retirement

| | Dec 2013 | Jan 2014 | Feb 2014 | March 2014 |
|---|---|---|---|---|
| All | 600 | 600 | 600 | 600 |
| Products | 400 | 400 | 400 | 400 |
| Vancouver | 300 | 300 | 300 | 300 |
| Chicago | 100 | 100 | 100 | 100 |
| Sales | 200 | 200 | 200 | 200 |
| Chicago | 200 | 200 | 200 | 200 |

4402 → (table above)
4404 → Products
4406 → Vancouver

Workforce plan

| | Dec 2013 | Jan 2014 | Feb 2014 | March 2014 |
|---|---|---|---|---|
| All | 600 | 600 | 600 | 600 |
| Products | 400 | 400 | 400 | 400 |
| Vancouver | 300 | 300 | 300 | 300 |
| Chicago | 100 | 100 | 100 | 100 |
| Bangalore | | 0 | 0 | 0 |
| Sales | 200 | 200 | 200 | 200 |
| Chicago | 200 | 200 | 200 | 200 |
| Bangalore | | 0 | 0 | 0 |

4412 → (table above)
4414 → Products
4416 → Bangalore
4418 → Sales
4420 → Bangalore Workforce plan with "arbitrary" member added

Arbitrary members can have data populated based on parent row

| | Dec 2013 | Jan 2014 | Feb 2014 | March 2014 |
|---|---|---|---|---|
| All | 68k | 68k | 68k | 68k |
| Products | 75k | 75k | 75k | 75k |
| Vancouver | 50k | 50k | 50k | 50k |
| Chicago | 100k | 100k | 100k | 100k |
| Bangalore | | 75k | 75k | 75k |
| Sales | 60k | 60k | 60k | 60k |
| Chicago | 60k | 60k | 60k | 60k |
| Bangalore | | 60k | 60k | 60k |

4414 → All row
4416 → Products
4418 → Bangalore
4420 → Sales/Bangalore
4502

FIG. 49

Plan and sub-plan consolidated

| | Dec 2013 | Jan 2014 | Feb 2014 | March 2014 |
|---|---|---|---|---|
| All | 600 | 650 | 650 | 650 |
| Products | 400 | 450 | 450 | 450 |
| Vancouver | 300 | 300 | 300 | 300 |
| Chicago | 100 | 100 | 100 | 100 |
| Bangalore | | 50 | 50 | 50 |
| Sales | 200 | 200 | 200 | 200 |
| Chicago | 200 | 200 | 200 | 200 |
| Bangalore | | 0 | 0 | 0 |

4802 ↗
Sub-plan

| | Dec 2013 | Jan 2014 | Feb 2014 | March 2014 |
|---|---|---|---|---|
| All | 400 | 400 | 400 | 400 |
| Vancouver | 300 | 300 | 300 | 300 |
| Developer | 180 | 180 | 180 | 180 |
| Tester | 120 | 120 | 120 | 120 |
| Chicago | 100 | 100 | 100 | 100 |
| Developer | 100 | 100 | 100 | 100 |
| Bangalore | | 0 | 0 | 0 |

4416 ↗

4812 ↗
Sub-plan updated
by sub-planner

| | Dec 2013 | Jan 2014 | Feb 2014 | March 2014 |
|---|---|---|---|---|
| All | 400 | 450 | 450 | 450 |
| Vancouver | 300 | 300 | 300 | 300 |
| Developer | 180 | 180 | 180 | 180 |
| Tester | 120 | 120 | 120 | 120 |
| Chicago | 100 | 100 | 100 | 100 |
| Developer | 100 | 100 | 100 | 100 |
| Bangalore | | 50 | 50 | 50 |
| New India Ops | | 50 | 50 | 50 |

5202 →
"Arbitrary" Member reconciled with received member

| | Dec 2013 | Jan 2014 | Feb 2014 | March 2014 |
|---|---|---|---|---|
| All | 600 | 668 | 650 | 650 |
| Products | 400 | 448 | 450 | 450 |
| Vancouver | 300 | 300 | 300 | 300 |
| Chicago | 100 | 100 | 100 | 100 |
| Kochi | 0 | 48 | 50 | 50 |
| Sales | 200 | 220 | 200 | 200 |
| Chicago | 200 | 200 | 200 | 200 |
| Kochi | 0 | 20 | 0 | 0 |

FIG. 53

5302 →
"Arbitrary" member of sub-plan reconciled with incoming member

| | Dec 2013 | Jan 2014 | Feb 2014 | March 2014 |
|---|---|---|---|---|
| All | 400 | 448 | 450 | 450 |
| Vancouver | 300 | 300 | 300 | 300 |
| Developer | 180 | 180 | 180 | 180 |
| Tester | 120 | 120 | 120 | 120 |
| Chicago | 100 | 100 | 100 | 100 |
| Developer | 100 | 100 | 100 | 100 |
| Kochi | 0 | 48 | 50 | 50 |
| Operations | 0 | 48 | 50 | 50 |

SYSTEMS AND METHODS OF ADDING AND RECONCILING DIMENSION MEMBERS

CROSS-REFERENCE TO RELATED APPLICATIONS

The present application is a continuation-in-part (CIP) of and claims priority from U.S. patent application Ser. No. 14/603,120 filed Jan. 22, 2015, the contents of which is incorporated by reference herein in its entirety.

BACKGROUND

Use of computing devices and software is enabling advanced analytics in areas where manual or spreadsheet-based computation were traditionally used. One example of an area that is seeing increasing computer-based analysis is workforce management/human resources (HR). To illustrate, an enterprise may maintain large databases to store data related to employee hiring, retention, resignation, etc. However, the data in the databases is historical data, which may not be applicable to future economic conditions. It may thus be difficult for an enterprise to predict, model, and plan for workforce changes and contingencies that can occur in the future. Spreadsheets may also be cumbersome and error-prone, thereby limiting planning frequency, increasing the number of people involved in the planning process (e.g., the number of people that need to have access to the spreadsheet), and diminishing the quality of planning results. Moreover, maintaining consistent labels for data in the spreadsheet may be difficult or cumbersome. Consistency may be even harder to enforce when certain aspects of a plan are delegated to different sub-planners who each may maintain a different spreadsheet that needs to be consolidated with the "main" spreadsheet at a later date. Further, when the spreadsheets are updated (e.g., when one or more rows of data values are added to the spreadsheets), it may be difficult to relabel all of the rows across all of the spreadsheets based on the received data. For example, a row of incoming data may have a first label, but a destination row in the spreadsheet for the incoming data may have a second label (and may additionally have different labels in other spreadsheets), making data reconciliation difficult.

SUMMARY

Systems and methods of workforce planning are disclosed. A workforce planning application may enable an enterprise to model and predict characteristics of its workforce based on user-defined assumptions and scenarios. To illustrate, one or more computing devices executing the workforce planning application described herein may be used to create, experiment with, and publish workforce plans regarding projected workforce changes that may occur in the future. The workforce planning application may enable addition of new "arbitrary" (e.g., new planned for members for which no actual data exists) members to dimensions of data to a workforce plan. For example, a planner may desire to forecast headcounts for a new office location that has not yet been opened. In this example, the city where the new office will be located is considered a new "arbitrary" dimension member of a location dimension of the workforce plan. The workforce planning application may propagate the new dimension members to sub-plans of the workforce plan. The workforce planning application may further enable consolidation into the workforce plan of new dimension members added to sub-plans. The workforce planning application may further enable reconciliation (e.g., matching) of the new dimension members with dimension members for which historical data is received from an analytics engine. For example, if the original workforce plan had an arbitrary member "Bangalore" but the company ended up opening an office in "Kochi" instead, then the workforce planning application may enable data for the Kochi location to be added to the workforce plan in place of the forecasted headcounts for the Bangalore location.

BRIEF DESCRIPTION OF THE DRAWINGS

FIGS. 2-28 illustrate screenshots of exemplary embodiments of operation at a workforce planning application in accordance with the present disclosure;

Figure 31:
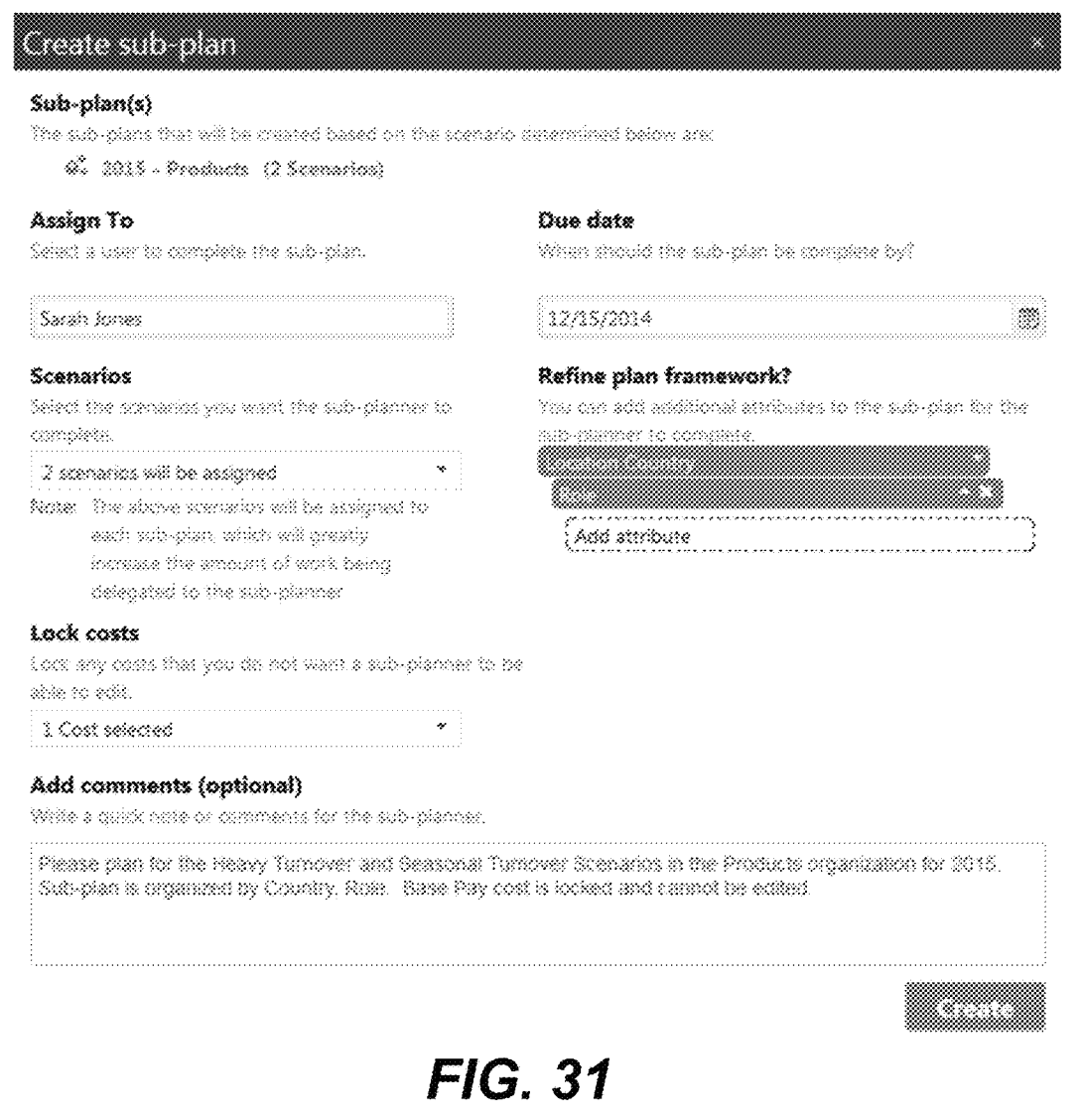

FIGS. 31-39 illustrate screenshots of exemplary embodiments of collaborative workforce planning;

FIG. 44 illustrates graphical user interfaces (GUIs) that may be displayed in conjunction with operation of a workforce planning application;

FIG. 45 illustrates another GUI that may be displayed in conjunction with operation of a workforce planning application;

FIG. 48 illustrates additional examples of GUIs that may be displayed in conjunction with operation of a workforce planning application;

FIG. 49 illustrates another example of a GUI that may be displayed in conjunction with operation of a workforce planning application;

FIG. 52 illustrates another example of a GUI that may be displayed in conjunction with operation of a workforce planning application; and FIG. 53 illustrates another example of a GUI that may be displayed in conjunction with operation of a workforce planning application.

DETAILED DESCRIPTION

Figure 1:
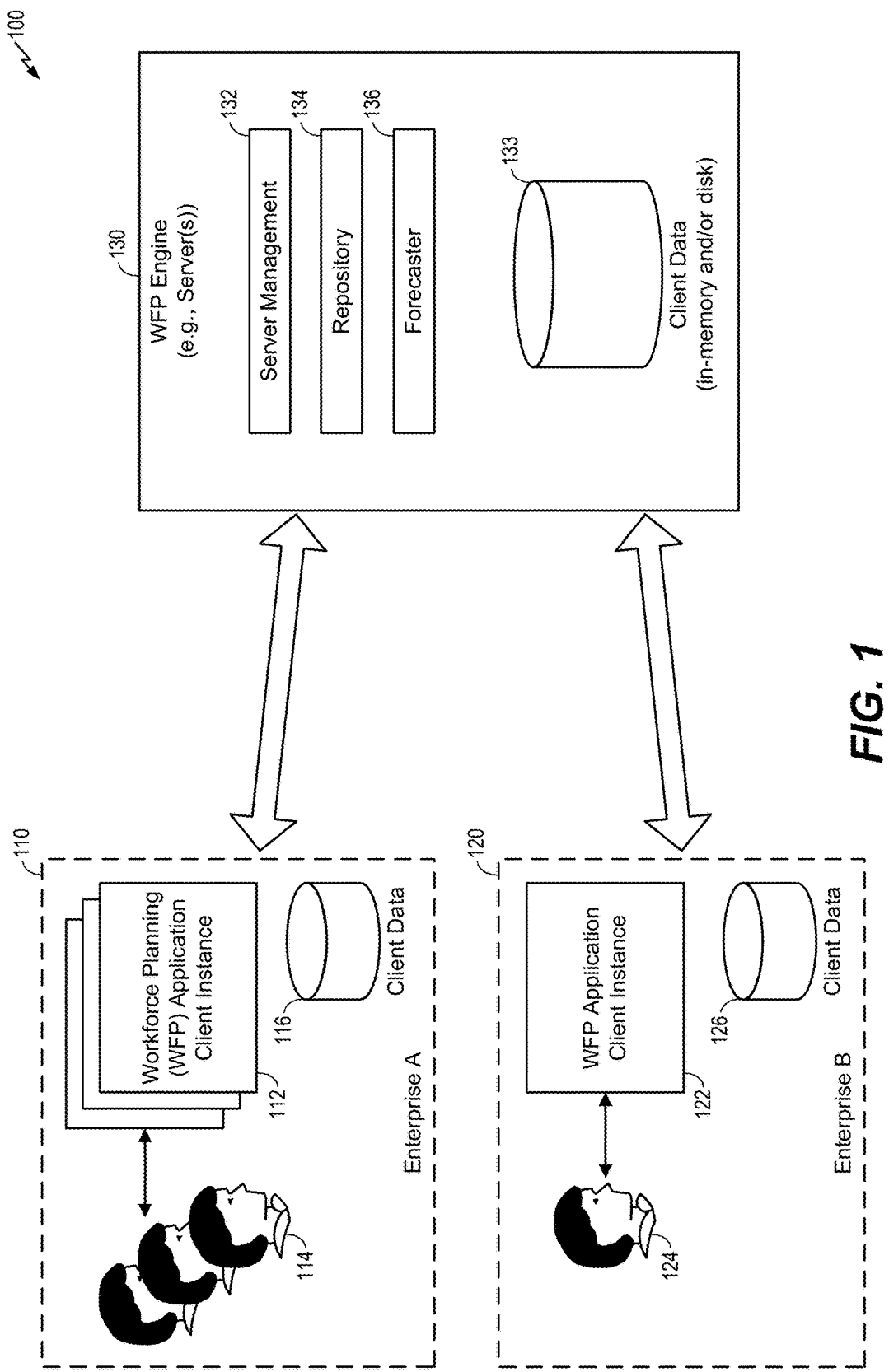
FIG. 1 illustrates a particular embodiment of a system that is operable to perform workforce planning.

Referring to FIG. 1, a particular embodiment of a system 100 that is operable to perform workforce planning (WFP) is shown. The system 100 includes a client-server platform that enables users at various business enterprises to execute a workforce planning web application. In the example of FIG. 1, two enterprises are shown: Enterprise A 110 and Enterprise B 120, although in alternative embodiments more enterprises may be supported. The client portion of the platform is illustrated in FIG. 1 by client instances 112, 122. The server portion of the platform is illustrated in FIG. 1 by a WFP engine 130.

In a particular embodiment, each of the client instances 112 may be a "thin" client application, such as an Internet-accessible web application, that presents graphical user interfaces (GUIs) based on communication with the WFP engine 130. Each of the enterprises 110, 120 may be a corporation, a partnership, a government department, an education institution, or other entity. The enterprise 110 is associated with one or more users 114 (e.g., employees) that have the ability to access the one or more client instances 112. Each of the users 114 may log in to a website or web application corresponding to a client instance 112 using a browser of a computing device, such as a desktop computer, a laptop computer, a mobile phone, a tablet computer, etc. The process of logging in identifies the user and the rights he or she may have with respect to the data that is being accessed. Similarly, a user 124 at the enterprise 120 may access the log in to a website or web application corresponding to the client instance 122. The enterprises 110, 120 may acquire access to the WFP platform via a purchase, a license, a subscription, or by another method.

Each enterprise 110, 120 may provide the WFP platform (e.g., the client instances 112, 122 and/or the WFP engine 130) access to their respective client data 116, 126. The client data 116, 126 may include historical data regarding headcount, cost, and turnover at the respective enterprises 110, 120, as illustrative non-limiting examples. In a particular embodiment, the enterprises 110, 120 upload their respective client data 116, 126 to the WFP engine 130. The uploaded data may be "cleaned" (e.g., via data integrity checks and error-correction operations), transformed, and loaded into an in-memory database at the WFP engine 130 as client data 133. As further described herein, the WFP engine 130 may use the client data 133 to generate plans regarding future employee turnover. For example, the client data 133 may include actual historical workforce data (e.g., past employee turnover) that the WFP engine 130 may use to generate a plan (e.g., an "initial" plan) regarding future employee turnover. Further, the WFP engine 130 may compare actual workforce data (e.g., actual employee turnover) to projected workforce data (e.g., predicted employee turnover based on the initial plan) during a lifecycle of the plan (e.g., to determine whether to generate a "revised" plan).

In a particular embodiment, the system 100 of FIG. 1 operates on multidimensional data. A "dimension" may refer to a semantic object or concept that represents a way of associating data with "dimension members," where the dimension members correspond to continuous or discrete points on an axis. Dimensions may be hierarchical, and there may be multiple levels for a dimension. For example, a "Location" dimension may have the members "Canada," "UK," and "US," the "US" dimension member may have members "Texas," and "California," the "Texas" dimension member may have members "Austin," "Houston," and "Dallas," etc.

In a particular embodiment, the WFP engine 130 may be configured to receive queries (e.g., processing requests) from the client instances 112, 122, execute the queries, and provide results of executing the queries to the client instances 112, 122. The queries may correspond to various WFP operations, as further described herein. In a particular embodiment, the WFP engine 130 includes a server management module 132 that is configured to manage a server environment and to provide interfaces to handle requests. For example, the server management module 132 may communicate with the client instances 112, 122. In a particular embodiment, the communication is performed via scripts, servlets, application programming interfaces (APIs) (e.g., a representational state transfer (REST) API), etc. The server management module 132 may also expose services and/or data to the client instances 112. For example, exposed services and data may include query output, session and user account management services, server administration services, etc.

The WFP engine 130 may also include a repository 134. In a particular embodiment, the repository 134 stores and/or includes software corresponding to controllers that interact with requests from client instances, services that interact with data storage, and data models used to perform WFP operations. The WFP engine 130 may further include a forecaster 136. The forecaster 136 may be configured to service requests based on models stored in the repository 134. Additional architectural details regarding the WFP platform of FIG. 1 are described with reference to FIG. 36.

Figure 5:
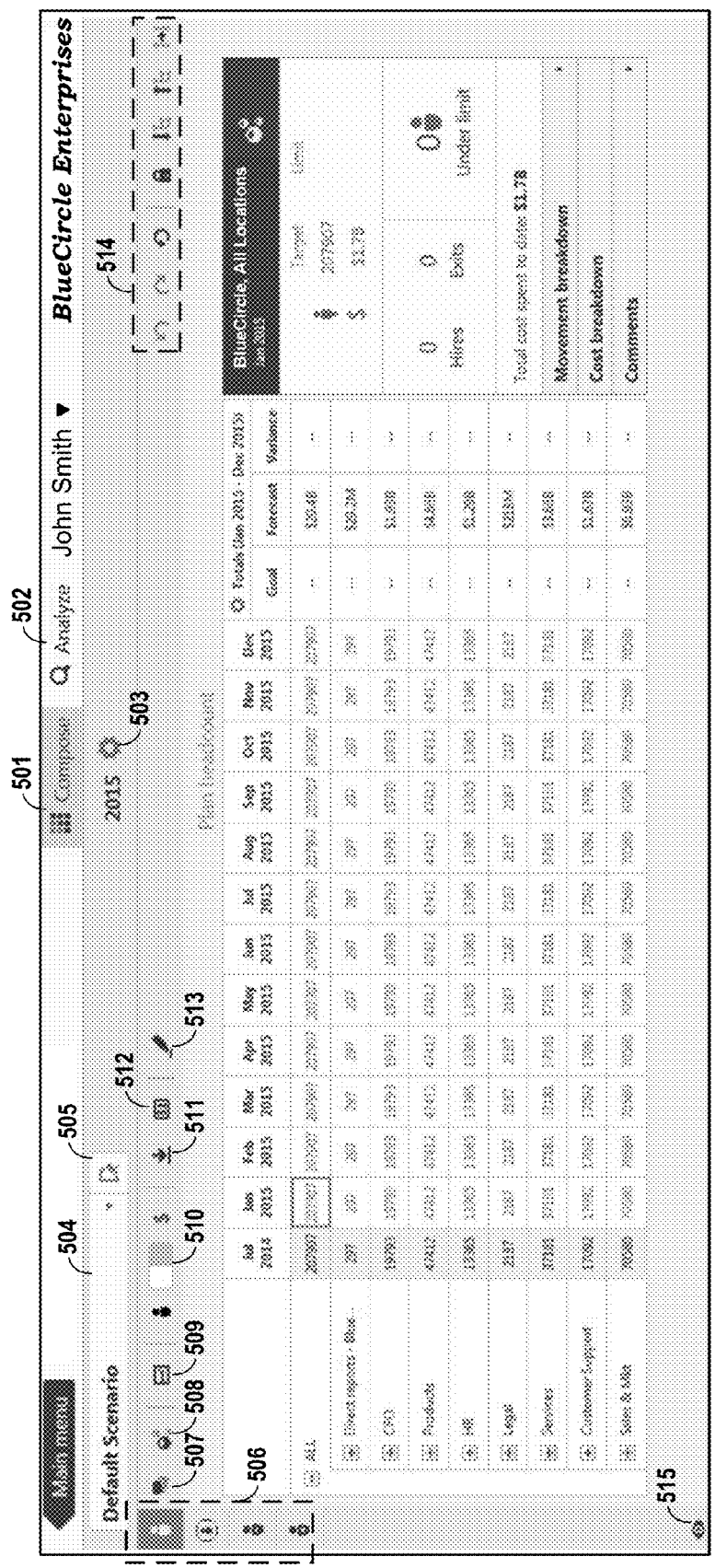

During operation, a user 114 may log in to a particular client instance 112, and the client instance 112 may display a graphical user interface (GUI) that is operable to generate a plan, generate forecasting queries for execution by the WFP engine 130, collaborate with other users on a plan, and create "what if" scenarios regarding events in the future that may impact employee turnover, as illustrative non-limiting examples. As used herein, a "plan" may include an object or entity representing a projection of a workforce headcount by dimension and time. In some examples, the plan may be viewed as a hierarchical grid, as shown in FIG. 5. During operation, the client instance 112 and the WFP engine 130 may communicate via a network, such as a local area network (LAN), a wide area network (WAN), the Internet, etc. The client instance 112 may use data received from the WFP engine 130 to generate/populate visualization(s), such as a grid or a chart.

Figure 2:
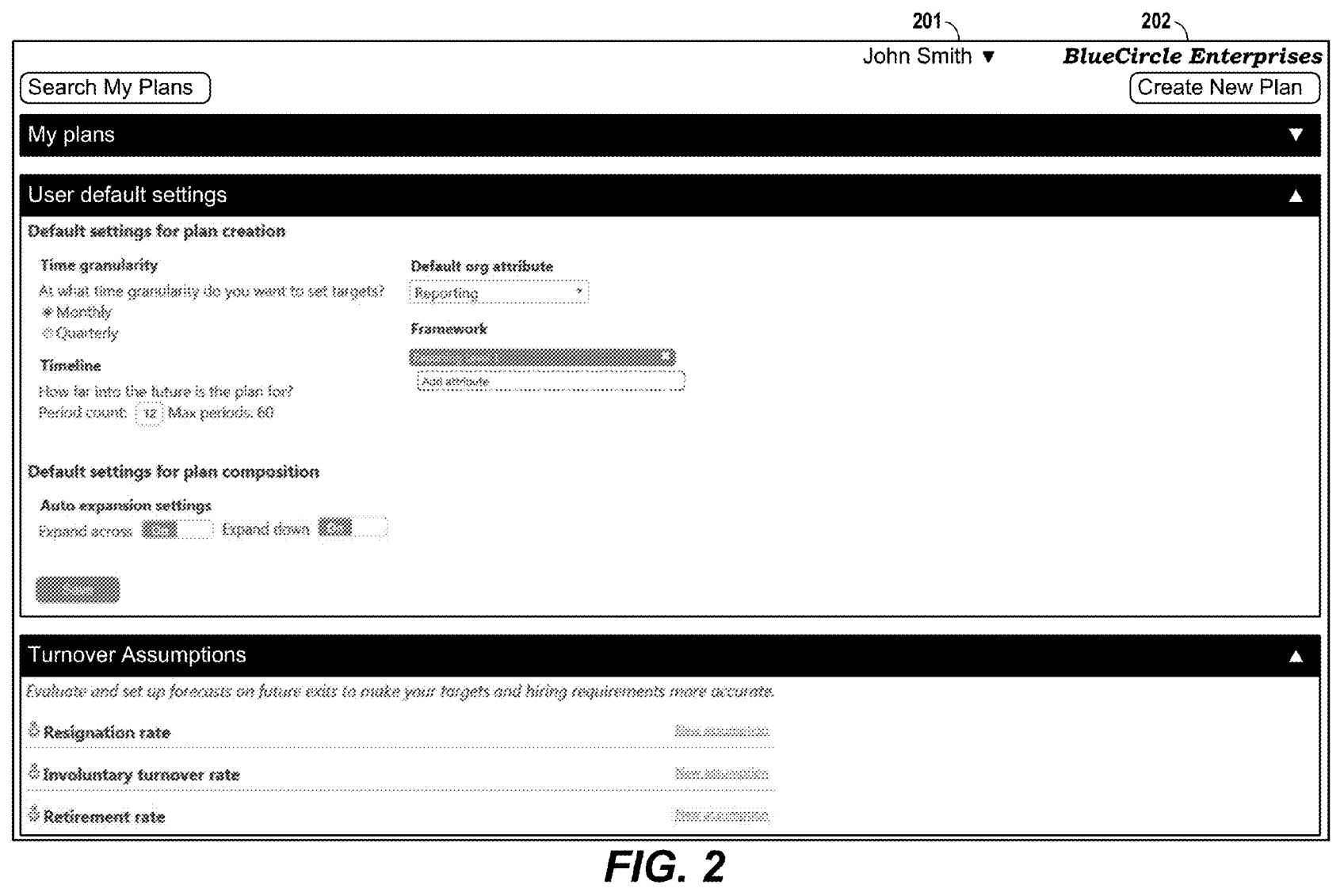

Illustrative examples of WFP applications supported by the present disclosure are described below in conjunction with exemplary screenshots. In an illustrative embodiment, such screenshots may be generated at a WFP client instance, such as the client instance 112 or 122 of FIG. 1, based on GUI data received from a server, such as the WFP engine 130 of FIG. 1. FIG. 2 illustrates an example of a graphical user interface (GUI) displayed after a user has logged in (e.g., via username and password) to a WFP client instance. In the example of FIG. 2, the user is John Smith (as indicated at 201), who is an employee of the company BlueCircle Enterprises (as indicated at 202). The GUI of FIG. 2 includes a "user default settings" section and a "turnover assumptions" section. The user default settings section may be used to define certain default settings that are used when a new plan is created. For example, default settings for time granularity (e.g., monthly or quarterly), a timeline (e.g., periods into the future covered by the plan), a plan expansion, organizational attribute(s) (e.g., reporting organization, cost centers, profit centers, etc.), and a plan framework (e.g., a hierarchy including various dimensions, such as reporting organization/cost center/profit center level, location, employment type, managers, previous experience, role, tenure, etc.) may be defined.

The plan framework for a plan may be represented by two axes: a dimensional hierarchy axis and a time axis. In the examples described herein, such as the screenshot of FIG. 5, the dimensional hierarchy axis is the vertical axis of a planning grid and the time axis is the horizontal axis of the grid. In the plan framework, the dimensions, the order of the dimensions, and the level depth of the dimensions may determine which dimension members are available for planning. For example, in a plan with the dimensional hierarchy "Reporting: Level 1, Location: Country," the organization is divided based on level one members reporting organization dimension (e.g., Products, Legal, Services, etc.), and then further divided based on country (e.g., Canada, UK, US, etc.).

In the example of FIG. 2, the turnover assumptions include a resignation rate assumption, an involuntary turnover rate assumption, and a retirement rate assumption. Moreover, as shown in FIG. 2, such assumptions can be defined independently of a specific plan and may therefore by reused in different plans. The GUI of FIG. 2 also includes elements operable to search existing plans (in the example of FIG. 2, no plans are available for the user John Smith) and to create a new plan.

Figure 3:
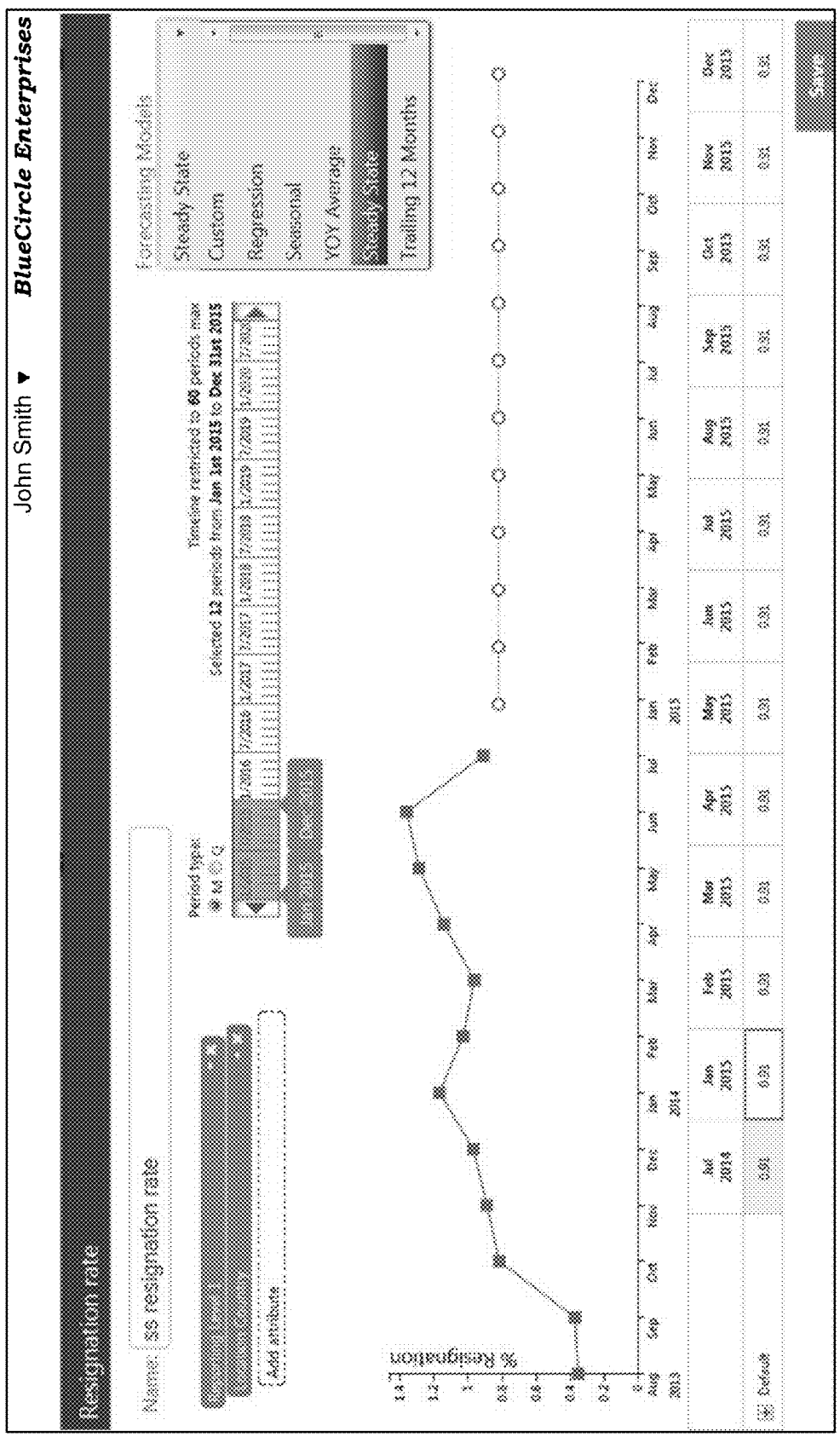

FIG. 3 illustrates an example of a GUI operable to create/edit an assumption. In the embodiment of FIG. 3, the user is creating a resignation rate assumption using a steady state forecasting model, and has named the assumption "ss resignation rate." The user has chosen level 1 reporting organization and country as the dimensional framework for the assumption. As shown in the chart of FIG. 3 via solid line, historical data for resignation rate at BlueCircle Enterprises is available from August 2013 to July 2014, and the steady state forecasting model projects the most recent resignation rate value (0.91%, from July 2014) forward for the duration of the plan. Other available forecasting models include trailing 12 months, year-on-year (YOY) average, seasonal, regression, and custom. The trailing 12 months model may use a fixed or sliding window average of values from up to the previous 12 months of historical data. The YOY average model may use an average of corresponding values of the N previous years, where N>=1. The seasonal model may use values from corresponding seasonal time periods of up to the previous 12 months of historical data. The regression model may use a best fit curve from up to the previous 12 months of historical data.

Figure 4:
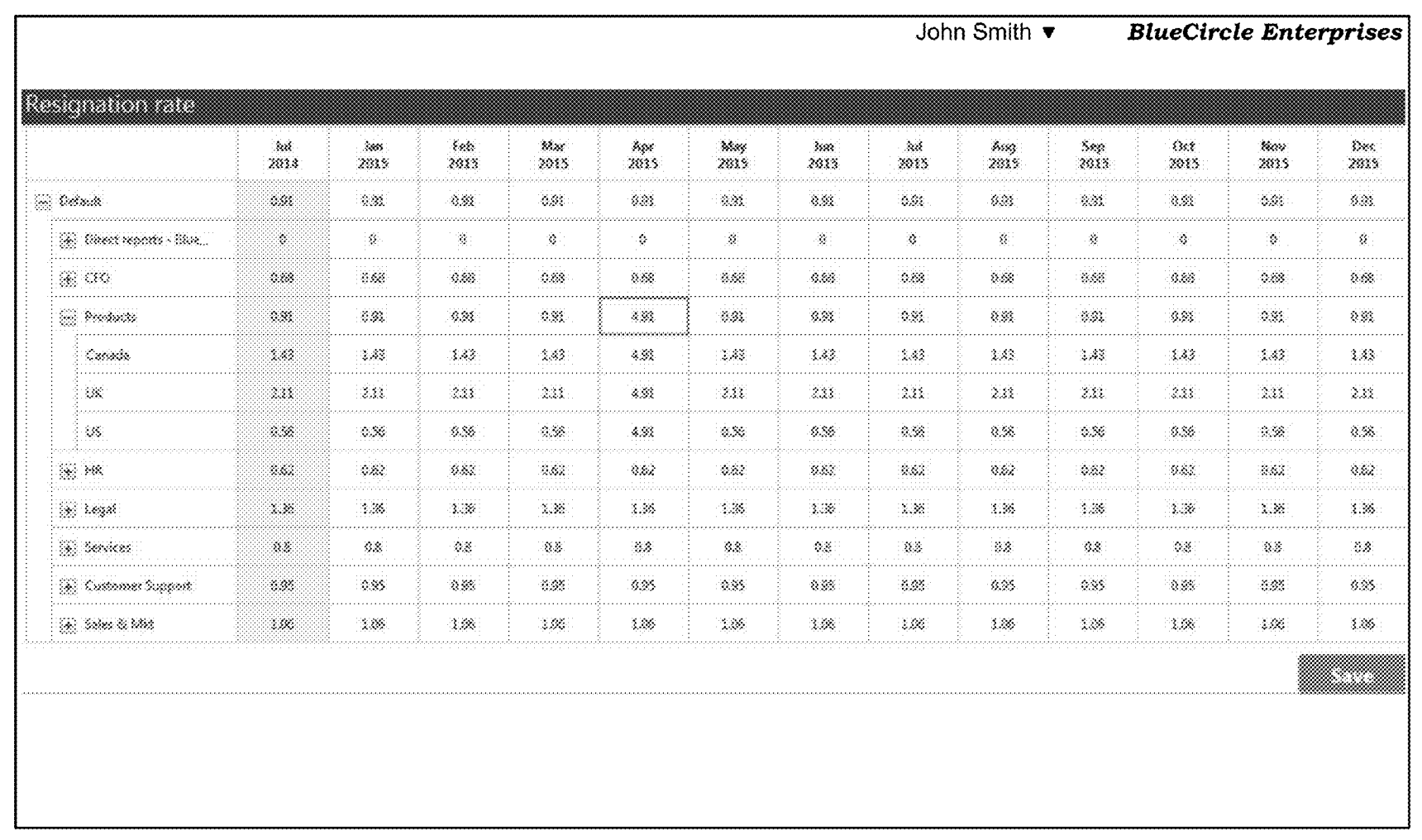

The custom forecasting model may be used by the user to manually input forecasted values. For example, as shown in FIG. 4, the user may manually enter forecasted resignation rates into the grid at the bottom of the GUI. In the embodiment of FIG. 4, the user has changed the April 2015 resignation rate in the Products organization from 0.91% to 4.91%. In response, the Canada, UK, and US resignation rates for the Products organization in April 2015 are automatically changed to 4.91% (i.e., the change has been distributed down the dimensional hierarchy).

When a user instructs the WFP application to create a new plan, the user may provide input regarding a name for the plan, a context (e.g., top-level data universe) for the plan, select a time span for the plan, define a plan framework (dimensional hierarchy), and select any specific cost models that should be applied to the plan. FIG. 5 illustrates an example of planning GUI corresponding to a plan named "2015" having a context of "BlueCircle—All Locations," a time span of January 2015 to December 2015, and a plan framework of level 1 reporting organization followed by country.

The GUI of FIG. 5 displays forecasted headcount values in a grid. It is to be noted that the forecasted headcount values in FIG. 5 are the same in each column because turnover assumptions have not yet been associated with the plan (i.e., no hiring or firings are being forecasted yet). The GUI includes a compose tab 501 (which is selected) and an analyze tab 502, which is further described with reference to FIG. 21. The GUI further includes a settings button 503 that can be used to edit the plan name, framework, time span, cost models, etc. A scenario drop-down menu 504 and a scenario edit button 505 may be used to toggle between and edit different scenarios of the plan, as further described herein. When a new plan is created, a scenario called "Default Scenario" may be created, as shown in FIG. 5.

Figure 6:
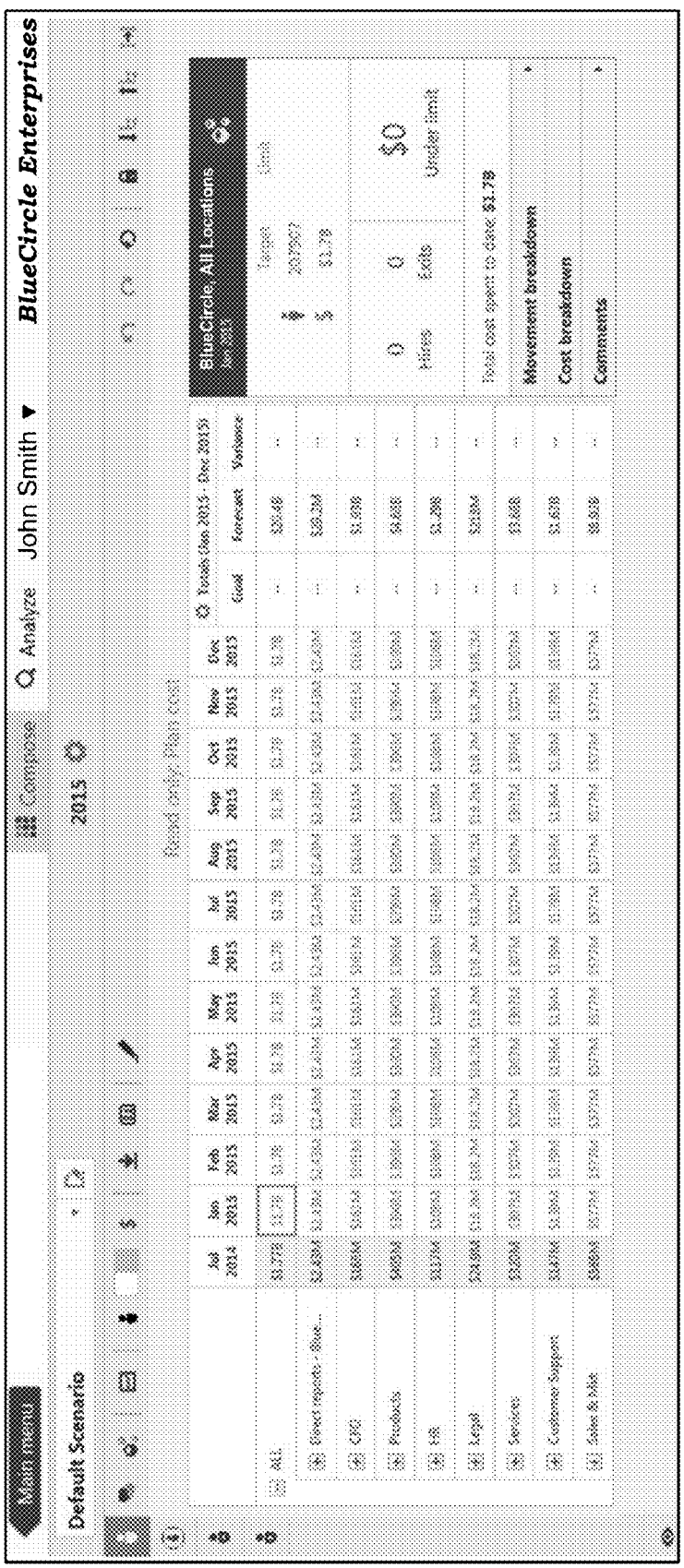

A set of buttons 506 may be used to switch between different plan views, including viewing/entering headcounts, viewing plan historical data, viewing turnover, and viewing plan vs. actual hires. The GUI further includes a collaboration feed button 507 that is operable to view a timeline of collaboration events associated with the plan and a create sub-plan button 508 that is operable to create a sub-plan from the plan, where the sub-plan can be assigned to another user for collaborative editing. Collaborative planning is further illustrated with reference to FIGS. 26-35. A show line chart button 509 may be operable to view values from one or more cells of the grid as a line chart, and a selector 510 may be used to switch between viewing plan headcount (as shown in FIG. 5) and viewing plan cost (as shown in FIG. 6). Each cell of the grid corresponds to a headcount value that is addressed by a row position (e.g., set of dimensions) and a column position (e.g., time period).

An export button 511 may be used to export plan data to a spreadsheet, a comma-separated values (CSV) file, etc. An export employee(s) button 512 may be used to export a list of employees for an active cell context. For example, because the January 2015 cell for "ALL" is active in FIG. 5, selecting the export employee(s) button 512 may export a list of all projected BlueCircle employees in January 2015. The GUI may also include a highlight button 513, the operation of which is further described with reference to FIG. 25. A set of buttons 514 may be used to perform various editing functions, such as undo, redo, reset data, lock, expand down a column, roll up a column, and expand across a row.

In a particular embodiment, historical data in the grid is visually distinguished from forecasted data. For example, as shown in FIG. 5, cells in the July 2014 column, which corresponds to historical data, have a different background color/pattern/shading than cells in the January 2015 to December 2015 columns, which correspond to forecasted data. When the plan is created, based on the (e.g., user-defined or default) time granularity and dimensional hierarchy of the plan, the WFP application of the present disclosure may retrieve a "snapshot" or the relevant headcount, turnover, and cost data from a database or other storage device. The data for each row of the grid may be projected forwards to pre-populate a default scenario with headcount values. In a particular embodiment, plan rows that do not have non-zero historical headcount values are not projected forwards into the plan time periods. It will be appreciated that by using historical data, the WFP application may start with up-to-date organizational structures, headcounts, and costs (i.e., an accurate picture of present and past workforce). Rather than requiring manual input of starting data, such as in a spreadsheet, the WFP application of the present disclosure uses historical truths as a starting point for assumptions and to drive the forecasting. Within a plan, different scenarios may use the same assumption(s) or different assumptions. An assumptions used in a scenario of a first plan may also be reused in a scenario of a second plan (e.g., provided that the time span of the first plan is equal to or a superset of the time span of the second plan).

Figure 8:
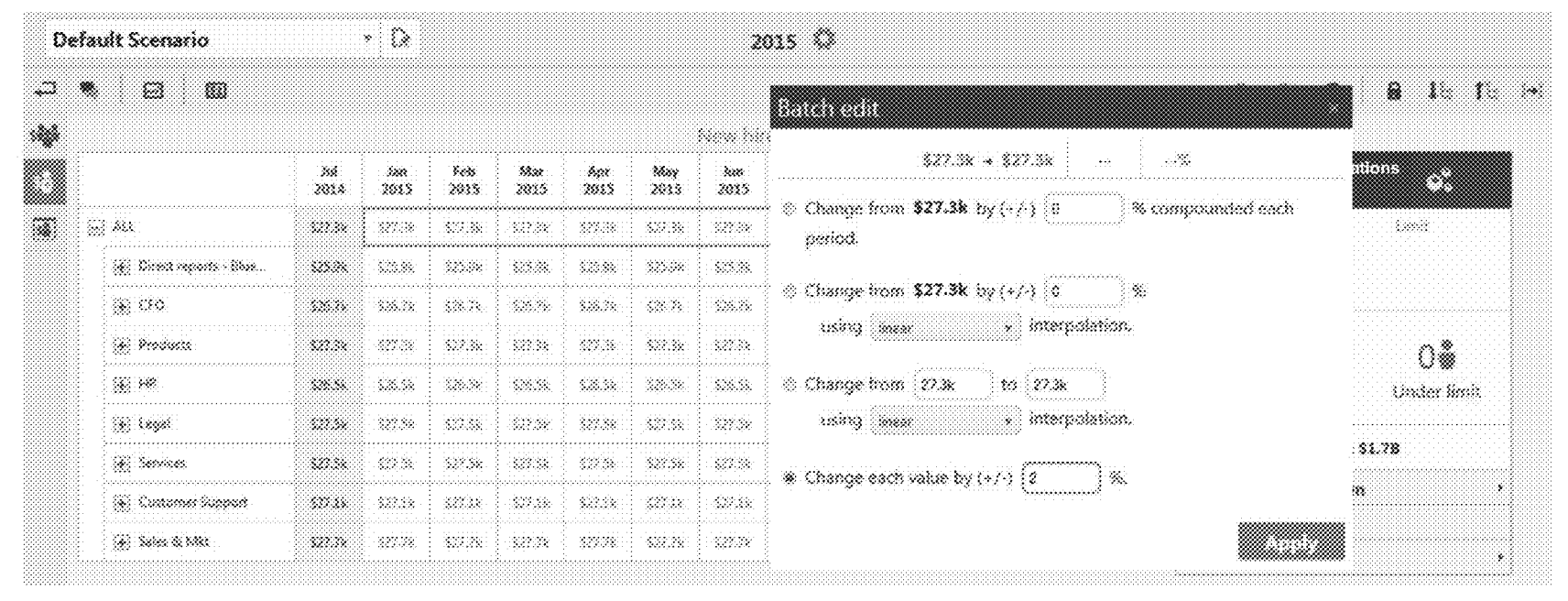
Figure 9:
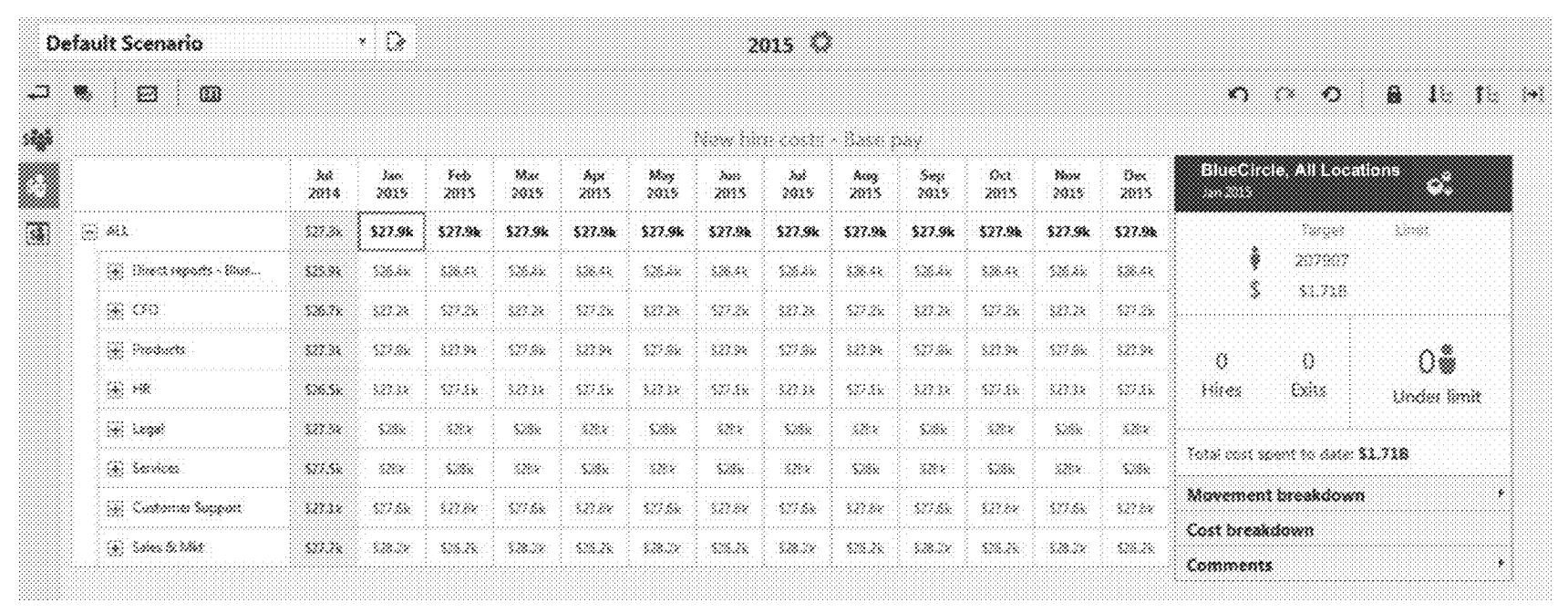
Figure 10:
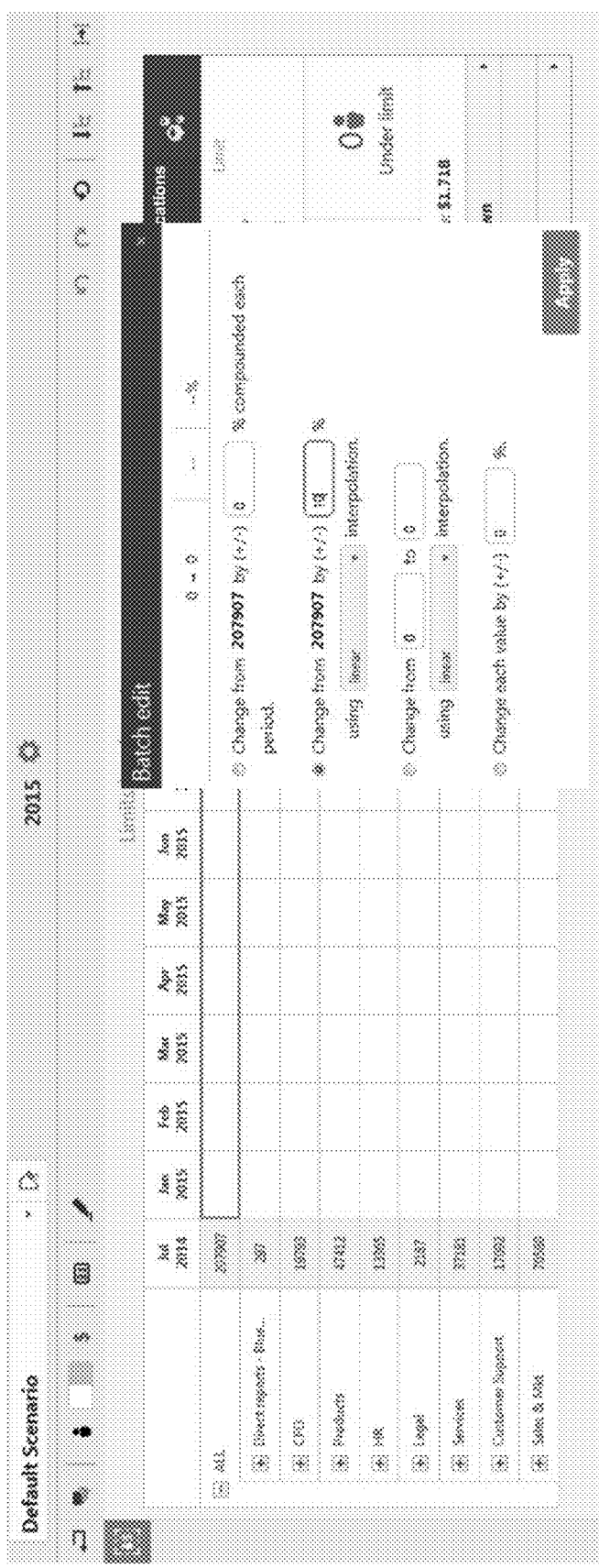
Figure 11:
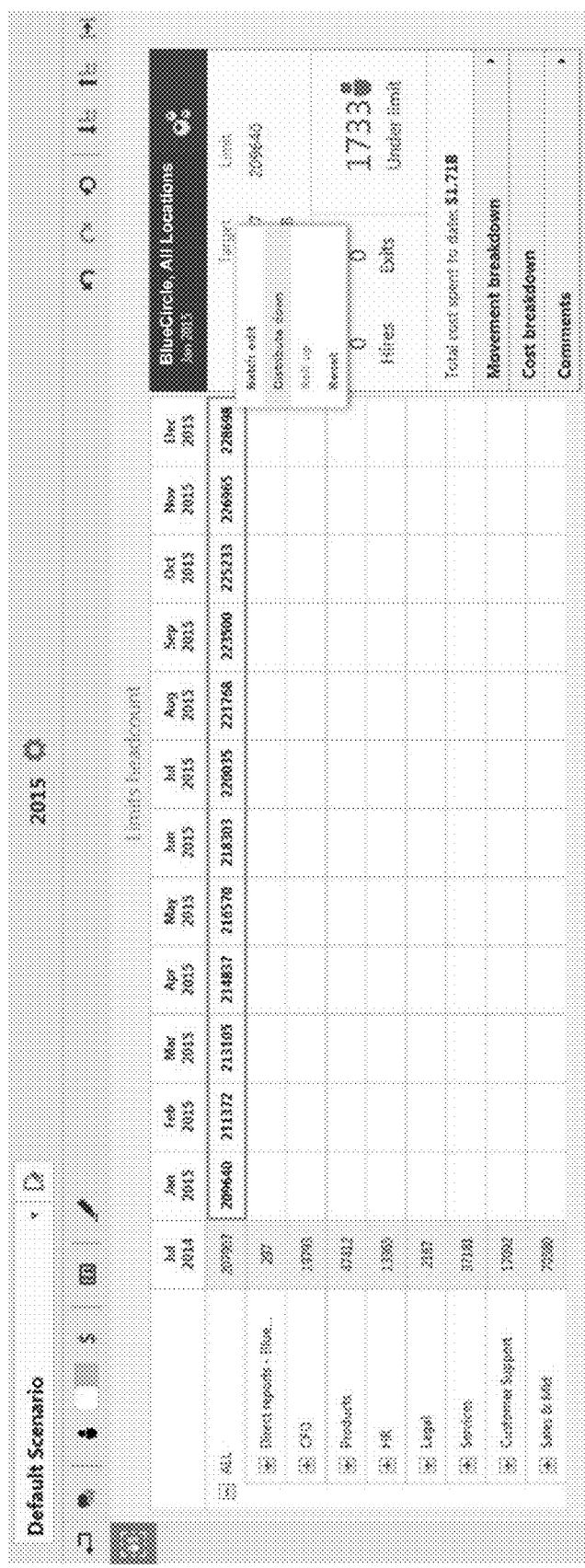
Figure 12:
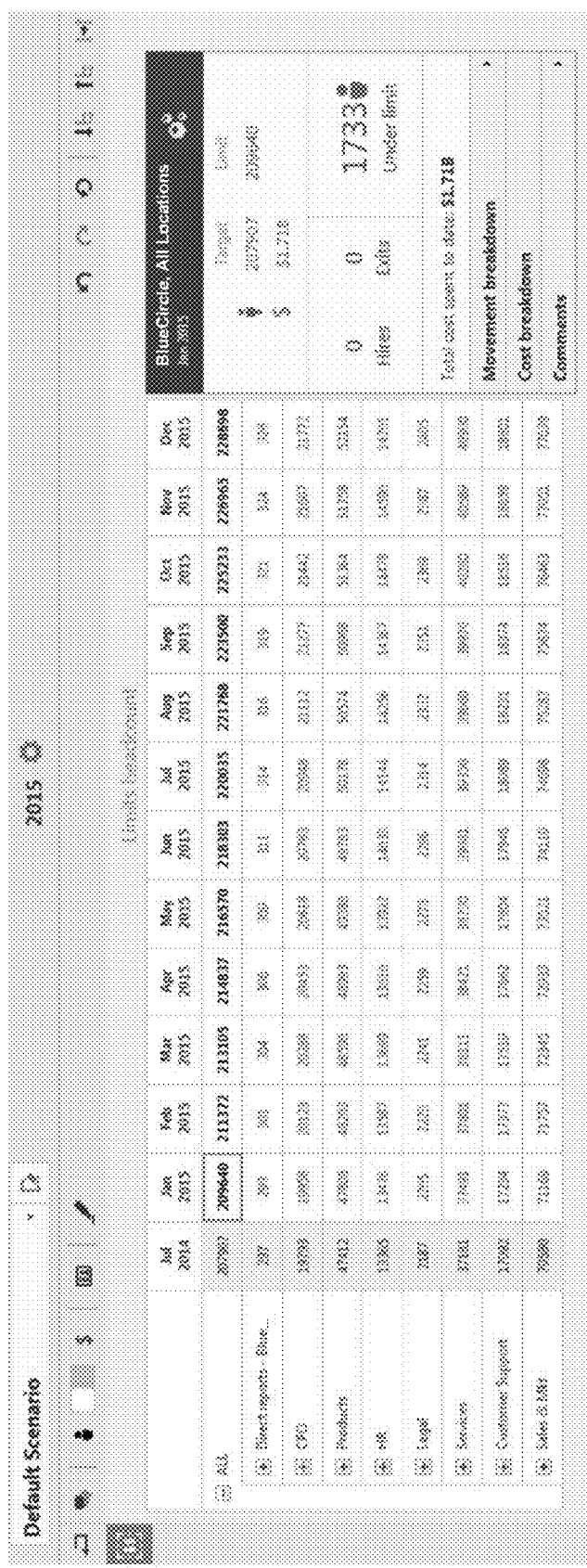
Figure 13:
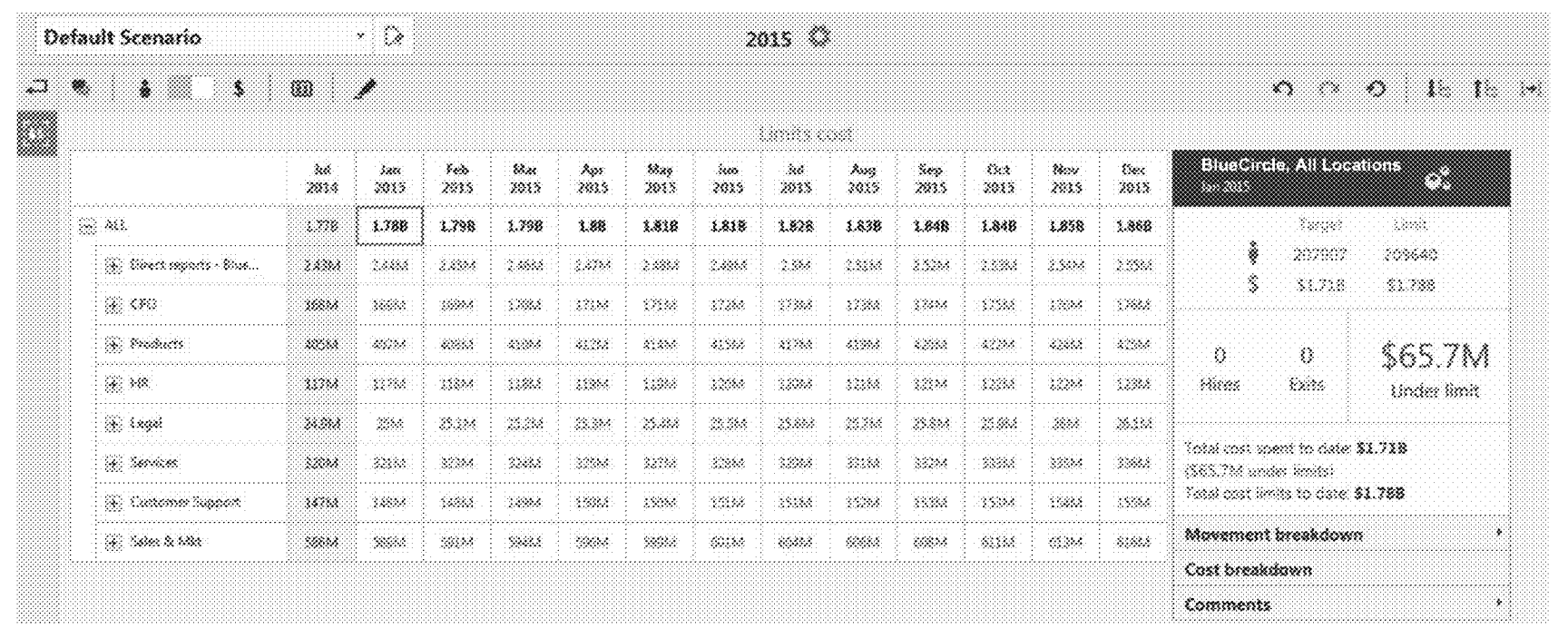

The GUI may also include a button 515 that is operable to define cost assumptions and plan limits, so that financial concepts can be connected with workforce requirements. Examples of cost assumptions may include existing workforce costs (e.g., base pay, bonus, contingent workforce, employment insurance and taxes, health benefits, long term incentive, pay for time not worked, supplemental pay, and workforce allocations), new hire costs (e.g., base pay, bonus, contingent workforce, employment insurance and taxes, health benefits, long term incentive, pay for time not worked, supplemental pay, and workforce allocations), and hiring event costs (e.g., agency cost, referral cost, and relocation cost). As an example, FIGS. 7-9 illustrate increasing new hire base pay by 2%. The 2% increase in base pay is distributed across all levels of the plan (e.g., "ALL," "Direct Reports," "Products," etc.). As additional examples, FIGS. 10-12 illustrate setting and distributing down a 10% limit on headcount growth, and FIG. 13 illustrates the result of setting and distributing down a 5% limit on cost. Limits may enable the user to define values in the planning grid that a scenario should meet in order to be considered viable. Limits may include, but are not limited to, headcount and headcount cost limits, as shown in FIGS. 10-13.

Figure 14:
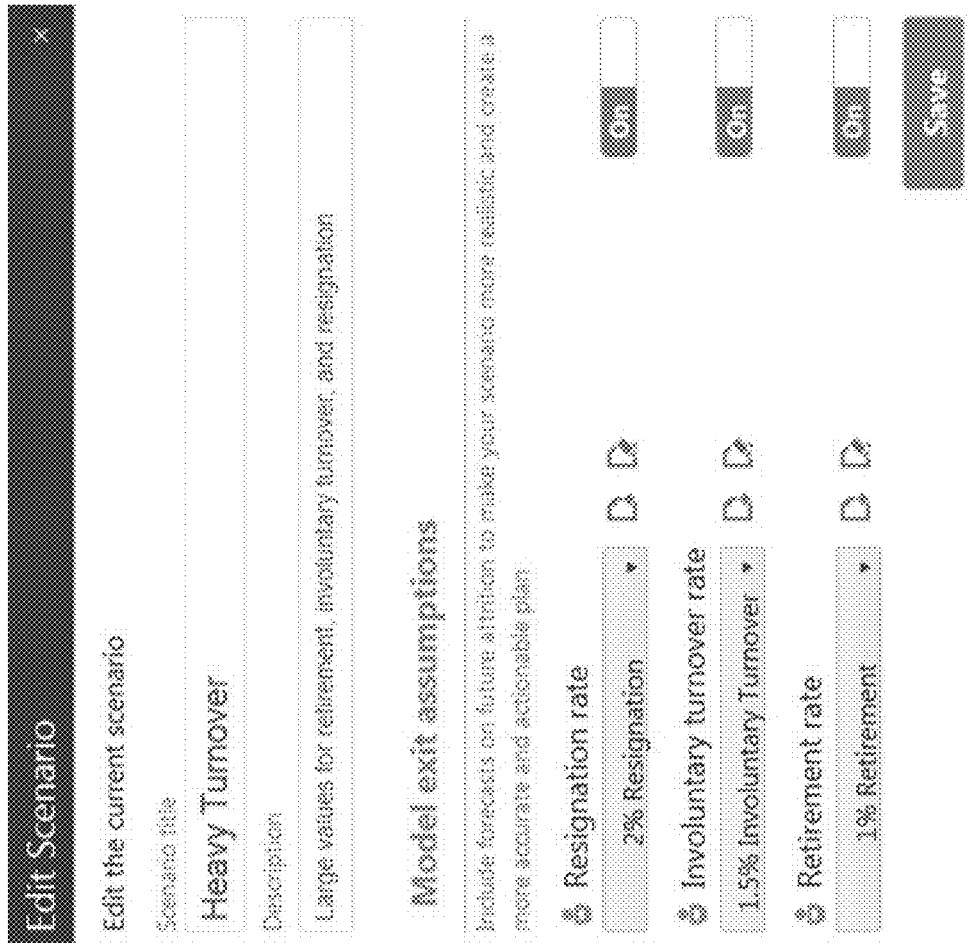

As described above, the WFP planning application described herein may enable the user to define assumptions regarding costs and turnover on a per-scenario basis. In FIG. 14 the default scenario is renamed "Heavy Turnover," and assumes a steady 2% resignation rate, 1.5% involuntary turnover rate, and 1% retirement rate (which may be defined by a user using GUIs similar to the GUIs FIGS. 4-5).

In some embodiments, a turnover assumption may be defined using a different dimension hierarchy than a scenario, even though the time granularity of the assumption matches the scenario and the time span of the assumption includes the time span of the scenario. In such a case, a best fit approach may be applied to each row of a scenario to find the assumption row with the most matching members to the scenario row. Due to the hierarchical nature of plans, assumptions may be calculated at leaf levels of plans and assumption values may be aggregated up from the leaf levels. Turnover assumptions may be a de-annualized percentage value, and turnover values may be calculated using the formula: [(Cell target headcount*Cell turnover rate)+Carry from previous period]. When a non-integer value of headcount is computed, the carry is the remaining decimal value representing partial turnover, which rolls over to the next period in the row. The first time period of the plan may be provided a random (or zero) carry value to begin calculations.

Cost assumptions may be annualized currency values. Existing population cost may be calculated using the formula: [Previous period cost+(Previous period cost*cost percent change for existing headcount)]. Hiring cost may be calculated using the formula: [New hire per headcount cost*new hire count]. Turnover cost may be calculated using the formula: [Existing population per headcount cost*turnover count].

Figure 15:
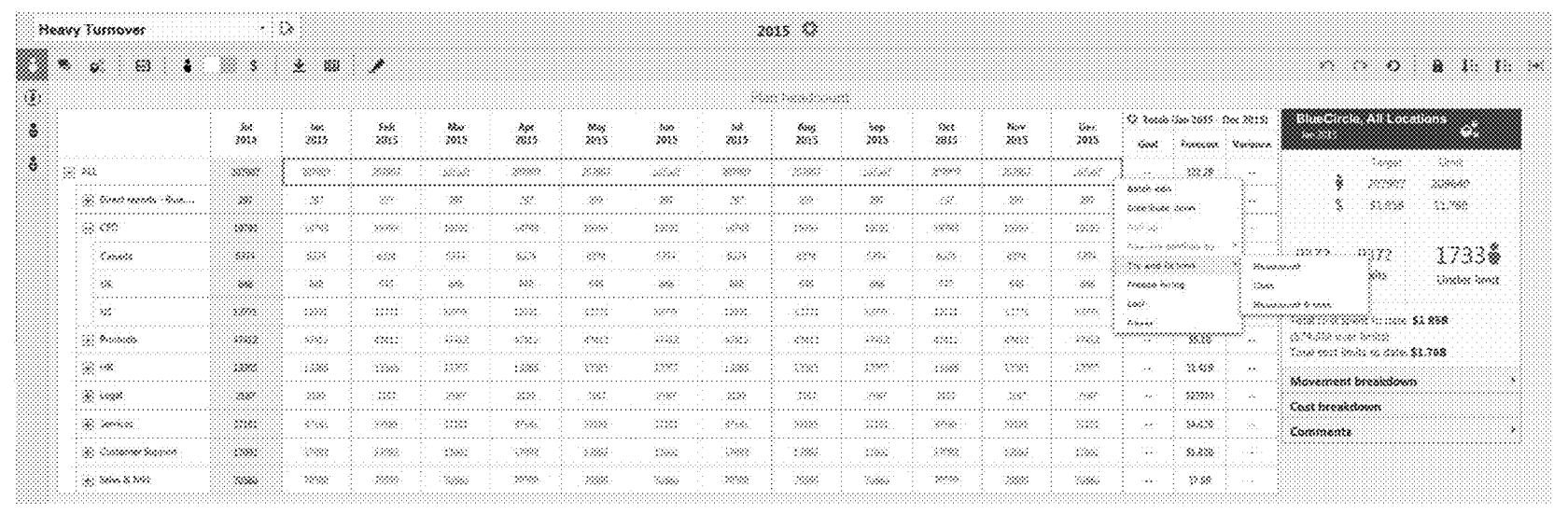

In a particular embodiment, when limits are entered into the plan, three additional pieces of functionality may be enabled in the WFP application: fitting to limit(s), highlighting, and freezing hiring. For cells that have limits, fitting to limit(s) cause the WFP application to adjust the headcount value of each selected cell such that a headcount limit and/or a cost limit for the cell is adhered to as closely as possible. As shown in the example of FIG. 15, fitting to limit may include fitting to headcount, fitting to cost, and fitting to headcount and cost. To fit to headcount, the WFP application may determine adjusted headcount values such that an increase in headcount by one will cause the cell to be over the limit. In a particular embodiment, fitting is constrained to selected cell(s), and limits for child cells may be ignored.

Fitting to cost for a cell may be a two-step algorithm. In the first step, the WFP application may determine an upper bound for the cell, i.e., the headcount value for which the cell will be over the cost limit. To determine the upper bound for the cell, the WFP application may double the headcount value of the cell, distribute the additional headcount to "leaf" cells (the lowest hierarchical level(s) of the plan for the dimensions of the selected cell), and aggregate results up until the cost limit is exceeded. To illustrate, a particular cell may have a cost limit of $5 million and a headcount value of 1,000 corresponding to a $2 million dollar cost. The WFP application may double the headcount to 2,000, resulting in a cost of $4 million. Because $4 million is under the cost limit of $5 million, the WFP application may double the headcount again, to 4,000, resulting in a cost of $8 million. Because $8 million is greater than the cost limit of $4 million, the upper bound for the cell is found to be 4,000.

In the second step of the algorithm, a binary search of headcount values is performed using the upper bound and the same distribution down/aggregation up pattern. As described further herein, the distribution down pattern may correspond to a "distribute to children option" (e.g., when the cost fitting feature increases and decreases headcount, the distribution down pattern is distributing headcount to children). The binary search may be completed when a value at or just under the cost limit is found. To illustrate, continuing the previous example, the WFP application may divide the upper bound of 4,000 in half, resulting in a headcount of 2,000 and $4 million cost, which is less than the $5 million limit. The WFP application may then test the midpoint of 2,000 and 4,000, i.e., a headcount of 3,000. When the headcount is 3,000, the cost is $6 million, which is above the cost limit. The WFP application may then test a headcount of 2,500, which is the midpoint of 2,000 and 3,000. When the headcount is 2,500, the cost is $5 million, which is equal to the cost limit. Thus, in this example, the binary search may terminate with a headcount of 2,500, which is the largest possible headcount value without exceeding the cost limit. The two-step algorithm may thus represent an interactive target-driven process to reverse calculate values for different cells of the plan in view of defined limits and cost/turnover assumptions.

Figure 16:
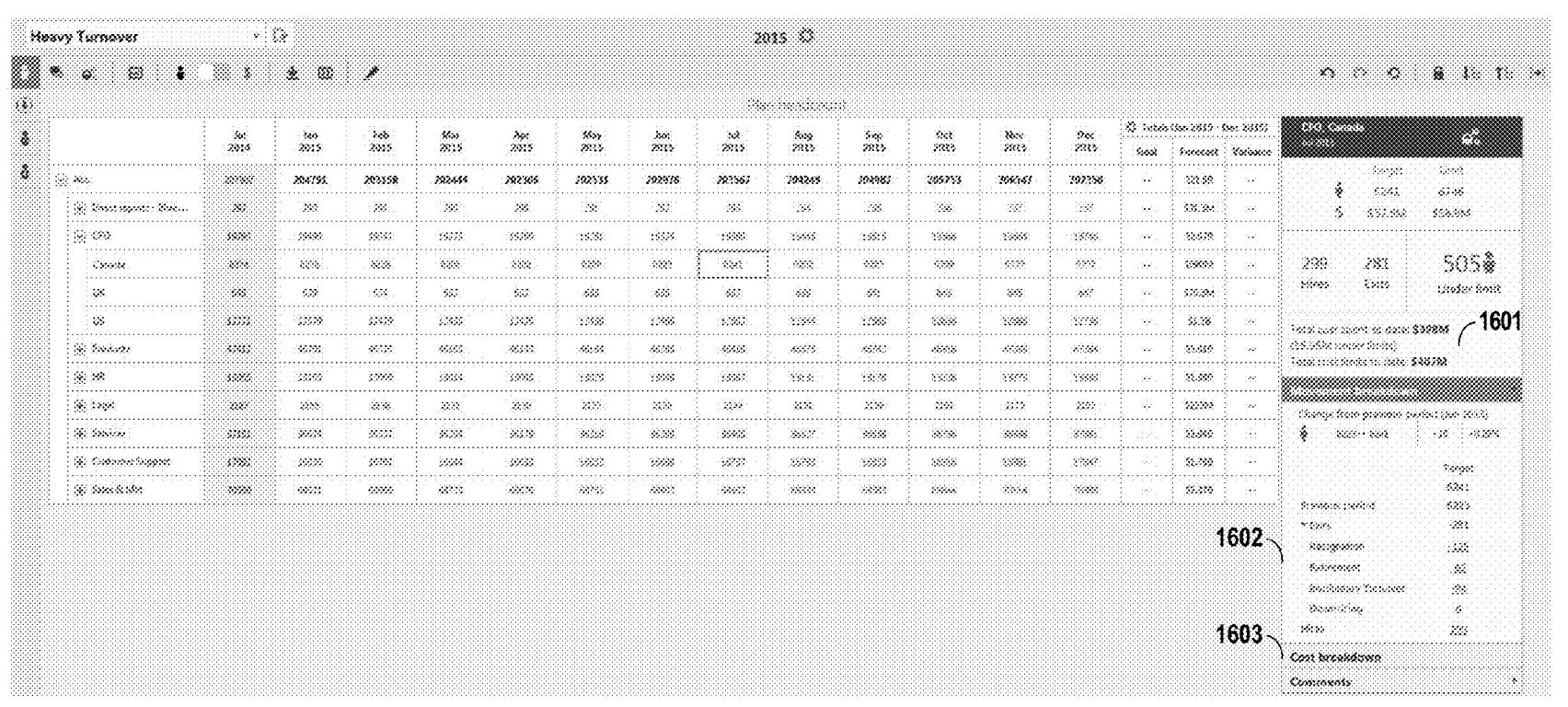
Figure 17:
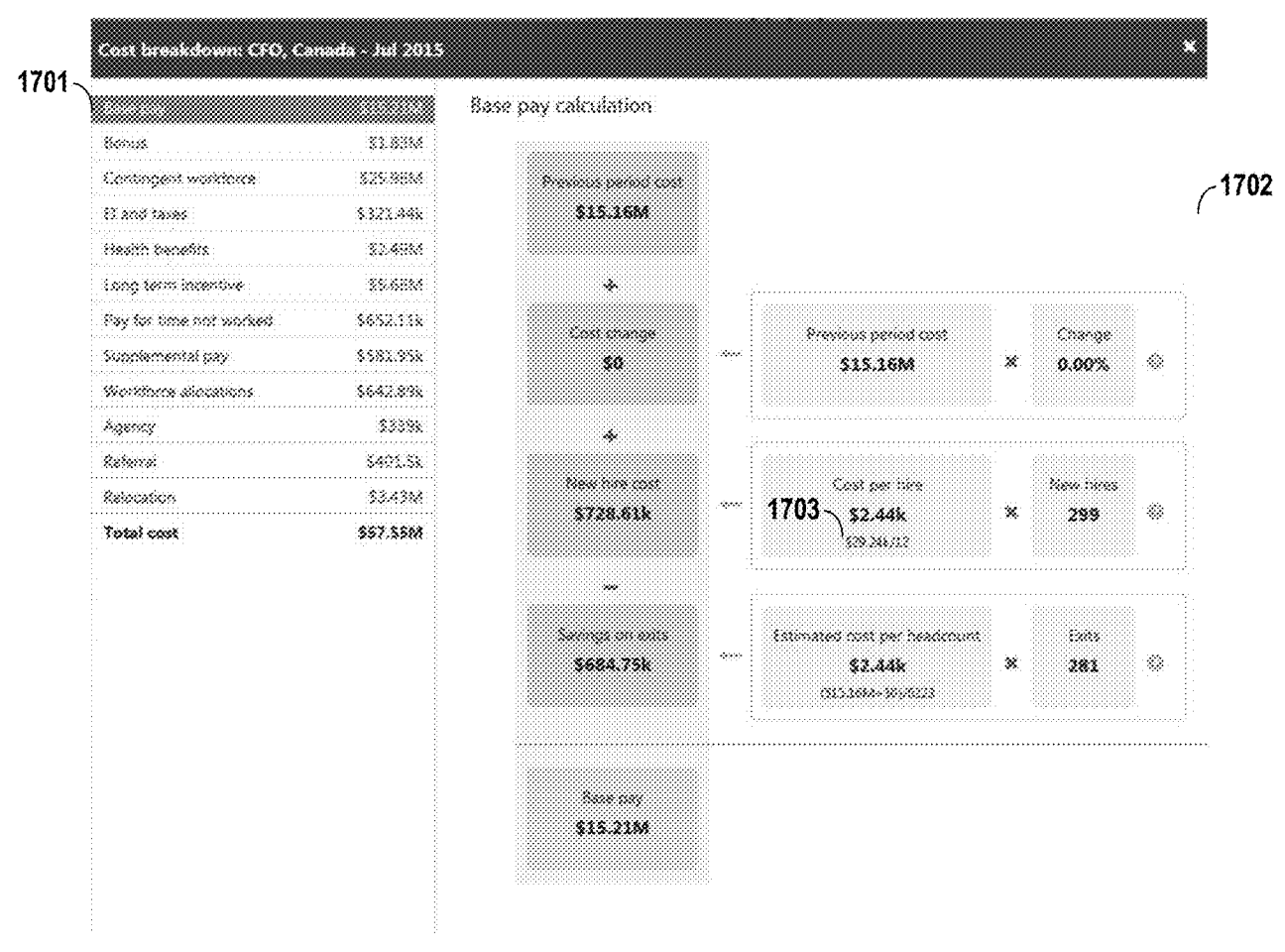

FIG. 16 depicts the "Heavy Turnover" scenario after the above fitting to cost algorithm is applied. As shown at 1601, the CFO organization in Canada for July 2015 (which corresponds to the selected cell in the grid) is $8.95 million dollars under the cost limit for that cell. Further, as shown at 1602, the WFP application provides a movement breakdown for the selected cell, including projected resignations, retirements, involuntary turnovers, downsizing, and hires. Selection of a cost breakdown GUI element 1603 may display an itemized explanation of projected costs for the given cell, as shown in FIG. 17. In FIG. 17, a GUI element 1701 for base pay is selected, resulting in display of the base pay calculation used by the WFP application, at 1702. Notably, the $29.24 k cost shown at 1703 is a result of the 2% base pay increase assumption that the user previously defined in accordance with FIGS. 7-9. By selecting the GUI elements for "bonus," "contingent workforce," etc., the user may view calculation breakdowns for other cost factors.

Figure 18:
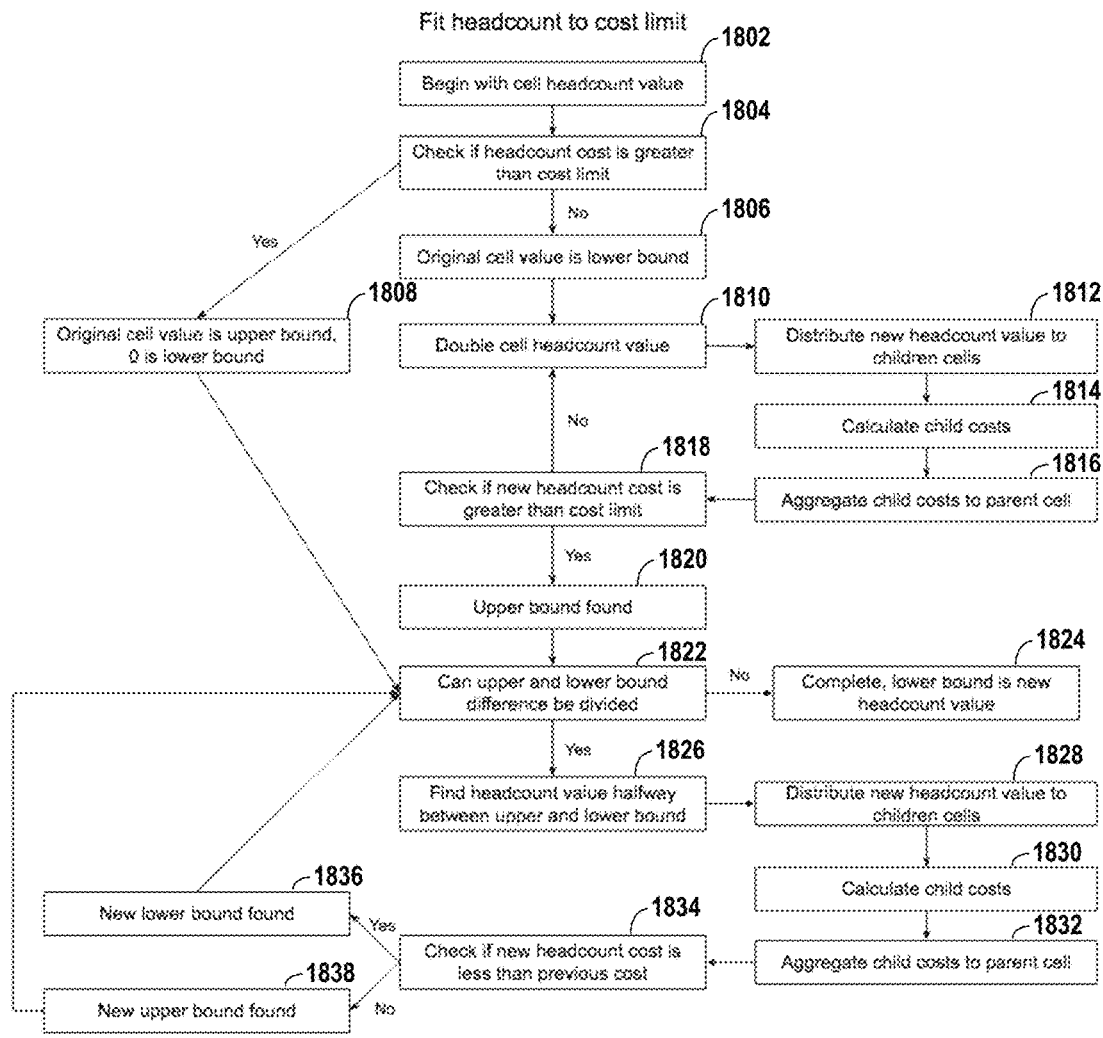

FIG. 18 depicts one illustrative example of a method of fitting headcount to cost limit scenario. In FIG. 18, the method begins with a cell headcount value, at 1802. At 1804, the method includes determining if a headcount cost is greater than a cost limit, at 1804. FIG. 18 illustrates that, in the event that headcount cost is not greater than the cost limit, an original cell value is used as a lower bound, as shown at 1806. In the event that the headcount cost is greater than the cost limit, the original cell value is used as an upper bound, with zero being used as a lower bound (as shown at 1808). When the original cell value is the lower bound (as shown at 1806), the method includes increasing (e.g., doubling) the cell headcount value, as shown at 1810. The method may continue to 1812, where the new headcount value is distributed to child/children cells, the child costs are calculated (as shown at 1814), and the child costs are aggregated to the parent cell (as shown at 1816). The method may proceed to determine whether the new headcount cost is greater than the cost limit, at 1818. In the event that the new headcount cost is not greater than the cost limit, the method may return to 1810 (where the cell headcount value may be increased (e.g., doubled) again. In the event that the new headcount value is greater than the cost limit, FIG. 18 illustrates that the upper bound is found, at 1820.

FIG. 18 further illustrates that the method may include determining whether an upper and lower bound distance can be divided, at 1822. As shown in FIG. 18, the determination (as shown at 1822) may be made after assigning the original cell value as the upper bound and zero as the lower bound (as shown at 1808) or after the upper bound is found (as shown at 1820). In the event that the upper and lower bound difference cannot be divided, the method may end (as shown at 1824), with the lower bound representing the new headcount value. In the event that the upper and lower bound difference can be divided (at 1822), the method may include determining a headcount value between the upper and lower bound (e.g., halfway between the upper and lower bound), at 1826. The method may further include distributing the new headcount value to children cells (at 1828), calculating child costs (at 1830), and aggregating child costs to the parent cell (at 1832). The method may proceed to determine whether the new headcount cost is less than the previous cost, as shown at 1834. FIG. 18 illustrates that if the new headcount cost is less than the previous cost, a new lower bound is found (as shown at 1836, which includes returning to 1822), and if the new headcount cost is not less than the previous cost, a new upper bound is found (as shown at 1838, which includes returning to 1822).

Figure 19:
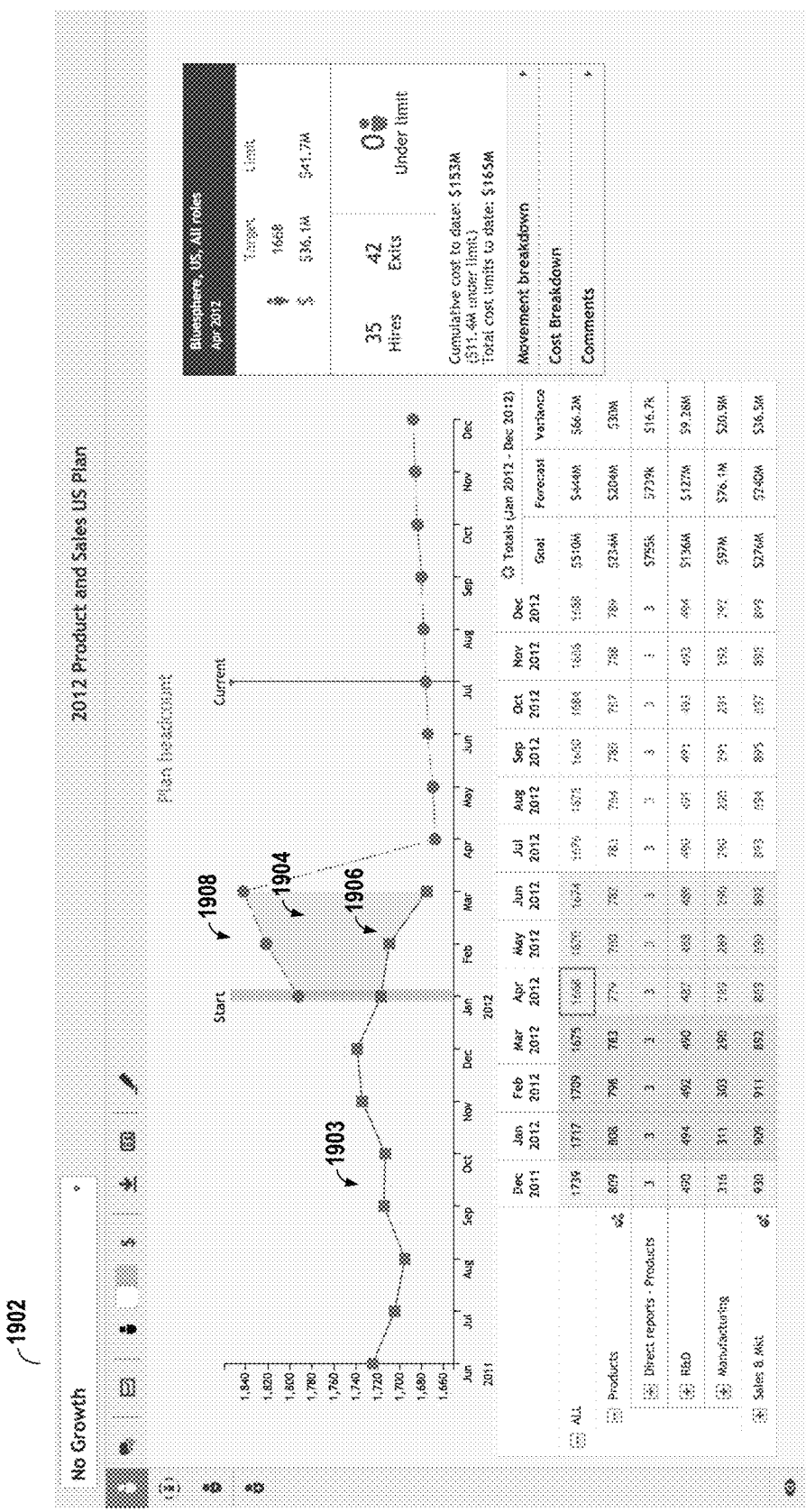

FIG. 19 illustrates an example of a comparison of target value(s) and actual value(s) as time progresses. To illustrate, FIG. 19 shows a planning scenario 1902 (e.g., a "No Growth" scenario) for headcount. FIG. 19 further illustrates historical headcount data 1903 (e.g., headcount data from June 2011 to December 2011) prior to a start (e.g., January 2012) of the planning scenario 1902. FIG. 19 illustrates that a user may compare target headcount values to actual headcount values. As described further herein with respect to FIG. 21, the user may create a new planning scenario (or adjust the first planning scenario 1902) to account for deviations between target/actual values after the start of the planning scenario 1902.

In FIG. 19, a shaded area 1904 illustrates a deviation between target headcount values 1906 and actual headcount values 1908 (e.g., from January 2012 to March 2012, corresponding to a first three months of the planning scenario 1902). The target headcount values 1906 may be determined based on actual historical headcount data (e.g., the historical headcount data 1903 for the six month time period prior to January 2012) for use as base data for forecasting purposes.

Figure 20:
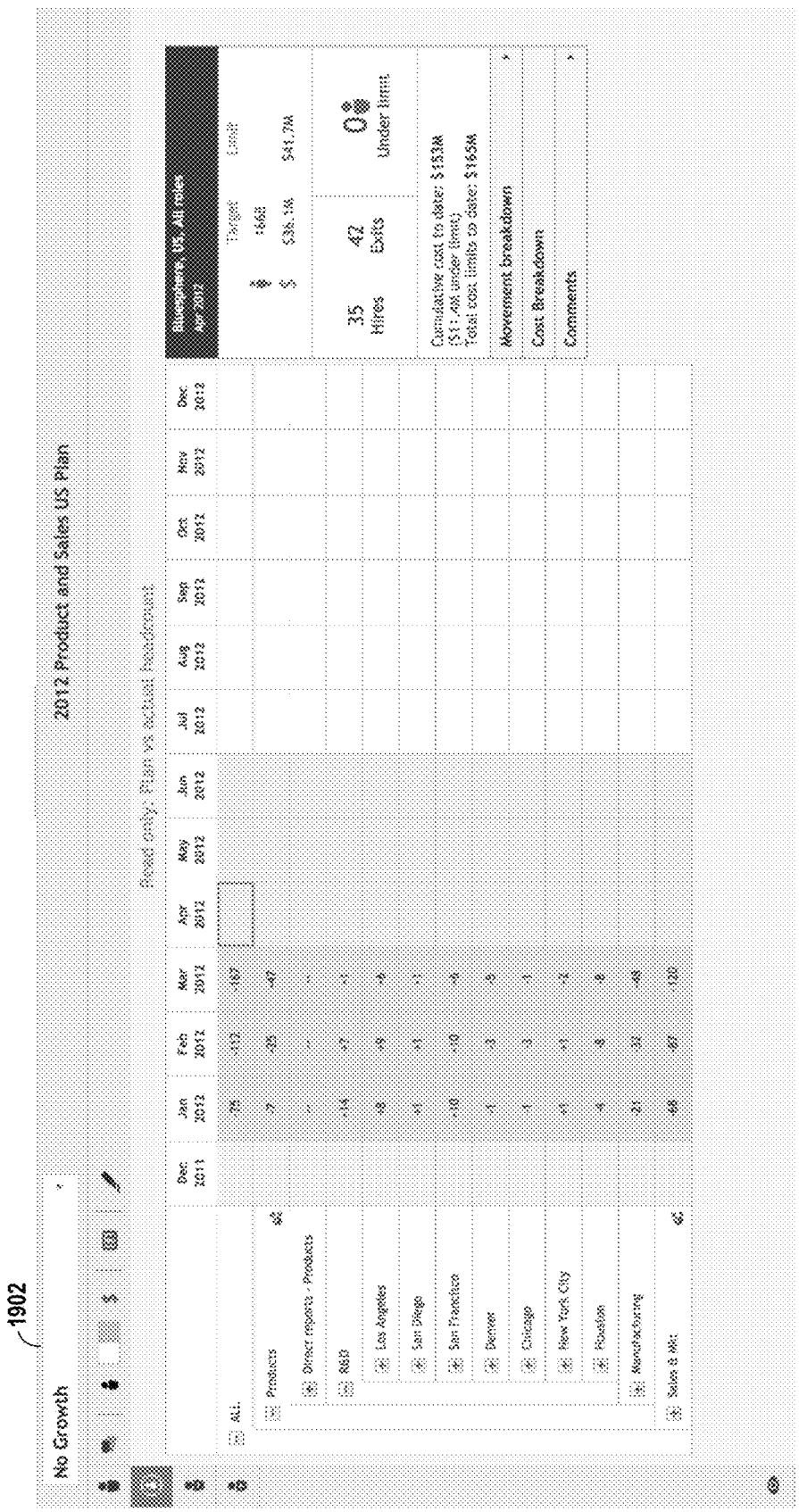

FIG. 20 illustrates that within a particular planning scenario (e.g., the "No Growth" scenario of FIG. 19), a user can review deviations between target headcount values and actual headcount values for various section of the plan. For illustrative purposes, FIG. 20 shows deviations between target headcount values and actual headcount values based on the No Growth planning scenario for various cities associated with different R&D locations.

Figure 21:
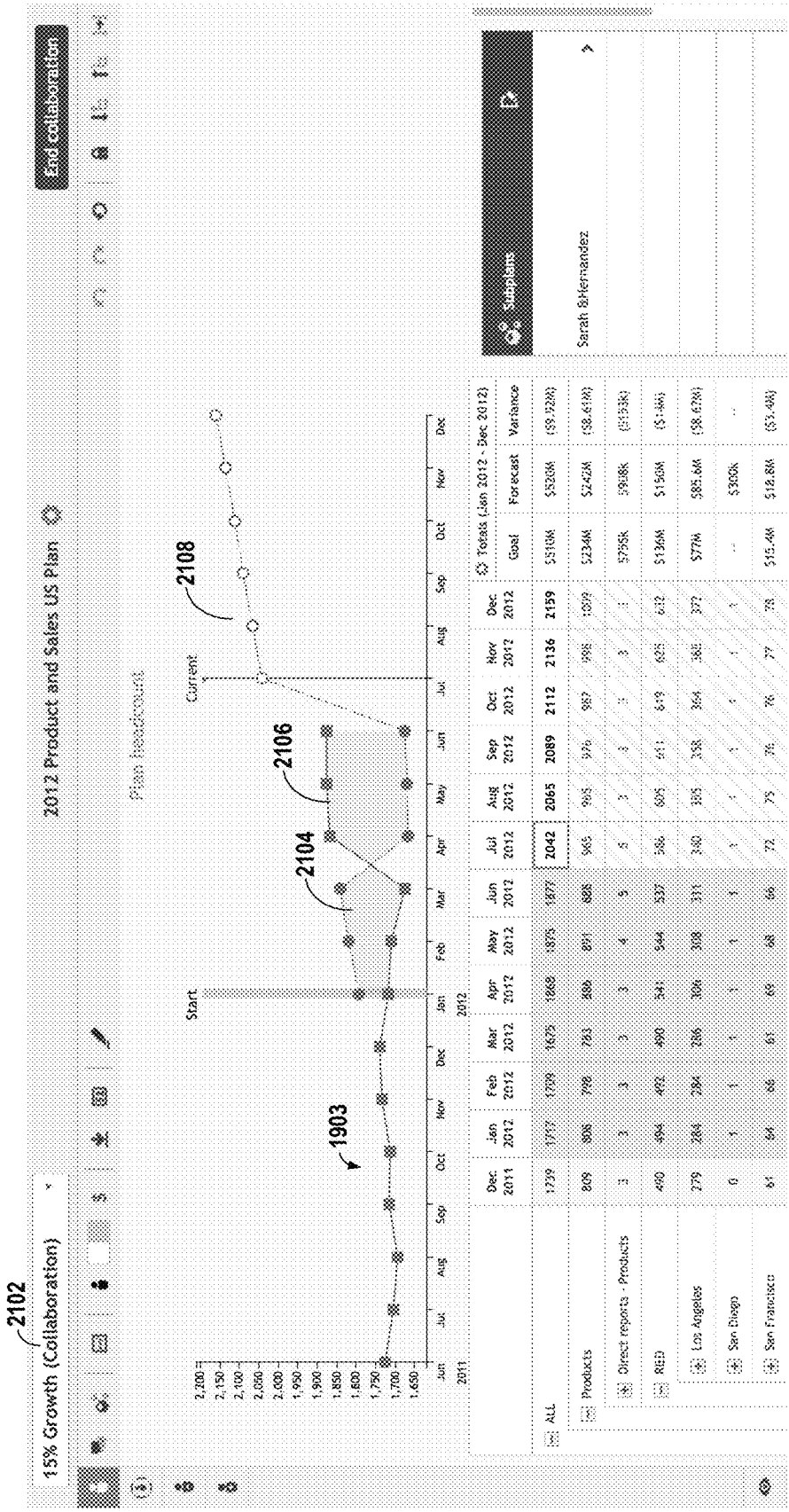

FIG. 21 illustrates that a user may create a second planning scenario 2102 (e.g., a "15% Growth" plan) that is different from an original planning scenario (e.g., the "No Growth" scenario 1902 of FIGS. 19 and 20) in order to account for deviations between target headcount values and actual headcount values over a previous time period (e.g., a six month period prior to a "Current" time period, such as July 2012 in the example of FIG. 21). FIG. 21 illustrates a first deviation 2104 between target headcount values and actual headcount values over a first three-month period prior to the "Current" time period (e.g., January 2012 to March 2012) and a second deviation 2106 between target headcount values and actual headcount values over a second three-month period prior to the "Current" time period (e.g., from April 2012 to June 2012). FIG. 21 illustrates target multiple target headcount values 2108 starting from the "Current" time period (e.g., from July 2012 to December 2012) that are determined based on the second planning scenario 2102 (e.g., the "15% Growth" plan).

Figure 22:
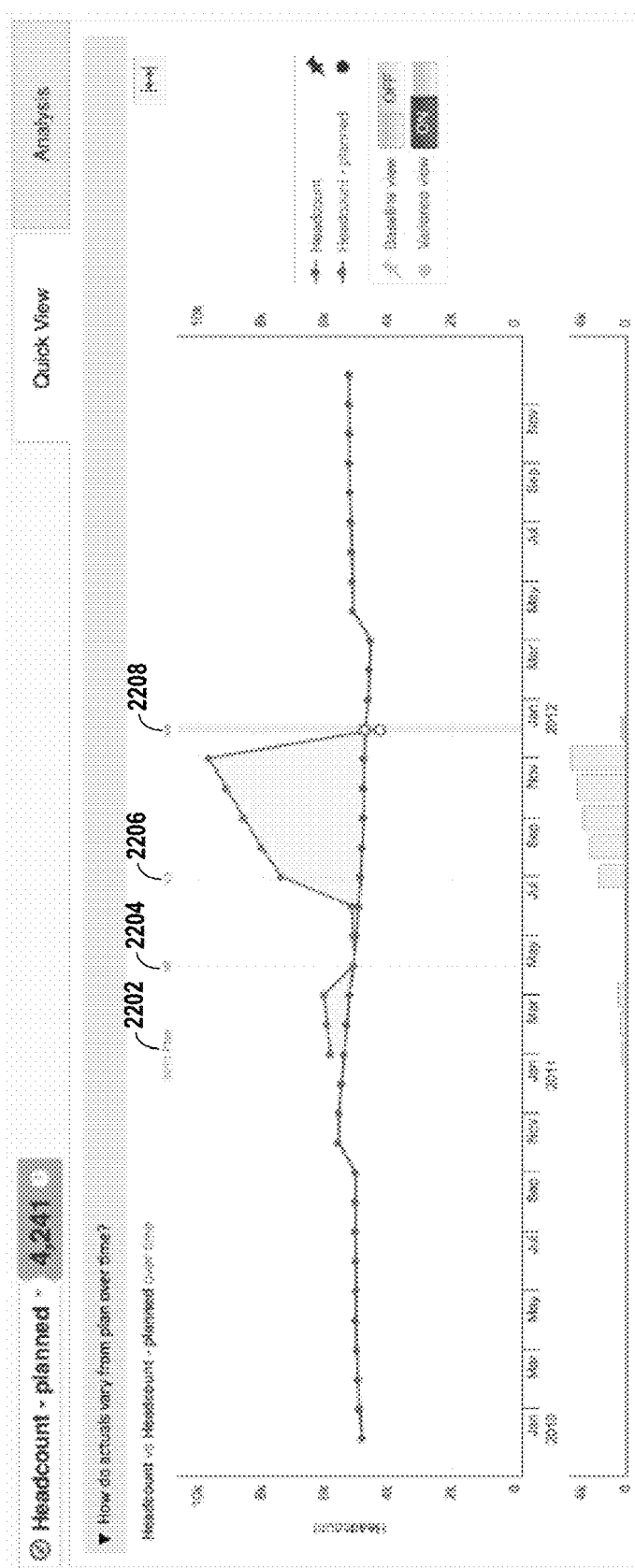

FIG. 22 illustrates an example of "workforce analytics" interface. After a workforce plan (e.g., a Headcount plan in the example of FIG. 22) is published, the planned and forecasted metric(s) can be monitored against actual metric (s). A planner may return to the workforce planning application to revise a plan based on the actual metric(s) and re-publish to monitor the revised plan. FIG. 22 illustrates that a first plan 2202 (e.g., a "2011 Plan") may be revised to a second plan 2204 (e.g., a "v2" plan) based on a comparison of the forecasted headcount values to the actual headcount values (e.g., over a time period from January 2011 to April 2011). FIG. 22 further illustrates that the second plan 2204 (e.g., the "v2" plan) may be revised to a third plan 2206 (e.g., a "v3 plan") based on a comparison of the forecasted/actual headcount values (e.g., over a time period from April 2011 to July 2011). FIG. 22 further illustrates that the third plan 2206 (e.g., the "v3" plan) may be revised to a fourth plan 2208 (e.g., a "v4 plan") based on a comparison of the forecasted/actual headcount values (e.g., over a time period from July 2011 to December 2011).

Figure 23:
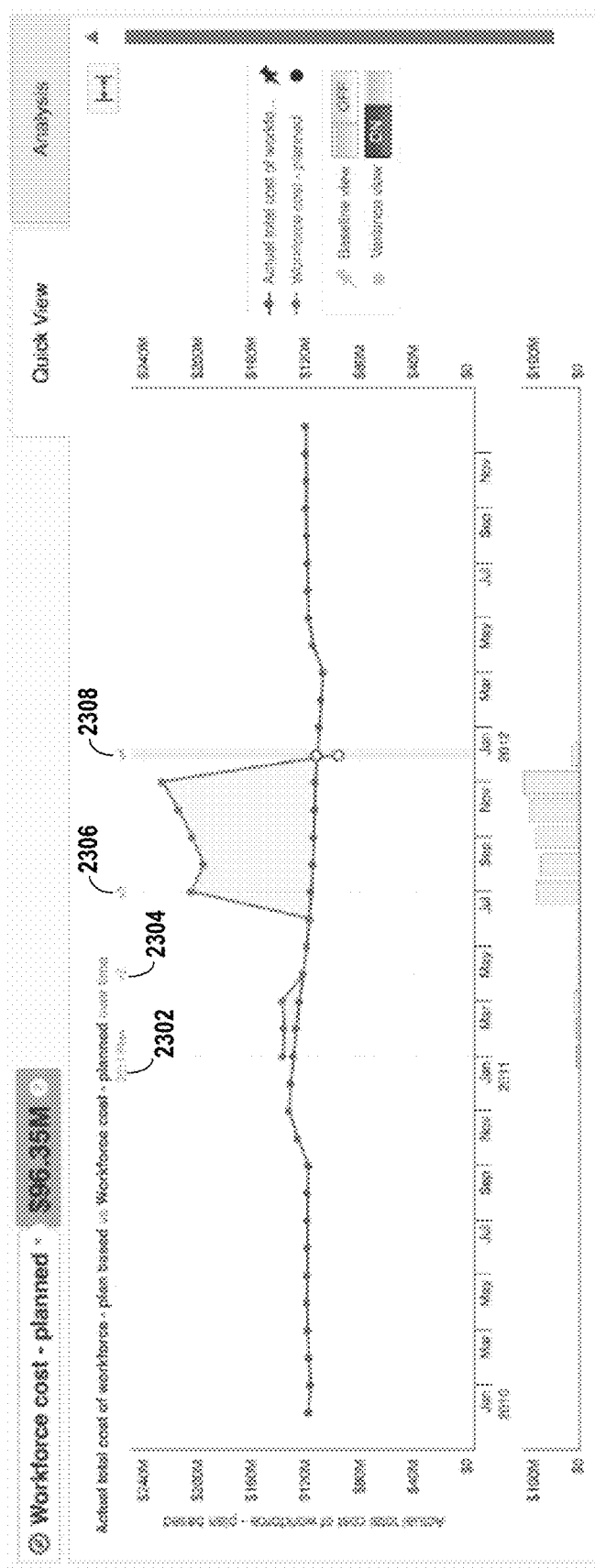

FIG. 23 illustrates another example of "workforce analytics" interface. After a workforce plan (e.g., a Workforce cost plan in the example of FIG. 23) is published, the planned and forecasted metric(s) can be monitored against actual metric(s). A planner may return to the workforce planning application to revise a plan based on the actual metric(s) and re-publish to monitor the revised plan. FIG. 23 illustrates that a first plan 2302 (e.g., a "2011 Plan") may be revised to a second plan 2304 (e.g., a "v2" plan) based on a comparison of the forecasted workforce cost values to the actual workforce cost values (e.g., over a time period from January 2011 to April 2011). FIG. 23 further illustrates that the second plan 2304 (e.g., the "v2" plan) may be revised to a third plan 2306 (e.g., a "v3 plan") based on a comparison of the forecasted/actual workforce cost values (e.g., over a time period from April 2011 to July 2011). FIG. 23 further illustrates that the third plan 2306 (e.g., the "v3" plan) may be revised to a fourth plan 2308 (e.g., a "v4 plan") based on a comparison of the forecasted/actual workforce cost values (e.g., over a time period from July 2011 to December 2011).

Figure 24:
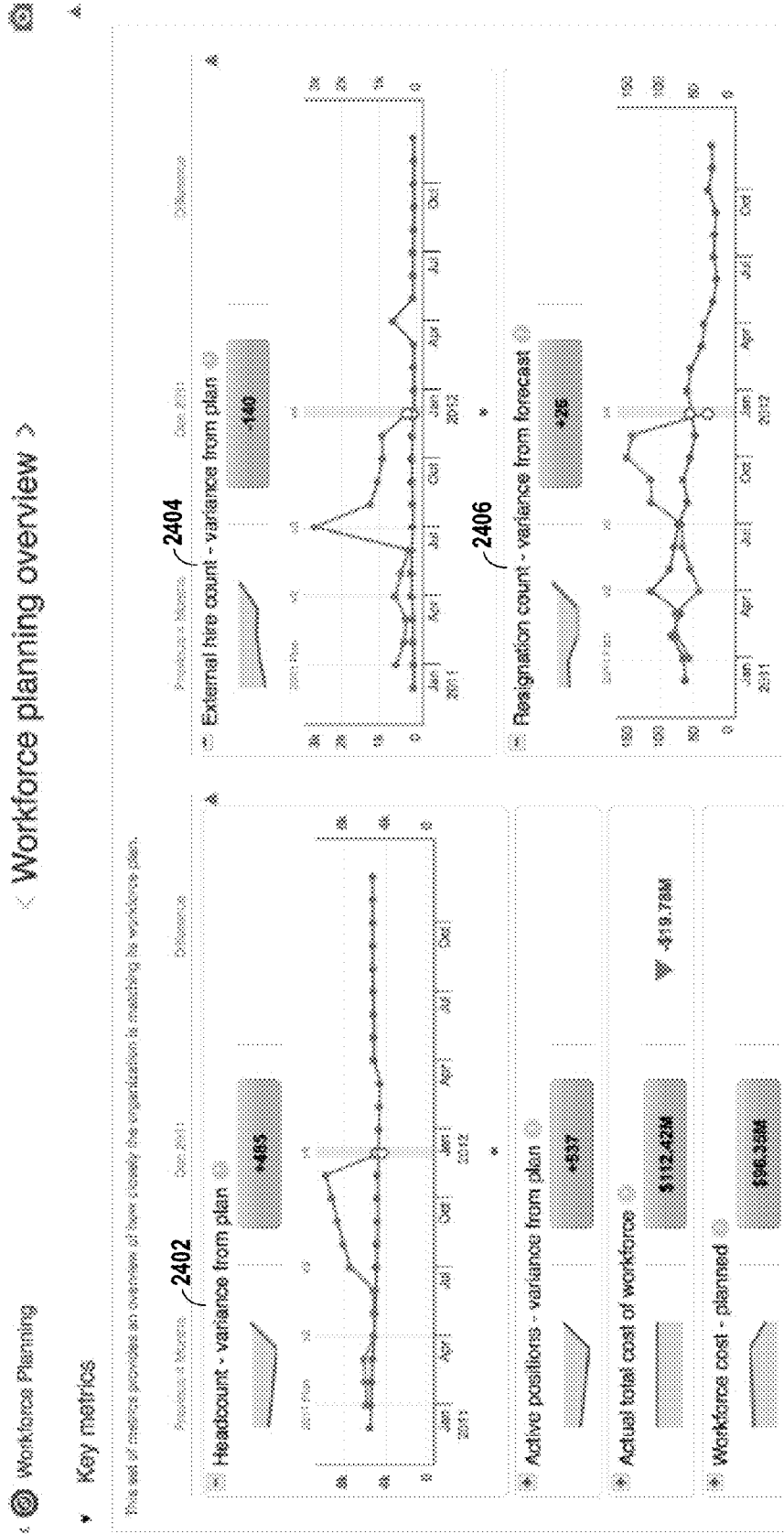

FIG. 24 illustrates another example of a "workforce analytics" interface. In the example of FIG. 24, a user may compare forecasted/actual values for various metrics in a single interface (along with identifications of when plans were revised e.g., from a first plan to a v2 plan, to a v3 plan, to a v4 plan, etc.). To illustrate, one portion of the interface of FIG. 24 shows a "Headcount—variance from plan" 2402, another portion of the interface shows "External hire count–variance from plan" 2404, another portion of the interface shows "Resignation cost–variance from plan" 2406. It will be appreciated that alternative and/or additional forecasted/actual values may be presented in a single interface.

Figure 25:
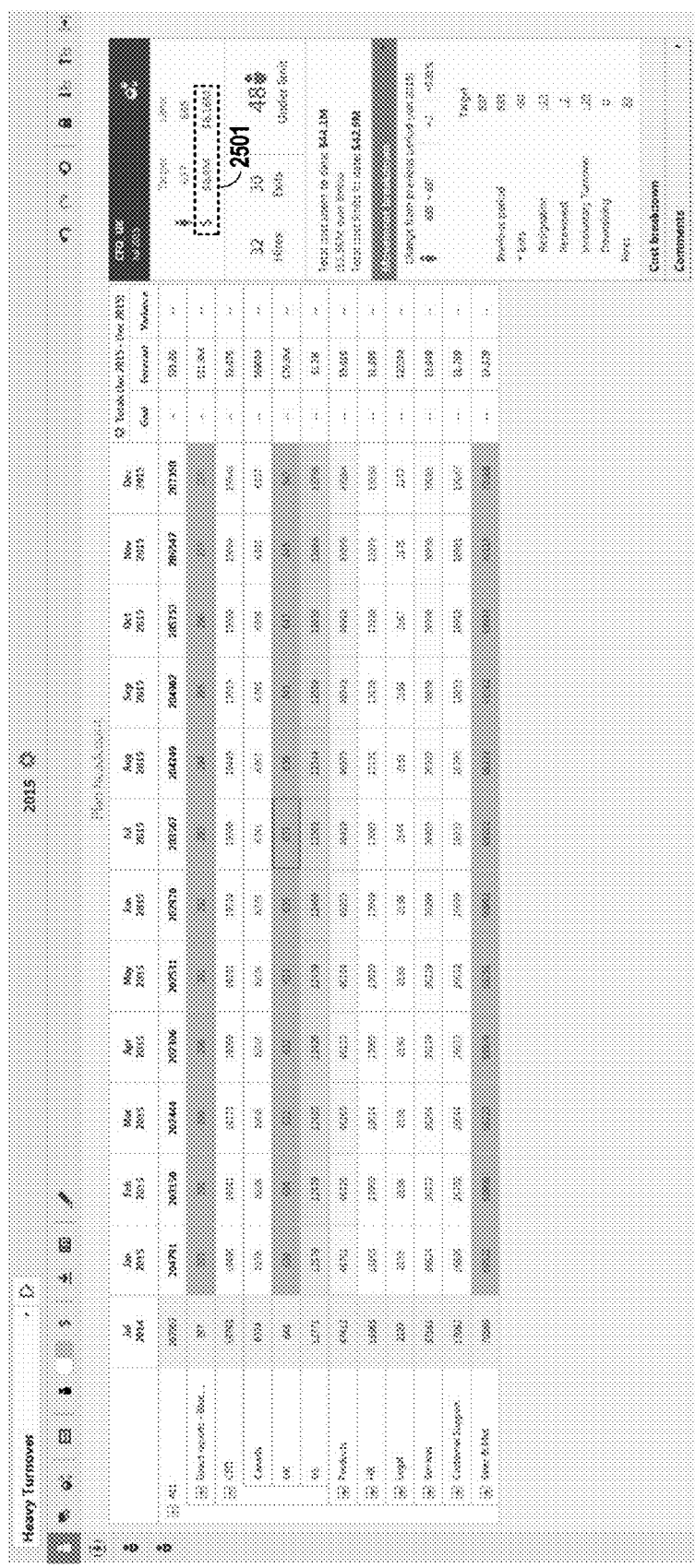

FIG. 25 illustrates an example of highlighting in which increased highlighting is used to identify cells that are further over the limit. To illustrate, the selected CFO, UK cell for July 2015 has a cost of $6.4 million, which is over the cost limit of $6.16 million for the cell, as shown at 2501. Highlighting plan values vs. limits as shown in FIG. 25 may provide the user a way to quickly identify problematic parts of a plan for further attention and may provide the user a quick high-level view of whether a plan complies with budgetary constraints.

Figure 26:
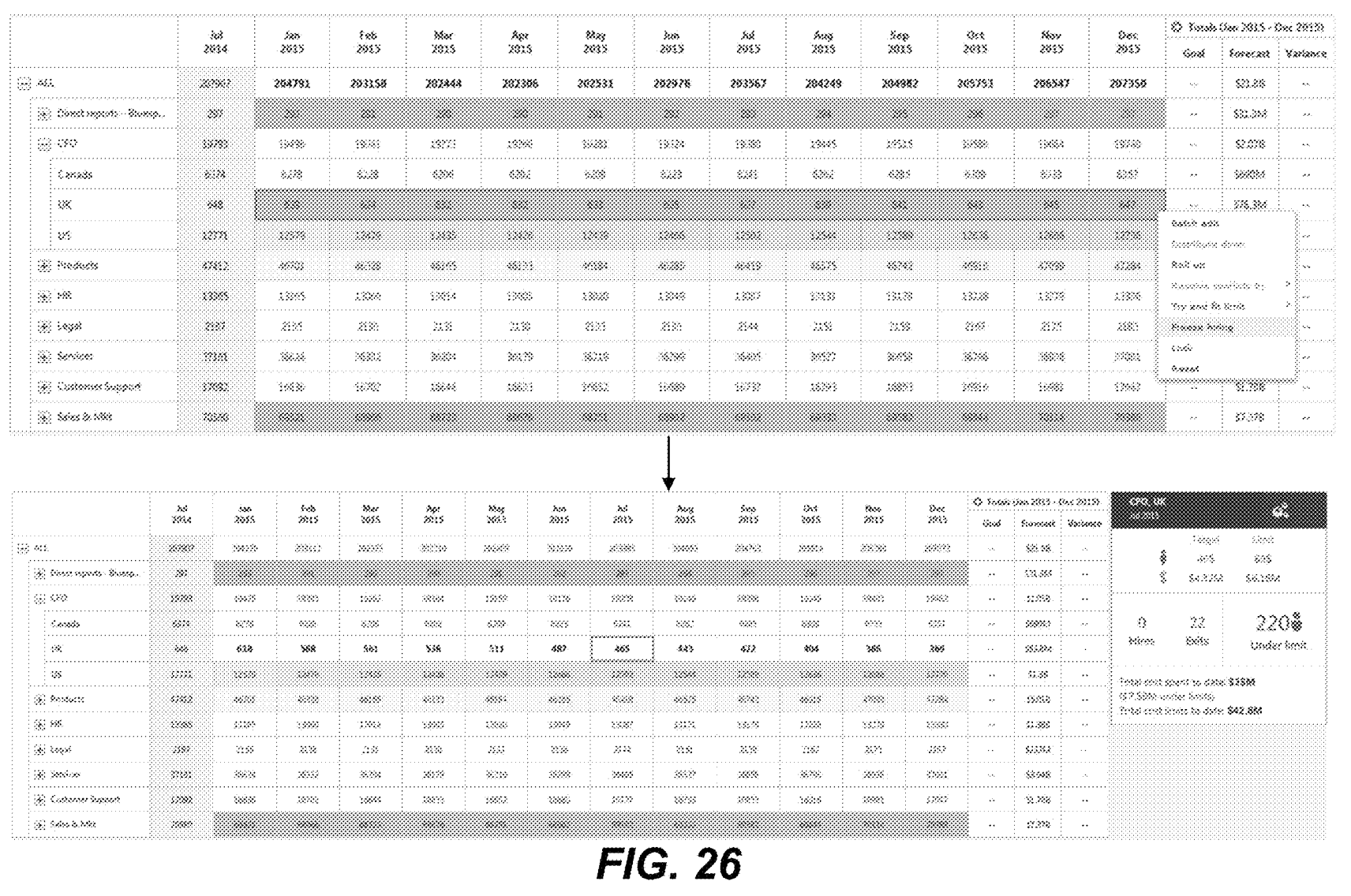

FIG. 26 illustrates freezing hiring in the CFO organization in the UK during the entire 2015 year. The freezing hiring functionality may adjust headcount values such that there are no hires for the selected cells. When turnover assumptions are defined, the headcounts in the selected cells will decrease as time progresses due to the hiring freeze. Freezing hiring may thus enable the user to plan for gradual lowering of workforce due to natural attrition. For example, due to the hiring freeze, the July 2015 headcount for the CFO organization in the UK is 465 and has a cost of $4.32 million, which is below the cost limit of $6.16 million.

Figure 27:
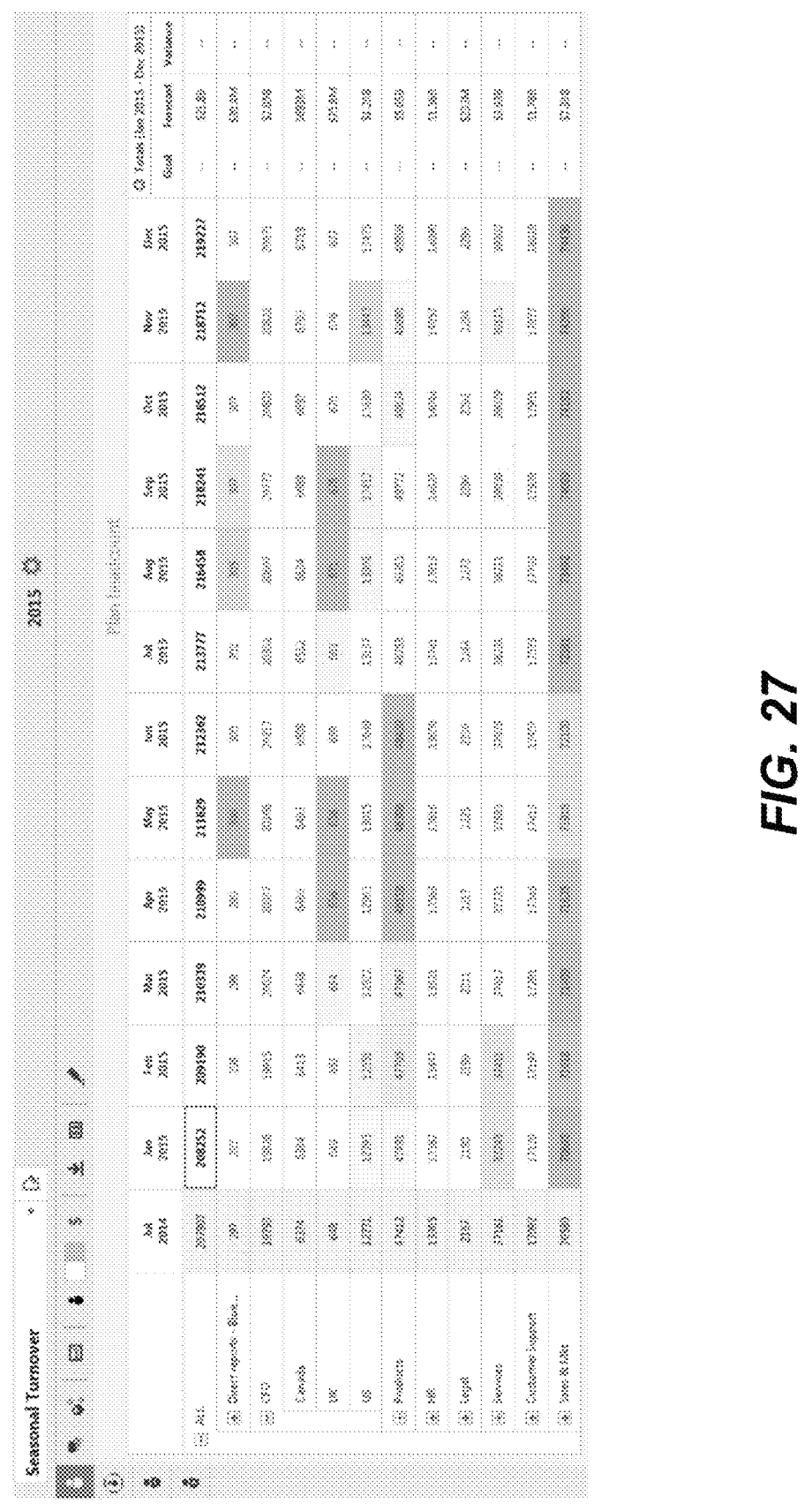
Figure 28:
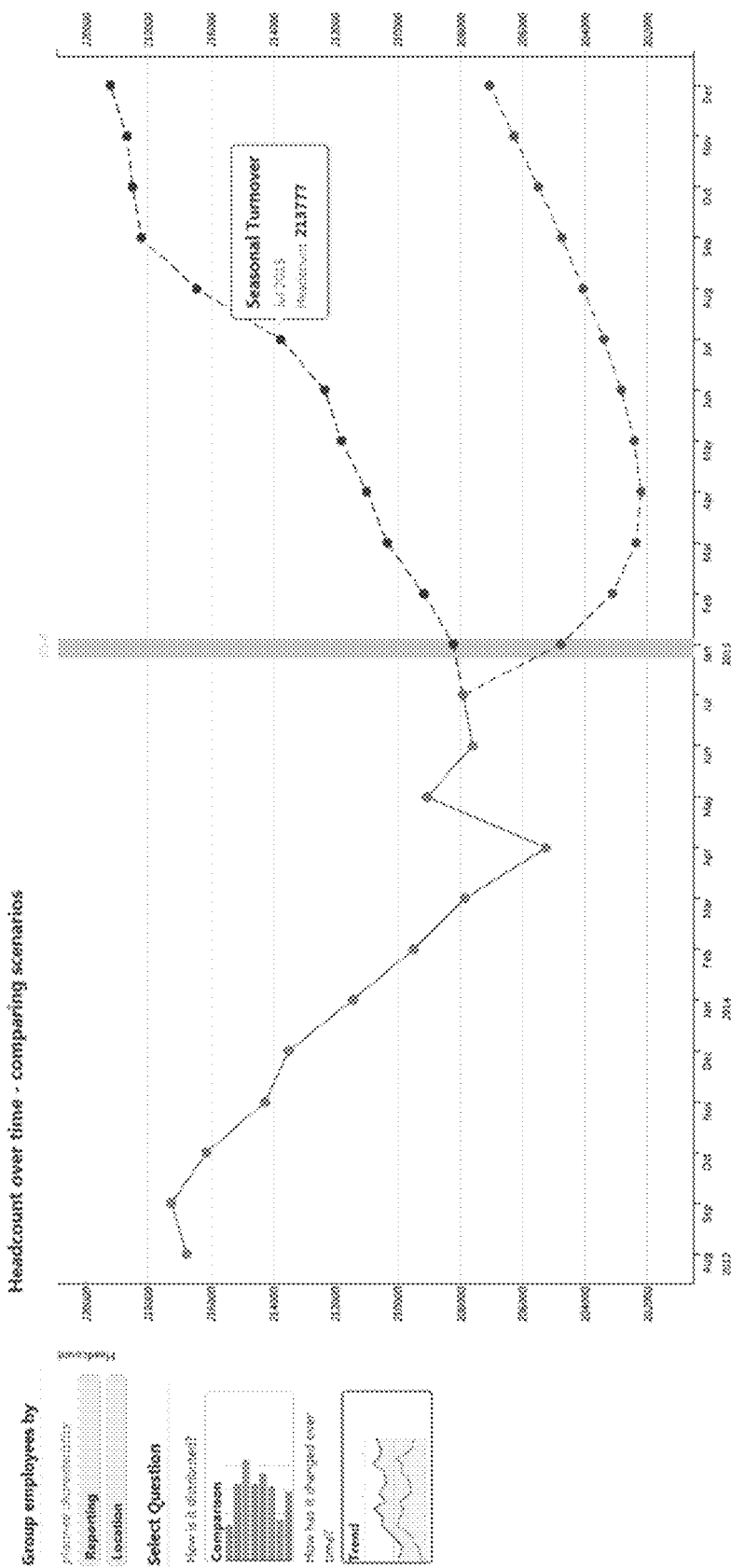

The WFP application of the present disclosure enables the user to compare different scenarios. For example, after creating the "Heavy Turnover" scenario defined above, the user may create a "Seasonal Turnover" scenario in which turnover assumptions use a seasonal forecasting model. FIG. 27 illustrates results of fitting to cost limits in the "Seasonal Turnover" scenario, assuming same 10% headcount growth and 5% cost growth limits as the "Heavy Turnover" scenario. To compare scenarios, the user may select the analyze tab 502 of FIG. 1. In the resulting GUI, the user may view bar charts, line charts, etc. to compare data (e.g., headcount, cost, turnover, etc.) from the different scenarios of the plan. For example, FIG. 28 illustrates an exemplary analysis GUI that may be used to compare headcounts in the "Seasonal Turnover" and "Heavy Turnover" scenarios. Notably, the line chart in FIG. 28 includes a combination of both historical data and forecasted data. The WFP application of the present disclosure advantageously supports analysis (e.g., query execution) that spans a time frame covering both the past and the future. A plan generated by the WFP application thus represents a data input for computation, similar to historical data from a database, internal/external benchmark data, user input, etc.

FIGS. 2-28 thus illustrate exemplary WFP GUIs operable to create plans/scenarios/assumptions, set plan limits, fit plan cells to limit(s), view cost breakdowns for plan cells, highlight cells over limit(s), freeze hiring, and compare/update different scenarios of a plan. It will be appreciated that the WFP application of the present disclosure may thus enable various operations that may be difficult and time-consuming to implement using conventional WFP tools, such as a standalone spreadsheet document.

In a particular embodiment, when a value in a cell of the planning grid is modified, the WFP application may reconcile the adjustment using one of two options: summing to children or distributing to children. When the sum to children option is used, parent cell values of the modified cell are adjusted such that the value each parent cell is the sum of the values in the corresponding child cells, For example, the July 2015 value for CFO may be the sum of July 2015 values for (CFO, Canada), (CFO, UK), and (CFO, US).

When the distribute to children option is used, the values of child cells are adjusted such that their values sum to the value of the parent. A delta value between the parent cell for the time period in question and for the preceding time period is distributed to child cells based on two distribution rules. According to the first rule, the delta value is used to minimize deltas of the child rows that also have a delta compared to the preceding time period. If the parent value is increasing compared to the preceding time period, then child values that are lower than in the preceding time period are also increased until they match the values of the preceding time period. If the parent value is decreasing compared to the preceding time period, then child values that are higher than in the preceding time period are decreased until they match the values of the preceding time period. If multiple child values need adjustment, the delta of the parent cell is distributed based on the ratio of the deltas of individual child cells to the total child delta.

Figure 29:
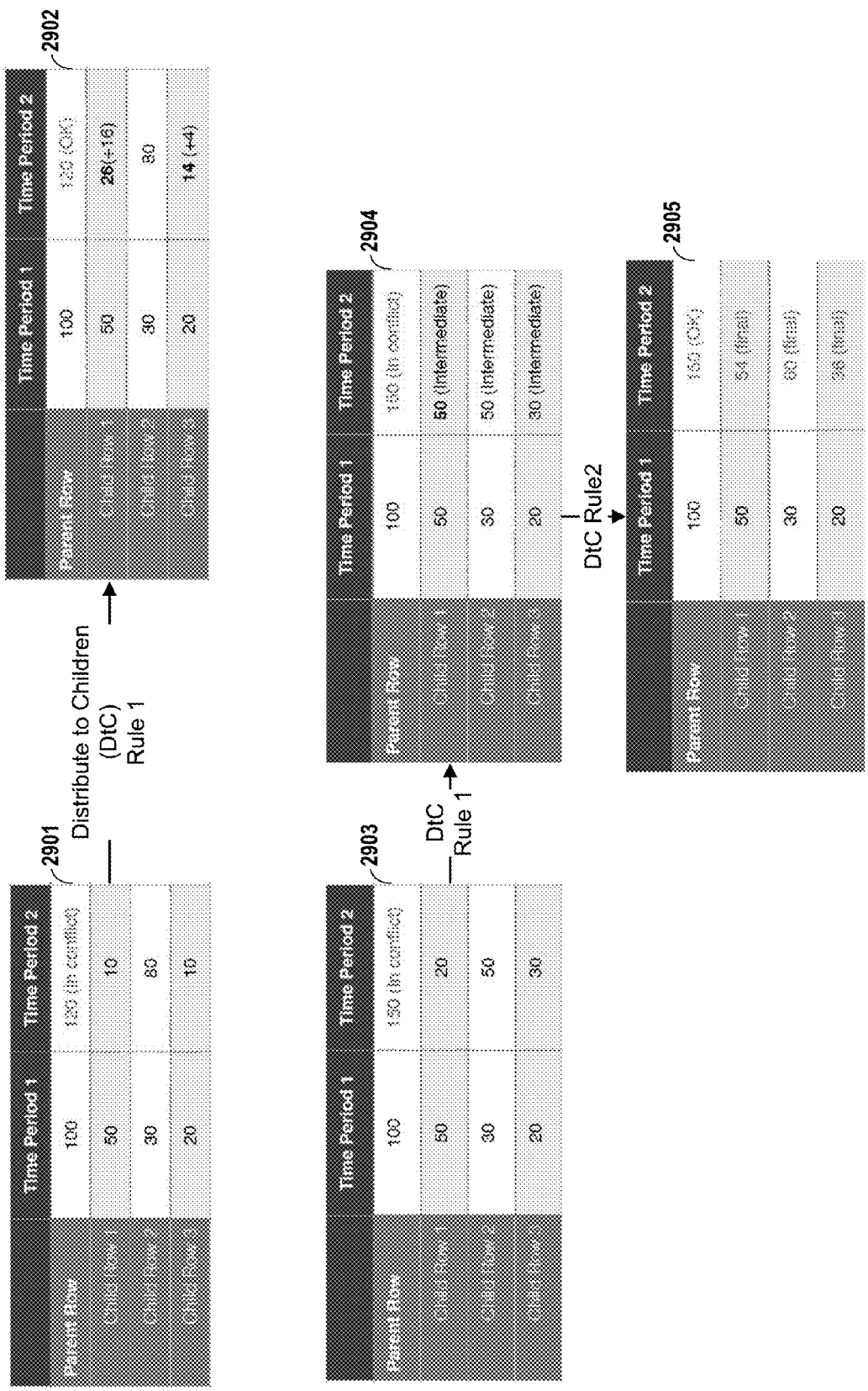
FIG. 29 illustrates examples of resolving a conflict between a parent row and child rows of a grid in a workforce planning application.

To illustrate, in the first example of FIG. 29, there is a +20 delta in the Parent Row, as shown at 2901. The value in Child Row 2 is greater than in the previous time period, whereas the values in Child Rows 1 and 3 are less than in the previous time period. The delta of Child Row 1 is −40 and the delta of Child Row 3 is −10, for a total negative delta of −50. Based on the above rules, Child Row 1 is distributed an additional headcount of (−40/−50)*20=16 and Child Row 2 is distributed an additional headcount of (−10/−50)*20=4. The distributed headcounts are shown in FIG. 29 at 2902.

After the first rule above is met, the application second rule distributes the remaining parent delta among all children using a ratio of child values compared to a previous sum. To illustrate, in the second example of FIG. 29, the Parent Row has a +50 delta compared to the previous time period, as shown at 2903. The delta of Child Rows 1, 2, and 3 are −30, +20, and +10, respectively. Application of the first rule above minimizes negative deviation from the previous period by increasing Child Row 1 to 50, as shown at 2904. The increase in Child Row 1 accounts for +30 of the total +50 delta. The remaining +20 may then be distributed using the original child ratios in Time Period 2 (i.e., ratio for Child Row 1=20/100, ratio for Child Row 2=50/100, and ratio for Child Row 3=30/100). Thus, Child Rows 1, 2, and 3 may be distributed additional headcounts of 4, 10, and 6, respectively, as shown at 2905.

In a particular embodiment, the WFP application of the present disclosure enables collaborative planning workflows. For example, plans with several dimensions that contain many members can become large and difficult for a single user to manage. To alleviate this burden, the WFP application enables a user to assign different sections (e.g., sub-plans) of a "parent" plan to other users. The use of sub-plans may enable the planning workload to be shared amongst multiple users, and the partitioning process can be repeated for multiple levels (e.g., a sub-plan can be further partitioned into sub-sub-plans that can be assigned to other users). In particular embodiments, a plan may initially be editable by and visible only to an owner of the plan, i.e., the creator of the plan. The owner may share the plan with other users, giving the other users viewing and/or editing rights. The owner of a sub-plan may be the user that the sub-plan is assigned to. However, sub-plans may inherit viewing/editing rights that existed in the parent plan. When an action is applied to a plan or sub-plan, the WFP engine 130 may validate the user attempting to perform the action prior to modifying the plan. Plan security is further described with reference to FIG. 36.

Figure 30:
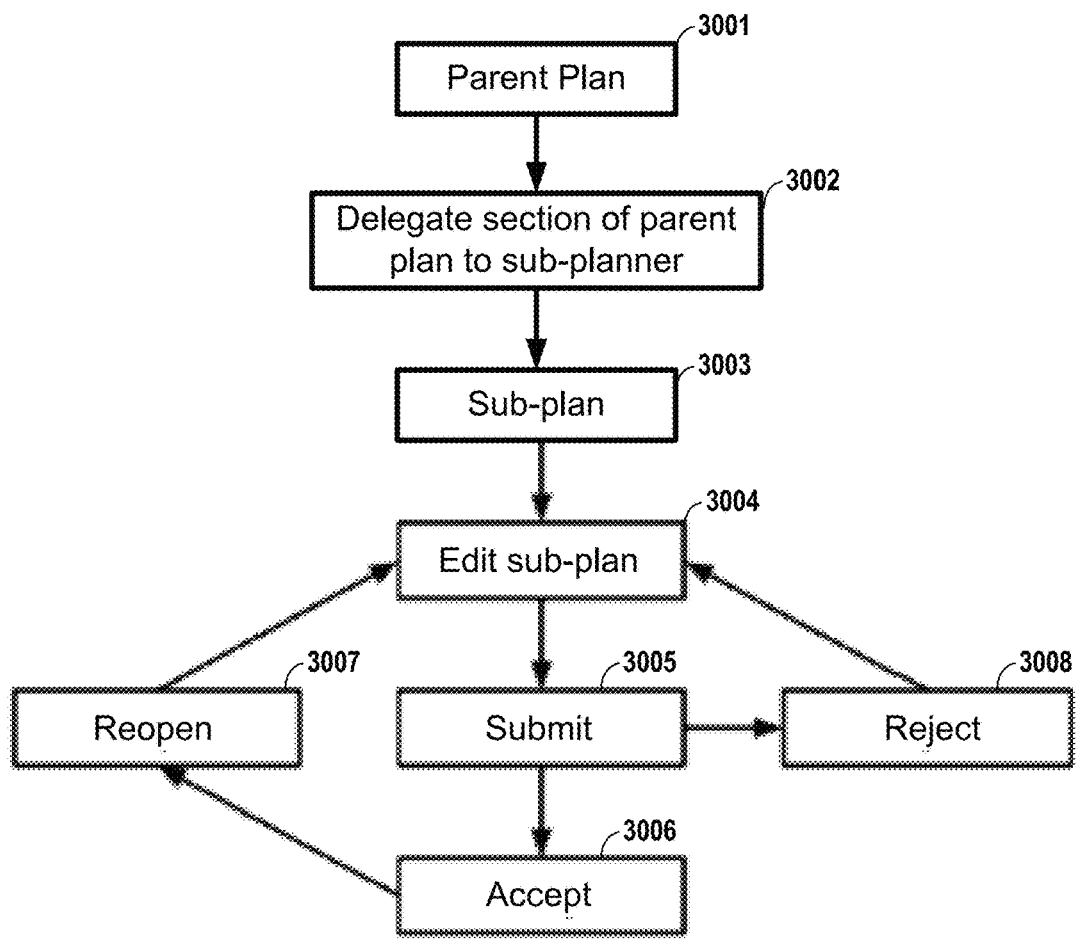
FIG. 30 illustrates a particular embodiment of a collaborative workflow for workforce planning.

FIG. 30 illustrates a flow diagram of a collaboration workflow in accordance with the present disclosure. In an illustrate embodiment, the collaboration workflow may be performed at a WFP application. For example one or more operations described herein with reference to the collaboration workflow of FIG. 30 may be performed at the client instance 112, 122 of FIG. 1 and/or the WFP engine 130 of FIG. 1 in accordance with the screenshots of FIGS. 31-39.

Given a parent plan 3001, a user may delegate 3002 a section of the parent plan, i.e., a sub-plan 3003, to a sub-planner. Although a single sub-plan 3003 is shown in FIG. 30, it should be noted that any number of sub-plans may be created from the parent plan 3001. The sub-plan 3003 may inherit the dimensional hierarchy of the parent plan 3001, or a portion thereof. The sub-plan 3003 may also inherit scenario(s) of the parent plan, including headcounts, turnover, and costs. For example, all scenarios of the parent plan may be included in the same sub-plan, or different scenarios may be assigned to different sub-planners. FIG. 31 illustrates an example of creating a sub-plan of the "2015" plan described with reference to FIGS. 2-28. The sub-plan is for the Products organization, and is being assigned to the sub-planner Sarah Jones. Both the "Heavy Turnover" and the "Seasonal Turnover" scenarios are assigned in the sub-plan, and the base pay cost assumption is locked from editing. The sub-plan has a requested due date of Dec. 15, 2014, and an additional "Role" dimension is added to the framework for the sub-plan.

It should be noted even after a section of the parent plan 3001 has been delegated, the parent plan 3001 can continue to be modified. If a user wishes to "push" a change from the parent plan 3001 to the sub-plan 3003, the user may select a GUI element (not shown) in the WFP application.

Figure 33:
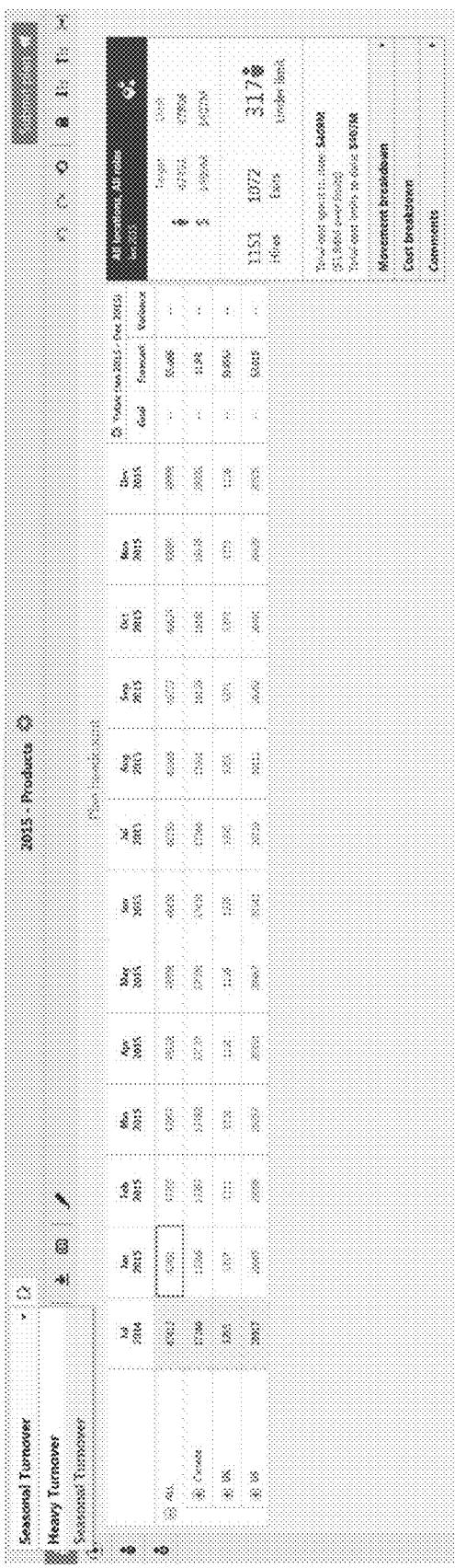
Figure 34:
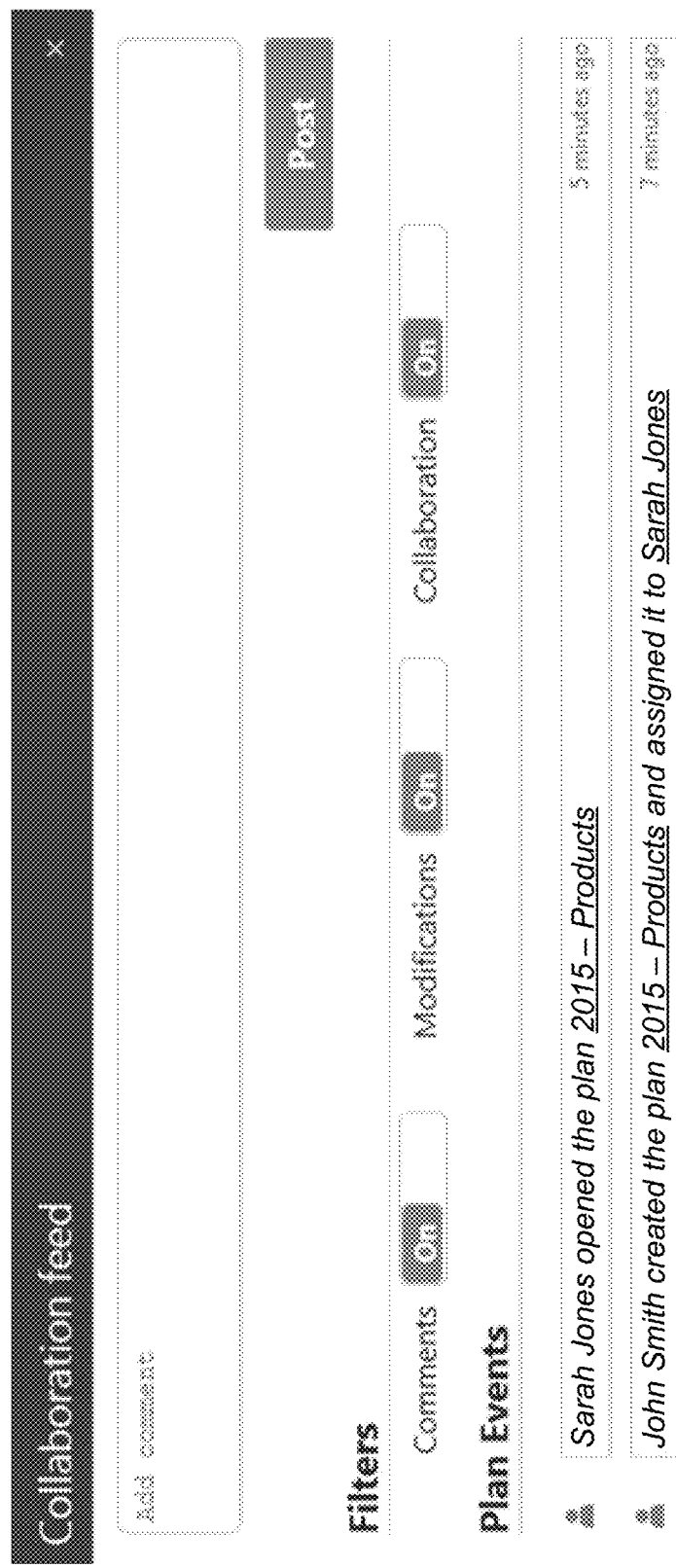

When a sub-plan 3003 is delegated to the sub-planner, the WFP application may automatically trigger a notification (e.g., e-mail message, text message, etc.) to a computing device associated with the sub-planner. When the sub-planner logs in to the WFP application, the delegated sub-plan 3003 may be available for editing. For example, as shown in FIG. 32, the "2015—Products" sub-plan is available for editing when Sarah Jones logs in to the WFP application. FIG. 33 illustrates the "2015—Products" sub-plan after it is opened for editing by Sarah Jones. FIG. 34 illustrates a collaboration feed for the sub-plan, which may be displayed in response to selection of the collaboration feed button 507 of FIG. 5. The collaboration feed may list plan events (e.g., plan creation, assignment, submission, acceptance, rejection, etc.). The collaboration feed may also track modifications and provide commenting ability on individual cells. The collaboration feed may thus provide redlining functionality in the WFP application.

Figure 35:
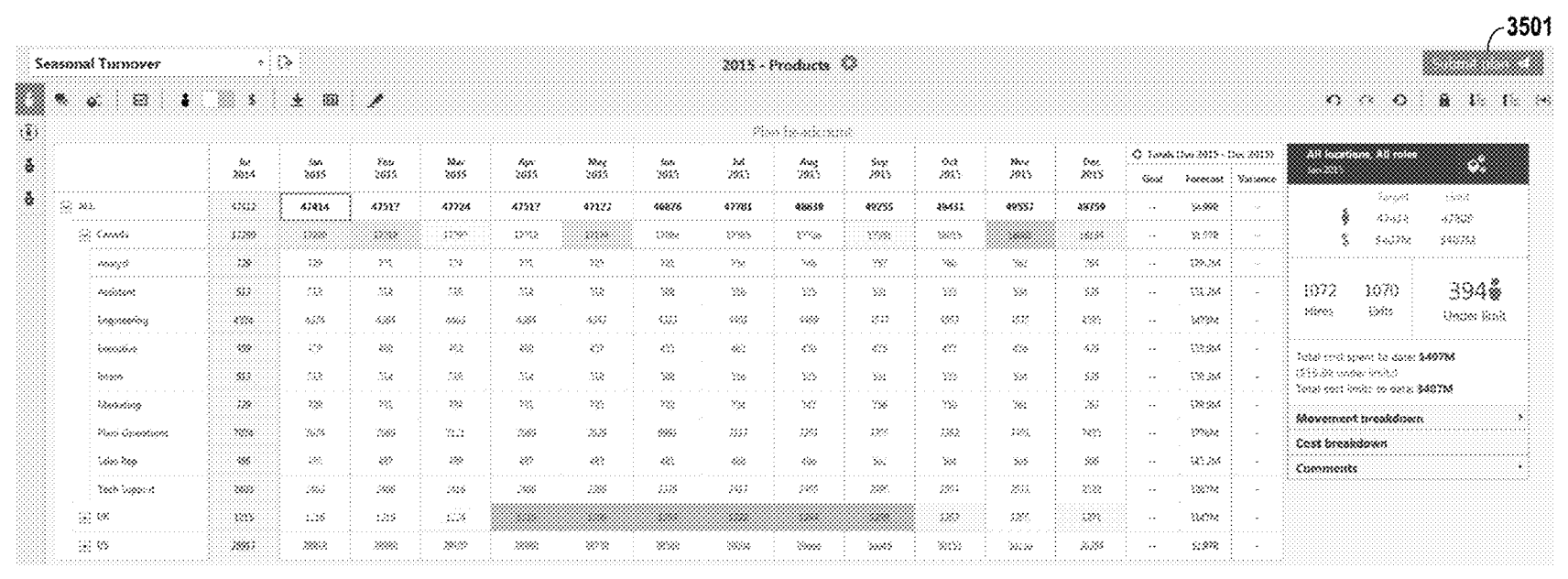

The sub-planner may edit 3004 the sub-plan 3003 and, when the sub-planner feels that the sub-plan 3003 is complete, the sub-planner may submit 3005 the sub-plan 3003. For example, FIG. 35 illustrates the sub-plan after Sarah Jones performs top-level a fit to cost limit operation in both scenarios, and FIG. 36 illustrates a submission dialog box that is displayed when Sarah Jones selects a submit plan button 3501. When the sub-plan 3003 is submitted, the WFP application may automatically trigger a notification to a computing device associated with the owner of the parent plan 3001.

When the owner of the parent plan 3001 logs in and selects the submitted sub-plan 3003, the WFP application may trigger a merge workflow to assist the owner of the parent plan 3001 in evaluating the values of the sub-plan 3003. FIG. 37 illustrates an example in which the submitted "Products—2015" sub-plan is available for review by John Smith. FIG. 37 also shows the list of turnover assumptions that have been defined by John Smith, including the "ss resignation rate" assumption defined in FIG. 3, the assumptions from the "Heavy Turnover" scenario of the "2015" plan, and the assumptions of the "Seasonal Turnover" scenario of the "2015" plan.

Figure 38:
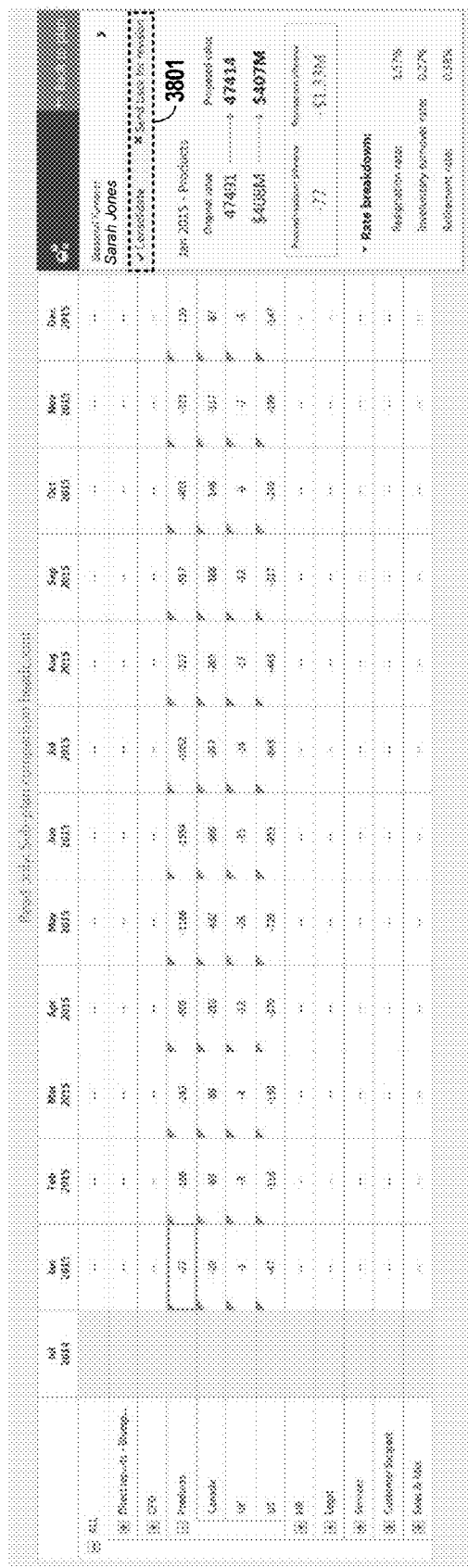

In the merge workflow, the WFP application may display a deviance view of a headcounts, costs, and turnover values of the sub-plan 3003 in the planning grid of the parent plan 3001, so that the owner of the parent plan 3001 can evaluate whether the values of the sub-plan 3003 are satisfactory. For example, FIG. 38 illustrates such a view for the "Seasonal Turnover" scenario of the "Products—2015" sub-plan, including options to consolidate (e.g., accept/merge) or reject the sub-plan and send the sub-plan back for revision, at 3801.

Figure 39:
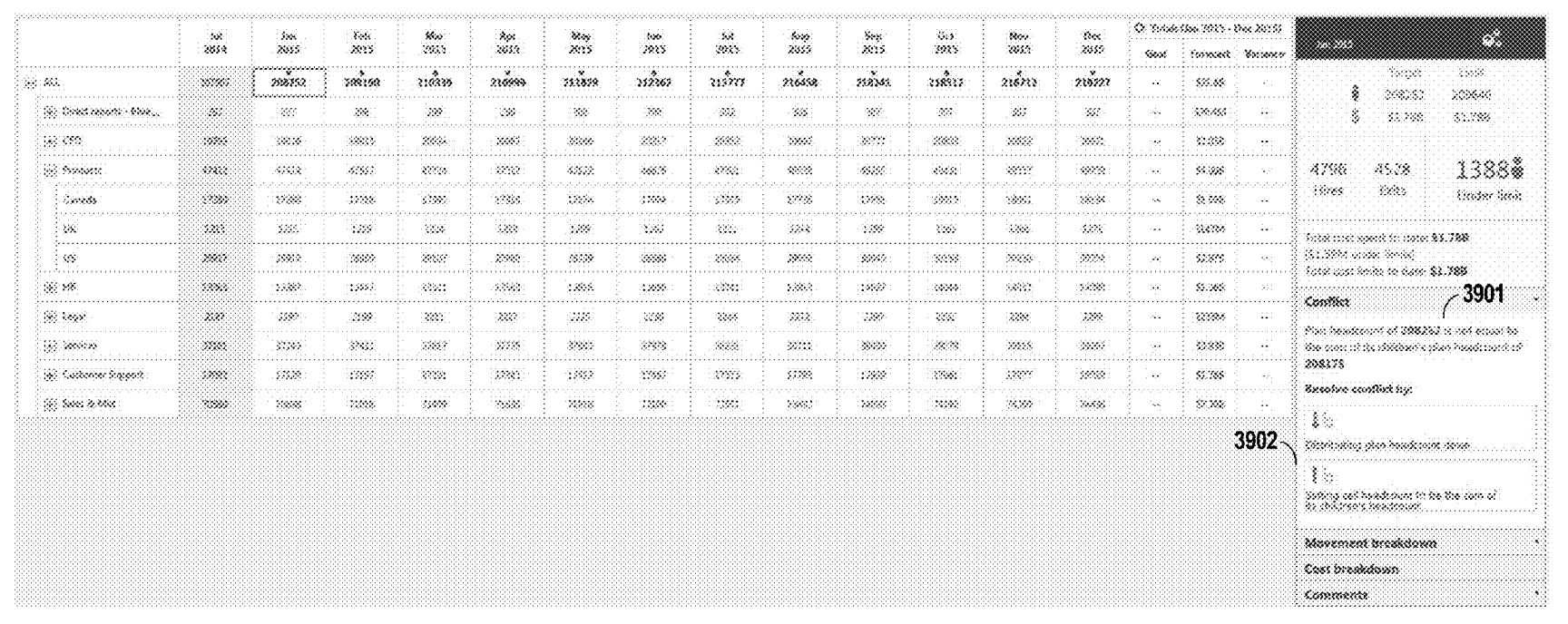

If the values of the sub-plan 3003 are satisfactory, the owner of the parent plan 3001 may accept 3006 the sub-plan. Once the sub-plan 3003 is accepted, the values of the sub-plan 3003 may overwrite the corresponding values of the parent plan 3001, the changes may be aggregated up in the parent plan 3001, and the sub-plan 3003 may be closed. For example, FIG. 39 illustrates the "2015" parent plan after the merger of the "Products—2015" sub-plan. The WFP application automatically detects conflicts in the top-level rows of the plan, as shown at 3901, because the top level headcount in each column is no longer equal to the sum of the corresponding child rows. As shown at 3902 and as described above with reference to FIG. 29, such conflicts can be resolved by distributing down to child rows or by setting the parent row to the sum of the child rows.

To restart the collaboration workflow, the sub-plan 3003 can be reopened 3007 (e.g., by the sub-planner and/or or the owner of the parent plan 3001). If the values of the sub-plan 3003 are not found to be satisfactory, the owner of the parent plan 3001 may reject 3008 the sub-plan 3003. The sub-planner may be provided comments regarding the reasons for rejection, and the sub-planner may re-edit 3004 the sub-plan 3003 based on the comments.

When the plan 3001 is complete, the owner of the plan 3001 may "publish" the plan 3001. Publishing the plan may include selecting a single scenario of the plan as an "active" scenario, and the data of the active scenario may be made available for viewing, monitoring, and further analysis. A published plan can be reopened and modified, including performing additional collaborative planning process, in the event that reality deviates from the forecasted future (as described further herein with respect to FIGS. 19-21). The modified plan can then be re-published.

FIGS. 31-39 thus illustrate exemplary WFP GUIs that can be used in conjunction with collaborative workflows, which may help dividing the planning workload amongst multiple users. It will be appreciated that such collaborative processes difficult to implement using conventional WFP tools, such as a spreadsheet. For example, only one user may be able to edit the spreadsheet at a time and it may be difficult to evaluate changes between different versions of the spreadsheet.

Figure 40:
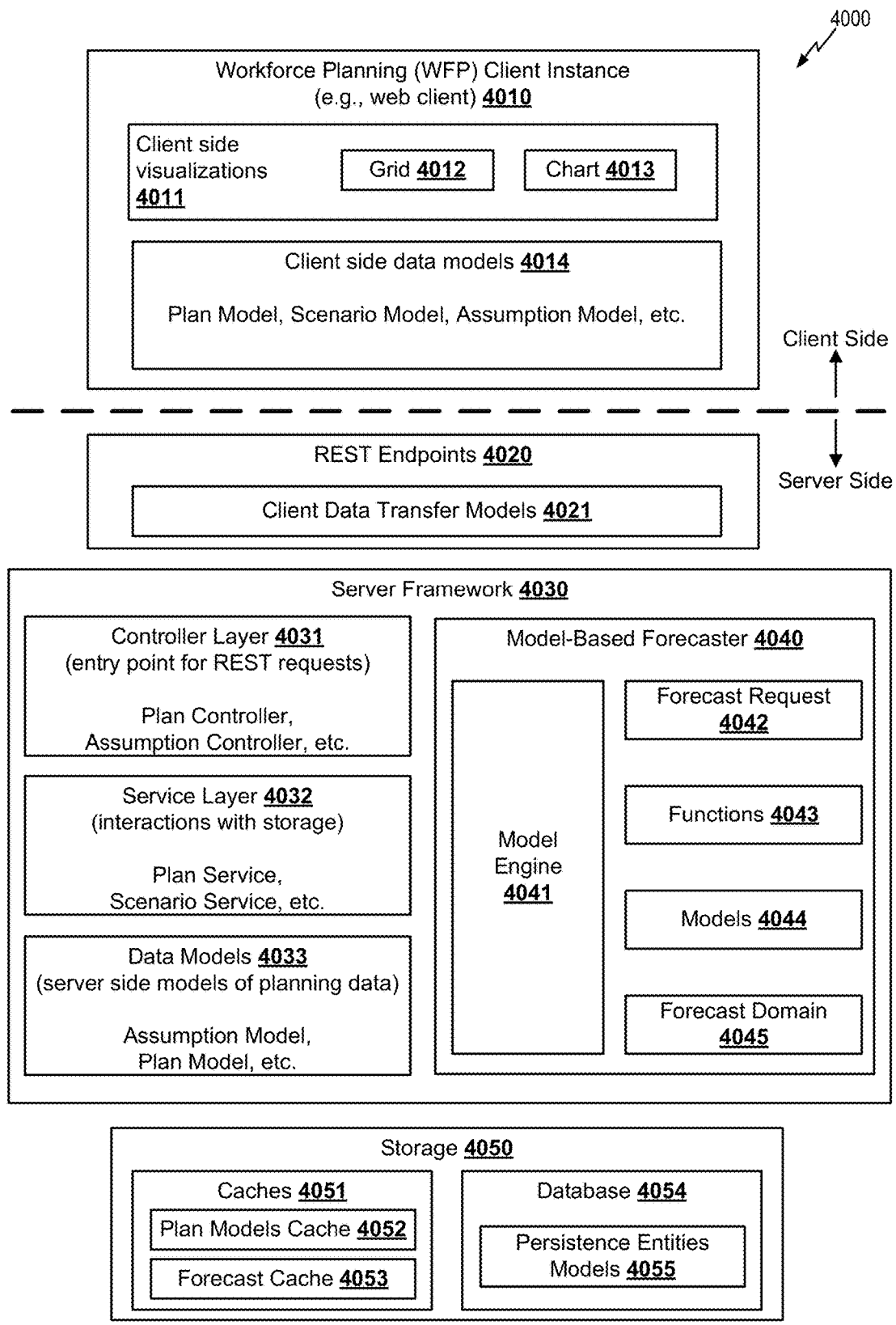
FIG. 40 illustrates another particular embodiment of a system that is operable to perform workforce planning.

FIG. 40 is an architectural diagram to illustrate an embodiment of the WFP platform described with reference to FIG. 1, and is generally designated 4000. FIG. 40 illustrates four architectural components: a WFP client instance (e.g., web client) 4010, REST endpoints 4020, a server framework 4030, and storage 4050. In a particular embodiment, each of the components corresponds to hardware and/or software (e.g., processor executable instructions) configured to perform one or more of the operations described above with reference to FIGS. 1-35 and described below.

In an illustrative example, the WFP client instance 4010 corresponds to one of the client instances 112 or 122 of FIG. 1. The WFP client instance 4010 may include client side visualizations 4011 that are used to render data (e.g., GUI data) received from the server framework 4030. For example, the client side visualizations may include a grid visualization 4012 and/or a chart visualization 4013. The grid visualization 4012 may be used to display a two-dimensional array of cells, where a first (e.g., horizontal) axis of the array corresponds to time and a second (e.g., vertical) other axis of the array corresponds to a dimension. The chart visualization 4013 may be used to render bar charts, pie charts, line (trend) charts, etc. based data included in the plan.

The WFP client instance 4010 may also include client side data models 4014, such as a plan model, a scenario model, an assumption model, etc. The client side data models 4014 may indicate how data associated with a plan is organized and represented. For example, a plan model may indicate how historical/forecasted values in the plan (e.g., the headcount values displayed in the grid visualization 4012) are organized and represented, such as the ordering and headings of each row and column in a planning grid. A scenario model may indicate how data regarding scenarios defined by a user (or generated by default) is represented, and an assumption model may indicate how data regarding assumptions defined by a user (or generated by default) is represented. As used herein, a "scenario" may correspond to a set of "assumptions" that are applied to the plan, where each assumption is an estimation of values that relate to headcount in the plan. Each scenario may represent a set of forecasted values within data models stored at a server (e.g., the WFP engine 130). In a particular embodiment, headcounts, assumption models, and limits may be created and/or stored on a per-scenario basis. A plan may include one scenario or more than one scenario.

To illustrate, a user may define assumptions regarding how employment cost (e.g., base pay, bonus, benefits, etc.) and turnover (e.g., resignation rate, involuntary turnover rate, retirement rate, etc.) will vary in the future. Different sets of assumptions may be clustered together in a scenario. For example, an "economic recession" scenario may include assumptions indicating decreases in bonuses and resignation rate. As another example, an "early retirement" scenario may include an assumption that retirement rate will increase. Different scenarios may be defined and compared within the same plan, as described above with reference to FIG. 21. Moreover, assumptions may be defined independently of plans and may be imported into different scenarios in different plans. The described WFP framework may thus separate assumptions (e.g., mathematical models) from the raw forecasting data generated from the assumptions, which may enable users to more quickly create and update different plans for different business needs. For example, the described WFP framework may be preferable to a spreadsheet in which mathematical logic is hardcoded in form of formulae and/or macros, and therefore difficult to export to other planning spreadsheets.

The REST endpoints 4020 may be used by the WFP client instance 4010 to communicate with the server framework 4030. For example, when a user at the WFP client instance 4010 edits a scenario, a client side scenario model may be updated and the update may be communicated to the server framework 4030 using a REST endpoint that is relevant to editing scenarios. To illustrate, a user may edit a scenario to use "Assumption 2" instead of "Assumption 1." This edit may generate a hypertext transfer protocol (HTTP) POST request to a scenario edit REST endpoint, where the POST request includes data indicating the replacement of "Assumption 1" with "Assumption 2." The data in the POST request may be converted to server-side data (e.g., using a server-side scenario model), and the converted data may be passed to the server framework 4030. In a particular embodiment, client data transfer models 4021 may be used to define the types of data that can be exchanged between the WFP client instance 4010 and the server framework 4030. For example, the client data transfer models 4021 may be used to serialize data into a JAVASCRIPT object notation (JSON) format or other serialized format prior to transmission of the serialized data.

In a particular embodiment, WFP data may be stored as numeric values and two data structures may be used for storage: a compact cell data structure and a compact cell structure. The compact cell data structure may be a JSON object storing the raw data values for a plan. The data may be stored in a two-dimensional array. Multiple compact cell data structures may exist for a plan. The compact cell structure may be a JSON object storing the structural information (e.g., organization) of the plan data. Because each of the compact cell data structures for the plan is organized the same way, the compact cell structure may be stored once per plan.

The server framework 4030 may include a controller layer 4031, a service layer 4032, data models 4033, and a model-based forecaster 4040. The REST endpoints 4020 call into the controller layer 4031 in response to receiving requests from the WFP client instance 4010. In a particular embodiment, the controller layer 4031 includes a plan controller that is invoked in response to plan actions (e.g., creating a plan), an assumption controller that is invoked in response to assumption actions (e.g., modifying or saving an assumption), etc. To save data (e.g., to the storage 4050), the controller layer 4031 may utilize the service layer 4032, which may include services (e.g., a plan service, a scenario service, etc.) configured to retrieve data from the storage 4050, perform computations on the data using the data models 4033, and/or persist data to the storage 4050. The data models 4033 may be server side models of planning data, and may include an assumption model, a plan model, etc. It should be noted that the server side data models 4033, the client data transfer models 4021, and the client side data models 4014 may not include "raw" plan data (e.g., headcount numbers). The raw data may be stored in the storage 4050, as further described herein, and the model 4033, 4021, and 4014 may include metadata regarding the organization of the raw data and helper functions that are used to manipulate the raw data (e.g., a multidimensional cube or other in-memory data structure populated with the raw data) and perform calculations.

The model-based forecaster 4040 includes a model engine 4041 configured to perform computations to generate forecasted data values for different scenarios of a plan. In a particular embodiment, the model-based forecaster 4040 may service a forecast request 4042 by chaining the execution of models 4044, where each model 4044 defines high-level functionality that is based on a sequence of lower-level functions 4043 and variables. A model 4044 may define "hard" dependencies that must be met for model execution and/or "soft" dependencies that are optional for model execution. Execution of a model by the model engine 4041 may include applying the functions 4043 to transform input data values into a result that is the output measure of the model. In a particular embodiment, the forecast request 4042 defines models in a valid execution ordering, and may also define the measures that are to be output by the model engine 4041. The model engine 4041 may reduce the list of available models to a minimal list of models required to service the request prior to beginning forecasting operations.

To illustrate, the forecast request 4042 identify a time range, values to forecast, etc. The model engine 4041 may select one or more particular forecasting models 4044 to use to service the forecast request 4042. For example, the forecasting model used to project cost of employee hiring may be different from the forecasting model used to project employee exits based on resignation, retirement, and involuntary turnover. Each of the forecasting models 4044 may utilize commonly-defined lower-level functions 4043, such as summation, division, etc. The functions 4043 may thus represent basic building blocks for the models 4044.

The forecast domain 4045 may represent "helper" storage used by the model engine 4041, such as to store intermediate computation values. The forecast domain 4045 may also store measure definitions and lists of measures having common properties (e.g., a list of measures that can be rolled up, a list of turnover-related measures, etc.). The forecast domain 4045 may further store metadata regarding measures, such as name, type, default value, default value function, roll-up scheme, etc. As an illustrative non-limiting example, an involuntary turnover measure may have the name "wfp_involuntary_turnover," the type "Exit," the default value 0, and an "additive" roll-up scheme.

In a particular embodiment, the model-based forecaster 4040 includes or has access to a model cache, a measure store, and a measure cube (not shown). The model cache may be a private storage space created for execution of a model, and may be used to store temporary results that may be used by a model but need not be persisted to a more permanent data store. The measure store and measure cube may be storage spaces for forecast results. For example, the measure store may include metadata and the measure cube may store raw data values on a cell-by-cell basis.

The storage 4050 may include caches 4051 and a database 4054, such as a relational database. The caches 4051 include a plan models cache 4052 and a forecast cache 4053. When plan data or forecasting data is retrieved from the database 4054 and provided to the server framework 4030, the data may be stored in the caches 4052 or 4053, so that the data can be retrieved more quickly in response to a subsequent request for the data. Similarly, modified plan or forecasting data may be stored in the caches 4052 or 4053 prior to being persisted in the database 4054. The organization the database 4054 (e.g., relational database table structures) is represented in FIG. 40 by persistence model entities 4055. In some embodiments, data in the caches 4051, data in the forecast domain 4045, and/or other data being operated on by the server framework 4030 may be stored in in-memory data storage. For example, the in-memory data storage can be considered a "base" hypercube that includes a (e.g., large) number of available dimensions, where each dimension can include a large number of members. In an exemplary embodiment, the base cube is an N-dimensional online analytic processing (OLAP) cube.

An illustrative non-limiting example of a forecasting operation that can be performed by the model-based forecaster 4040 is forecasting the number of employees that will resign in a particular (future) month of a plan. The model engine 4041 may retrieve a forecasting model 4044 for resignation rate, which may indicate that the number of resignations is equal to the number of employees in the preceding month of the plan multiplied by the assumed resignation rate for the month in question. Responsive to the forecasting model 4044, the model engine 4041 may determine the number of employees in the preceding month and the assumed resignation rate from the month in question. For example, such data may be retrieved from the storage 4050. The model engine 4041 may then call into one or more of the functions 4043 to determine the product of the number of employees and the assumed resignation rate.

In a particular embodiment, the server framework 4030 performs security functions. For example, the server framework 4030 may store security data that is used plan security. In a particular embodiment, to implement plan security, certain plan components or actions may be bound to specific security levels or enterprise roles. For example, a top organizational level of a workforce plan may be bound to a high security level, to an "Executive" or "Director" role, etc. When a user attempts to view a portion of a plan or perform a specific action, the server framework may determine whether the meets the needed security level or enterprise role. If not, the server framework may return an error message to the requesting WFP client instance 4010.

In some examples, organizational security may be applied on the basis of the organization(s) that a user has access to. For example, a planner in a "Products" organization may have access to products-related planning, but may not have access to plan information for a "Legal" organization. The security data maintained by the server framework 4030 may indicate that a user has access to planning information for the user's organization and organizations descending from the user's organization.

FIG. 40 thus illustrates a system architecture that is operable to support a WFP framework/application. It should be noted, however, that in alternative embodiments different hardware and/or software components may be used as part of the WFP framework/application.

Figure 41:
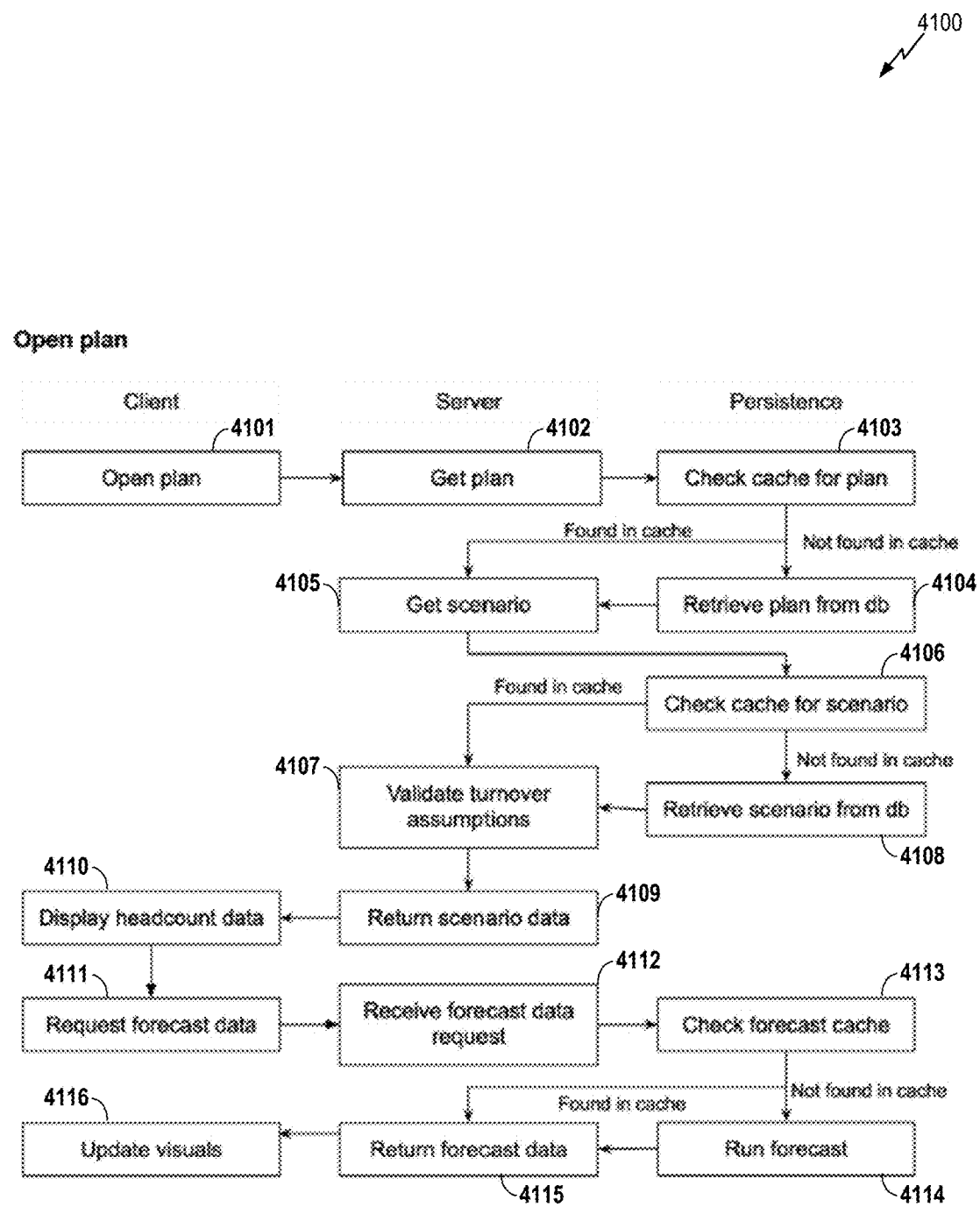
FIG. 41 illustrates a particular method of operation at a workforce planning application.

FIG. 41 illustrates a particular embodiment of a method 4100 of operation when a plan is opened. The method 4100 includes operations performed by a client (e.g., the client instance 112, 122, or 4010), operations performed by a server (e.g., the WFP engine 130 or the server framework 4030), and operations performed at or based on persistent storage (e.g., the client data 133 or the storage 4050).

At 4101, the client may request to open a specific plan. At 4102, the server may attempt to retrieve the plan e.g., data corresponding to the plan). Initially, at 4103, a cache (e.g., the caches 4051) may be examined to check if the requested plan is cached. If the requested plan is found in the cache, the method 4100 advances to 4105, where the server attempts to retrieve data for a default or user-defined scenario of the plan. If the requested plan is not found in the cache, the requested plan is retrieved from a database (e.g., the database 4054), at 4104.

Continuing to 4106, the server may check whether the requested scenario is cached. If so, the method advances to 4107. If not, the scenario data is retrieved from the database, at 4108. The server may then validate turnover assumptions, at 4107, and return scenario data to the client, at 4109. As an illustrative non-limiting example, validating a turnover assumption may include verifying that the dimensions and the time span of turnover assumption are compatible with the dimensions and the time span of the plan. At 4110, the client may display headcount data. For example, the headcount data may be displayed in a grid visualization, as described with reference to FIG. 5.

At 4111, the client may generate a request for forecast data (e.g., a request for the model-based forecaster 4040 to perform a specified forecasting operation). The server may receive the forecast data request, at 4112, and check a forecast cache (e.g., the forecast cache 4053) for the requested forecast data, at 4113. If the forecast data is not cached, the forecasting operation may be executed, at 4114, and the resulting forecasting data may be stored in the forecast cache for subsequent retrieval. If the requested forecast data is cached, the server may retrieve the cached forecast data, at 4115, without running the forecast operation. Continuing to 4116, the client may update one or more visualizations based on the received forecast data.

Figure 42:
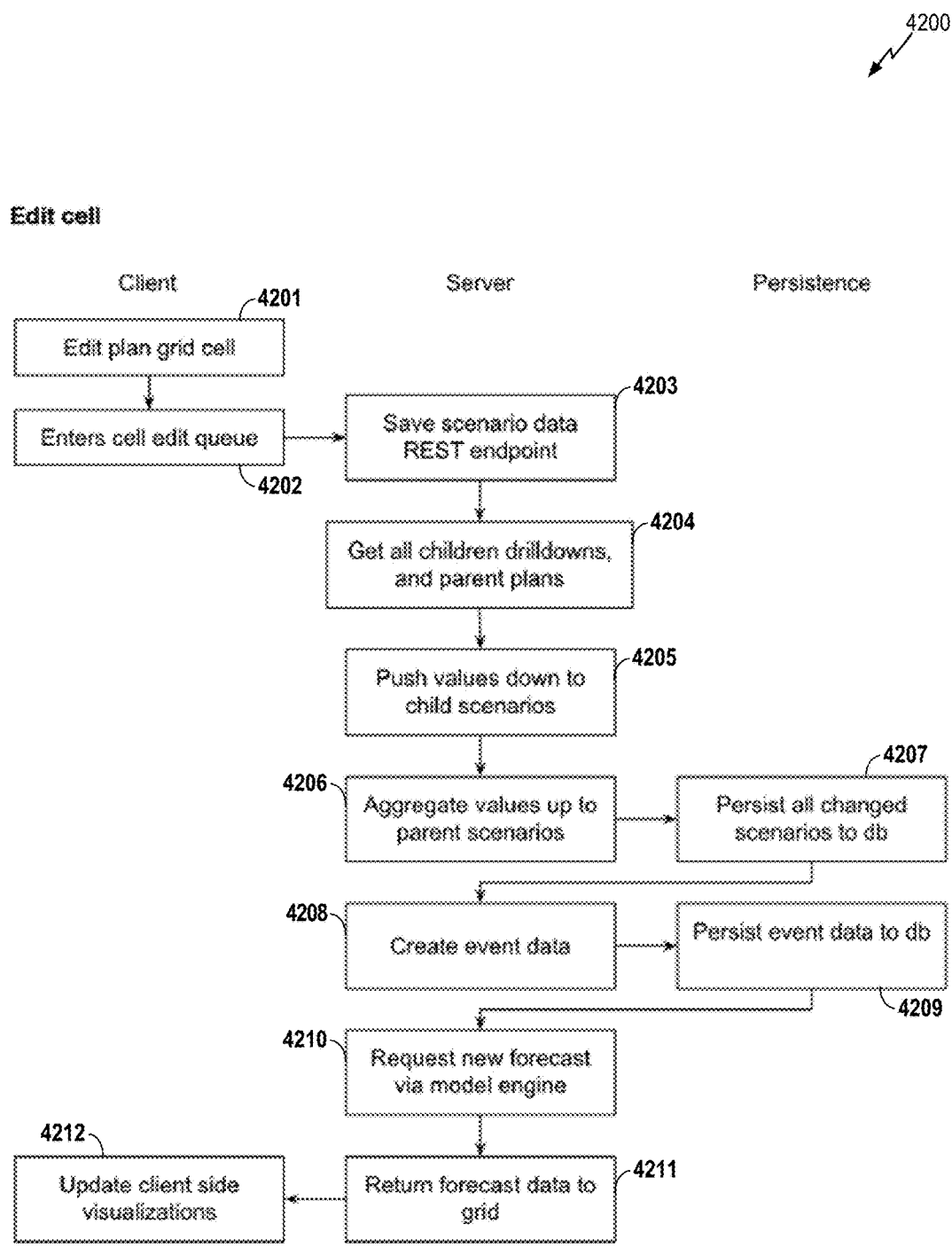
FIG. 42 illustrates another particular method of operation at a workforce planning application.

FIG. 42 illustrates a particular embodiment of a method 4200 of operation when a cell of a plan is edited. The method 4200 includes operations performed by a client (e.g., the client instance 112, 122, or 4010), operations performed by a server (e.g., the WFP engine 130 or the server framework 4030), and operations performed at or based on persistent storage (e.g., the client data 133 or the storage 4050).

At 4201, the client may receive user input that edits the value in a cell of a plan. Alternatively, the cell may be edited based on a previous planning operation, such as a fitting operation, a freeze hiring operation, etc. The client may insert the cell in an edit queue, at 4202. The client may notify the server regarding editing operations for cells in the edit queue when the client and/or server is idle, one-cell-at-a-time, in batched requests corresponding to multiple cells, in some other fashion, or any combination thereof. In a particular embodiment, to avoid issuing a request each time a cell is edited, the client may store edits that occur during a particular time period and may send an aggregate list of the edits at the end of the time period.

Advancing to 4203, the server may detect entry into a "save scenario data" REST endpoint. The server may retrieve all child "drilldowns" and parent plans, at 4204, and push values down to child scenarios, at 4205. Within a plan, for row positions that end in a member of multi-level dimension, the WFP application may allow the user to "drilldown" to expand members of a selected row to the next level of the multi-level dimension. For example, a "Canada" row may be expanded into "Toronto," "Vancouver," and "Calgary" rows. When a user drills down on a row, the WFP application may create a child plan object. Edits to the child plan object can be aggregated to the top level plan of the drill down hierarchy, and edits to the plan can be distributed to all child drill down plans.

The server may aggregate values up to parent scenarios, at 4206. Changed scenarios may be stored in a database (e.g., the database 4054), at 4207, and the server may create event data describing the scenario edits, at 4208. The event data for a plan/scenario may thus provide an ordered list of actions (e.g., editing actions) that have been applied to the plan/scenario. The event data may be stored in the database, at 4209, and the server may request a new forecast via a model engine, at 4210. For example, due to the change in one or more cells of the plan, new forecasts may be run by the model-based forecaster 4040. The server may return the forecast data to the grid visualization (i.e., the client), at 4211, and the client may update the grid based on the forecast data, at 4212.

In some scenarios, a workforce planner may wish to simulate the addition of a dimension member to the dimensional hierarchy associated with his or her employer. For example, the workforce planner may want to use a workforce plan, as described above, to forecast and adjust headcounts, costs, etc. associated with opening a new office in a new location (e.g., Bangalore, India). In current spreadsheet-based workforce planning systems, the planner would need to manually insert rows for "Bangalore" in various locations of the spreadsheet and then manually track headcount totals. Moreover, if the company ends up opening an office in another city instead (e.g., Kochi, India), the planner would need to manually change all of the Bangalore rows to Kochi rows and manually insert Kochi data into the rows. If the planner was collaborating with other planners that are using the same or other spreadsheets, each of the spreadsheets would need to be manually consolidated to maintain data integrity, which can be a frustrating and time-consuming process. For example, each planner, sub-planner, etc. may receive an e-mail indicating that a Kochi office was opened instead of a Bangalore office, and then each planner, sub-planner, etc. would need to manually update their spreadsheets.

If a sub-planner has inserted rows called "India Office" instead of "Bangalore," it may be unclear whether the "India Office" is the same as "Bangalore," and then "Kochi." Spreadsheet macros and formulae that depend on row labels may cease functioning correctly if consistency is not maintained.

Figure 43:
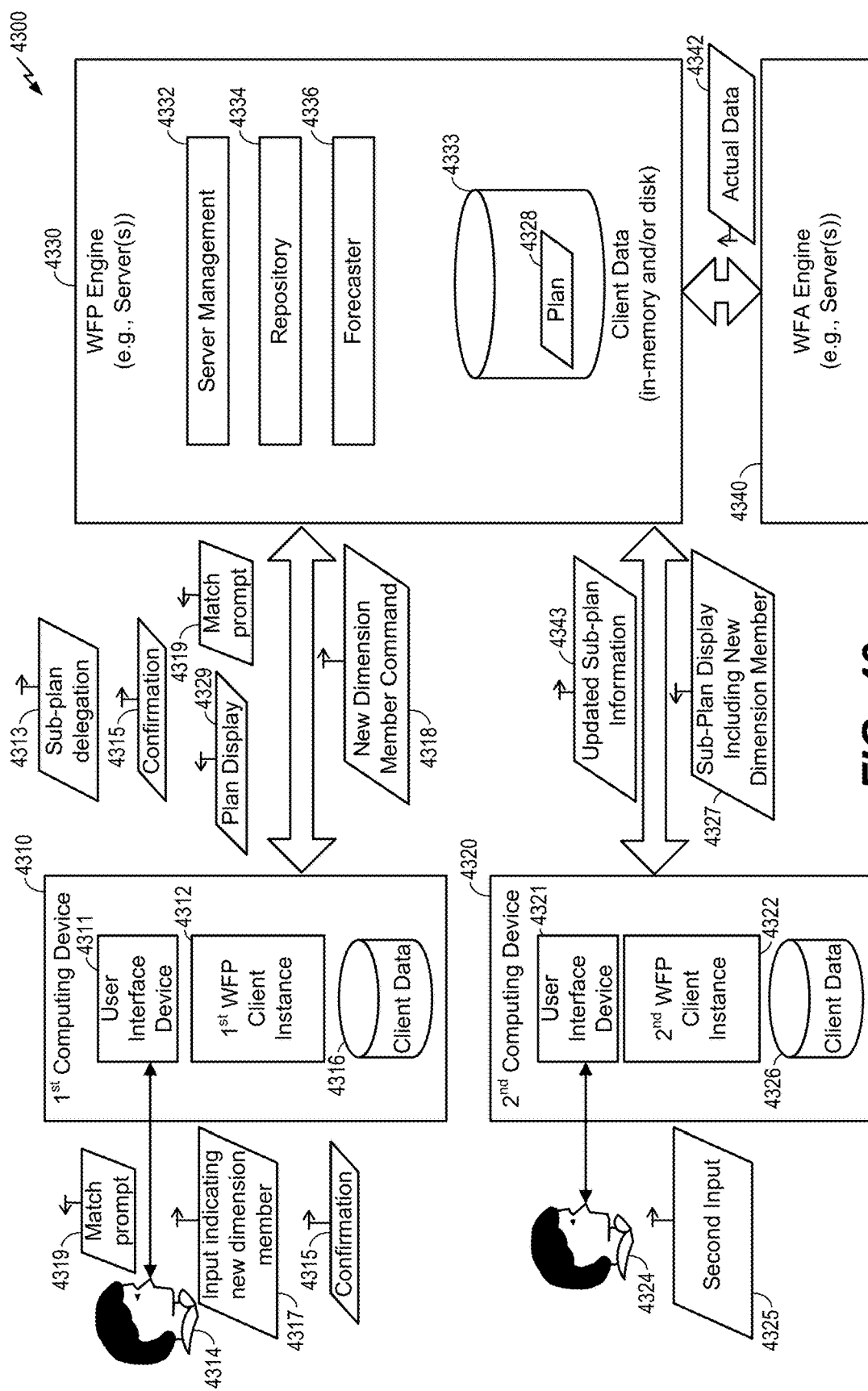
FIG. 43 illustrates another particular embodiment of a system including a workforce planning application.

In contrast, the techniques of the present disclosure provide a WFP application that enables manageable and consistent addition and reconciliation of "new" dimension members, such as "Bangalore" in the above example. FIG. 43 illustrates a particular embodiment of a system 4300 including a WFP application. The WFP application may be a web application as described above with reference to FIG. 1, and one or more components of the system 4300 may perform operations described with reference to corresponding components of the system 100 of FIG. 1. The WFP application may be a client-server application, where a server portion of the WFP application is executed by a WFP engine 4330. The WFP engine 4330 may correspond to the WFP engine 130 of FIG. 1. The WFP engine 4330 includes a server management module 4332, a repository 4334, and a forecaster 4336 that may correspond to, and operate as described with respect to, the server management module 132, the repository 134, and the forecaster 136 respectively. The WFP engine 130 stores client data 4333 that may correspond to the client data 133.

The system 4300 further includes a first computing device 4310 executing a first instance 4312 of a WFP application client and a second computing device 4320 executing a second instance 4322 of the WFP application client. The computing devices 4310, 4320 may include desktop computers, laptop computers, tablet computers, mobile phones, or any other type of computing device. The first computing device 4310 may include or be coupled to a first user interface device 4311. The first user interface device 4311 may include a mouse, a keyboard, a display device, a touch screen, any other type of input/output device, or a combination thereof. In the illustrated example, a first user 4314 may interact with the first computing device 4310 generally and the first instance 4312 of the WFP application in particular via the first user interface device 4311. The first computing device 4310 further stores first client data 4316. The first client data 4316 may include data associated with the first instance 4312 of the WFP application client and may be stored in a memory, such as a solid state drive or a hard drive, of the first computing device 4310.

The second computing device 4310 may include or be coupled to a second user interface device 4321. The second user interface device 4321 may include a mouse, a keyboard, a display device, a touch screen, any other type of input/output device, or a combination thereof. In the illustrated example, a second user 4324 may interact with the second computing device 4320 generally and the second instance 4322 of the WFP application client in particular via the second user interface device 4321. The second computing device 4320 further stores second client data 4326. The second client data 4326 may include data associated with the second instance 4322 of the WFP application and may be stored in a memory, such as a solid state drive or a hard drive, of the second computing device 4320.

The system 4300 further includes a workforce analytics (WFA) engine 4340. The WFA engine 4340 may provide "actual" data to the WFP engine 4330 for use in workforce plans. "Actual" data may be data that is measured and verified. For example, in the context of workforce planning, actual data may be measured employee headcounts during particular points in time. Thus, actual data may be contrasted from forecasted data, such as forecasted employee headcounts for future points in time.

In operation, the WFP engine 4330 may generate workforce plans based on the client data 4333 and based on interactions with the instances 4312, 4322 of the WFP application, as explained with reference to FIGS. 1-42. The WFP engine 4330 may also update workforce plans based on actual data received from the WFA engine 4340. For example, if a workforce plan created on January $1^{st}$ is reopened on April $1^{st}$, the WFP engine 4330 may update the workforce plan with actual data for January, February, and March.

The WFP application as illustrated in FIG. 4300 may support addition of "arbitrary" dimension members to a workforce plan. An arbitrary dimension member may be a new member of a dimension of a workforce plan, where the new member is not being tracked by the WFA engine 4340 because the new member does not "actually" exist in client data. For example, on a workforce plan for the year 2015 may include forecasted employee headcounts for a company's Vancouver and Chicago offices, i.e., may include "Vancouver" and "Chicago" dimension members of a "Location" dimension. If the company plans on opening an offshore Bangalore office, then the workforce plan may include an "arbitrary" "Bangalore" member of the "Location" dimension. Because an office in Bangalore does not actually exist yet, the WFA engine 4340 does not track any data for Bangalore. Thus, arbitrary members may be used by the WFP application of the present disclosure to simulate the addition of new dimension members to the existing dimensional hierarchy tracked by the WFA engine 4340.

Arbitrary members may be added by any of the instances 4312, 4322 and may be propagated to sub-plans of the workforce plan, such as the sub-plans described with reference to FIGS. 30-39. Further, data associated with arbitrary members added in a sub-plan of the workforce plan may be consolidated with data of the workforce plan, as further described herein. In addition, the WFP engine 4330 may reconcile (e.g., match) arbitrary members to dimension members received in actual data from the WFA engine 4340, as further described herein.

To illustrate, the WFP engine 4330 may send a plan display 4329 (e.g., a GUI) representing a workforce plan 4328 to the first instance 4312 of the WFP application client. The workforce plan 4328 may correspond to a multidimensional data set. The workforce plan 4328 may be stored in the client data 4333 of the WFP engine 4330, as shown. The workforce plan 4328 may include a dimensional hierarchy indicating dimensions, dimension levels, and relationships between dimension levels of different dimensions. To illustrate, the dimensional hierarchy may indicate the workforce plan includes data related to dimension members of a "level 1 reporting" level of an "organization" dimension (as described with reference to FIGS. 2-3) and data related to dimension members of a "city" level of a "location" dimension. The dimensional hierarchy may further indicate that data for each level 1 organization may be organized across one or more cities in which the level 1 organization has employees).

The first client instance 4312 may display the plan display 4329 via the first user interface device 4311 (e.g., to the first user 4314). The plan display 4329 may include a grid, as described with reference to FIG. 5, in which data related to the workforce plan 4328 is displayed according to the dimensional hierarchy. For example, a horizontal axis of the grid may correspond to time and a vertical axis of the grid may include rows for each level 1 reporting organizations, each such row having sub-rows for each city in which the level 1 reporting organization has employees. An example, of the plan display 4329 is described below with reference to FIG. 44.

The first client instance 4312 may receive input 4317, via the first user interface device 4311, indicating a first dimension member (e.g., an arbitrary member) to be added to the workforce plan 4328. The first dimension member may correspond to a "dimension: dimension level" combination included in the dimensional hierarchy of the workforce plan 4328. For example, the first dimension member may correspond to a new city (e.g., the "Location: city" dimension/dimension level combination) where the first user 4314 believes the company will open an office. For example, if the company plans on opening an office in Bangalore during the time period for which the workforce plan 4328 has forecasted headcounts, then the first dimension member may be "Bangalore," which corresponds to the combination "Location: City."

The first client instance 4312 may send a new dimension member command 4318 describing the first dimension member to the WFP engine 4330. The new dimension member command 4318 may include a label of the new dimension member (e.g., "Bangalore"). The new dimension member command 4318 may also identify specific rows of the grid in which the first dimension member is to be added as a sub-row. To illustrate, a Bangalore sub-row may be added to a Sales row in the grid if the company plan on hiring Sales employees in Bangalore. In response to the new dimension member command 4318, the WFP engine 4330 may add the first member to the workforce plan 4328 and may automatically generate data for the first dimension member, as further described below. For example, for the Sales organization, cost information (e.g., cost of new hire) for Bangalore may be automatically set to the aggregate cost information for the Sales organization (e.g., average cost of new hire across the cities in which the Sales organization has employees). Forecasted headcounts for the Bangalore location may be set to zero. In alternative examples, the WFP engine 4330 may automatically generate the data (e.g., cost information or headcount information) based on one or more assumptions or models (e.g., headcount assumptions/headcount models or cost assumptions/cost models), as described above. In addition, the WFP engine 4330 may support a user manually overwriting the automatically generated data (e.g., based on input from one or more of the client instances 43212, 4322).

The first dimension member and the automatically generated data may be stored in the client data 4333. In addition or in the alternative, data for the first dimension member may be received (e.g., as part of the new dimension member command 4318) from one or more of the client instances 4312, 4322 and stored in the workforce plan 4328. Such data may correspond to "predictions" or forecasted values for the first dimension member.

Client instances that access the workforce plan 4328, or sub-plans thereof, may receive the workforce plan 4328, or the sub-plans, including the first dimension member and the automatically generated and/or received data values. For example, GUIs displayed by the client instances may include sub-rows for Bangalore under one or more level 1 organization rows, as shown in FIG. 44.

For example, the second client instance 4322 may receive a sub-plan display 4327 (e.g., a GUI) including the new dimension member. To illustrate, a sub-planner (e.g., the second instance 4322 of the WFP application client) may be responsible for a sub-plan corresponding to a particular level 1 organization, such as "Products." The "Products" sub-plan may have been created and delegated to the sub-planner by the WFP engine 4330 in response to a sub-plan delegation message 4313 from a manager or owner of the workforce plan 4328, as described with reference to FIGS. 30-39.

As shown in FIG. 43, the plan delegation message 4313 may be generated by the first client instance 4312 in response to input from the first user 4314. The sub-plan display 4327 may include a second grid corresponding to the sub-plan. The second grid may include a row corresponding to the Bangalore dimension member. The sub-plan may have a second dimensional hierarchy.

The second client instance 4322 may display the sub-plan display 4327 via the second user interface device 4321. The second client instance 4322 may receive second input 4325, including data values associated with dimension members included in the sub-plan and/or new arbitrary members to be added to the sub-plan. The second instance 4322 of the WFP application client may send updated sub-plan information 4343 based on the second input 4325 to the WFP engine 4330.

The updated sub-plan information 4343 may include an additional arbitrary dimension member. For example, as shown and further described with reference to FIG. 48, the additional arbitrary dimension member may be a "New India Ops" dimension member of a "Role" dimension (as shown in FIG. 48, the sub-plan may also include rows corresponding to existing members of the "Role" dimension, such as "Developer" and "Tester"). In a particular embodiment, the second input 4325 indicates that an arbitrary dimension member is to be added to another arbitrary dimension member. For example, as shown in FIG. 48, the "New India Ops" member is added as a sub-row for "Bangalore."

The WFP engine 4330 may add the additional arbitrary member (e.g., "New India Ops") to the sub-plan. The WFP engine 4330 may also automatically generate values associated with the additional arbitrary member. Subject to approval by the owner of the main workforce plan 4328, as further described with reference to FIGS. 30-39, the WFP engine 4330 may consolidate any values associated with the additional arbitrary member (either automatically generated or received from the second instance 4322 of the WFP application) with the workforce plan 4328. For example, the WFP engine 4330 may determine whether the dimensional hierarchy of the workforce plan 4328 includes the dimension and dimension level associated with the additional arbitrary dimension member "New India Ops." To illustrate, if the dimensional framework of the workforce plan 4328 already includes "Role," the WFP engine 4330 adds sub-rows for "New India Ops" under "Bangalore" for the "Products" organization. When the sub-plan is consolidated with the main workforce plan 4328, headcount values for "New India Ops" may be added to the aggregate headcount for "Bangalore."

In the example of FIG. 49, however, the dimensional framework of the workforce plan 4328 does not include "Role." In this case, the WFP engine 4330 updates dimension members of the ancestor "Bangalore" row. To illustrate, the WFP engine 4330 may add headcount values associated with "New India Ops" to the headcount values of "Bangalore". Thus, values of the grid associated with the workforce plan 4328 may be consolidated with updated sub-plan data regardless of whether updated sub-plan data includes additional arbitrary dimension members and regardless of whether the dimensional framework of the sub-plan differs from the dimensional framework of the workforce plan 4328.

The system 4300 further supports reconciling arbitrary members with received actual data. For example, the WFP engine 4330 may receive actual data 4342 from the WFA engine 4340. The WFP engine 4330 may store the actual data 4342 in the client data 4333. The actual data 4342 may include historical values for one or more dimension members of the workforce plan 4328. For example, the actual data 4342 may include headcount values for reporting organizations by city.

The actual data 4342 may also include data for a second dimension member (or more dimension members) that is not included in the workforce plan 4328. For example, even though the company planned on opening a new office in Bangalore and hiring Products and Sales employees in the Bangalore office, the company may have instead opened the office in Kochi. In this case, the actual data 4342 may include headcounts (and other data) for the Kochi office. To illustrate, the actual data 4342 may include headcounts for Products and Sales employees in Kochi. In this case, there is no exact match for the arbitrary dimension member in the workforce plan 4328, i.e., "Bangalore," in the actual data 4342. Similarly, there is no exact match for "Kochi" in the workforce plan 4328.

To initiate a reconciliation process, the WFP engine 4330 may identify potential matches for "Kochi" by determining which (if any) arbitrary members of the workforce plan 4328 belong to the same dimension (e.g., "Location") and hierarchical dimension level (e.g., "City") as "Kochi." For example, the WFP engine 4330 may determine that "Bangalore" is a candidate match for "Kochi" because "Bangalore," like "Kochi," is a member of the "Location" dimension and located at the "City" level of the dimensional hierarchy for the "Location" dimension. The WFP engine 4330 may generate a match prompt 4319 identifying each potential match for "Kochi" and send the match prompt 4319 to the first client instance 4312. In some examples, the match prompt 4319 may be sent to the first client instance 4312, but not the second client instance 4322, based on the first client instance 4312 being associated with a manager (e.g., owner) of the workforce plan 4328.

The first client instance 4312 may display the match prompt 4319 via the user interface device 4311 as part of a GUI. In response to the match prompt 4319, the first instance 4312 may receive confirmation input 4315 (e.g., from the first user 4314) via the first user interface device 4311 indicating that "Kochi" matches the "Bangalore," i.e., the company opened a Kochi office instead of a Bangalore office. The first client instance 4312 may send the confirmation input 4315 to the WFP engine 4330. In response to the confirmation input 4315, the WFP engine 4330 may store data that maps "Kochi" to "Bangalore." Rows (or sub-rows) labeled "Bangalore" may relabeled "Kochi," as shown and further described with reference to FIGS. 52-53. The mapping data may be applied to any sub-plans and/or parent plans of the workforce plan 4328 as well. For example, when the "Products" sub-plan is opened, as shown in FIG. 53, the "Bangalore" row is relabeled "Kochi." Furthermore, the headcounts (and other data) for "Kochi" in the actual data 4342 is written to the relabeled rows.

Thus, the system 4300 supports the addition of arbitrary dimension members to a workforce plan, collaborating based on the arbitrary dimension members, and reconciling the arbitrary dimension members with incoming actual data.

Referring to FIG. 44, example GUIs 4402, 4412 that may be displayed by an instance of a WFP application client (e.g., the first client instance 4312) are shown. FIG. 44 shows a first GUI 4402 that may correspond to the plan display 4329 and may display the grid associated with the workforce plan 4328. As shown in FIG. 44, the grid includes rows associated with dimension members of the workforce plan 4328 and columns corresponding to time periods (e.g., months). Each cell of the grid may thus display a value (e.g., headcount) for the corresponding organization and/or city for the corresponding time period.

In the example of FIG. 44, a first column corresponding to December 2013 is a different color than the remaining columns, indicating that the values in the first column are actual historical values that were measured and received from the WFA engine 4340, while the remaining columns include predicted/forecasted values. In the example of FIG. 44, a first row 4404 corresponds to the "Products" organization and includes various sub-rows, such as a first sub-row 4406 for "Vancouver." For example, in December 2013, the Products organization included 400 employees, 300 of whom were employed in Vancouver.

FIG. 44 further shows a second GUI 4412 after the arbitrary dimension member "Bangalore" has been added. For example, the second GUI 4412 may correspond to the grid representing the workforce plan 4328 after the new dimension member command 4318 is sent to the WFP engine 4330.

In a particular embodiment, a new arbitrary member (e.g., "Bangalore") may be added to the workforce plan 4328 by specifying a name and one or more parent rows that the new arbitrary member belongs to. Row(s) for each newly added arbitrary member may be initialized based on data for one or more other rows of the workforce plan 4328, as further described with reference to FIG. 45. Historical values for a new arbitrary member row may be initialized as empty cells to indicate that historical data for the arbitrary member does not exist in the WFA engine 4340 (e.g., because a "Bangalore" office does not actually exist.

To illustrate, in January 2014, the WFP engine 4330 may receive input adding "Bangalore" as an arbitrary new member under "Products." The WFP engine 4330 may add the arbitrary new member "Bangalore" to the workforce plan 4328 and may initialize the forecasted headcounts for "Bangalore" under "Products" with a headcount of 0 (e.g., for January 2014, February 2014, etc.). The WFP engine 4330 may initialize a new hire cost for the "Bangalore" row using December 2013 historical data for the "Products" organization as a whole, as further described with reference to FIG. 45. In alternative examples, the WFP engine 4330 may automatically generate the data based on one or more assumptions or models (e.g., cost assumptions or cost models), as described above. In addition, the WFP engine 4330 may support (e.g., a user manually) overwriting the automatically generated data (e.g., based on input from one or more of the client instances 43212, 4322). The actual headcount for December 2013 in "Bangalore" may be initialized to an empty cell, as shown. Once the "Bangalore" row is added under "Products," "Bangalore" may be automatically displayed as an available arbitrary dimension member than can be added under other rows (e.g., "Sales," as shown in FIG. 44).

Referring to FIG. 45 another GUI 4502 that may be displayed by an instance of a WFP application client (e.g., the first client instance 4312) is shown. The GUI 4502 may be an alternate view of the grid depicted in the GUI 4412. The GUI 4502 displays values of the new hire cost per headcount measure. The GUI 4502 includes a first parent row 4414, a first child row 4416, a second parent row 4418, and a second child row 4420. The GUI 4502 illustrates that the WFP engine 4330 may initialize particular measure values for a child row based on the corresponding parent row. For example, forecasted values for "Bangalore" are the same as the forecasted values for the corresponding parent row "Products" or "Sales," as shown.

When the WFP engine 4330 adds a new arbitrary member (e.g., "Bangalore") to the workforce plan 4328, the WFP engine 4330 may generate a unique dimension member and save the unique dimension member to a "plan group" associated with the workforce plan 4328. The plan group for the workforce plan 4328 may include, in addition to the workforce plan 4328, all sub-plans of the workforce plan 4328 (and may optionally include any additional descendant levels, e.g., sub-plans of the sub-plans, etc.) and all ancestor plans of the workforce plan 4328 (and may optionally include any additional ancestor levels, e.g., ancestor plans of the ancestor plans). The plan group may be included in the client data 4333. The WFP engine 4330 may save the new arbitrary member in the plan group (e.g., in a data structure associated with the plan group), so that the new arbitrary dimension member is available for use in any plan of the plan group. Thus, storing arbitrary dimension members in a plan group as opposed to individual plans may enable automatic incorporation of arbitrary dimension members across multiple plans of a plan group. When an arbitrary dimension member is reconciled with actual data (e.g., when Bangalore is reconciled with Kochi), the mapping between Bangalore and Kochi may also be stored for the plan group rather than individual plans, so Bangalore data can be automatically replaced by Kochi data in other plans of the plan group. Thus, the present disclosure can enable a plan owner to perform reconciliation of arbitrary members and then automatically reconciles data for sub-plans while preventing sub-planners from redefining reconciliation mapping (e.g., mapping Bangalore to some other city instead of Kochi), thereby maintaining mapping consistency between plans of a plan group.

In a particular embodiment, an arbitrary member may be deleted from a plan group until the arbitrary member is reconciled with actual data (e.g., a mapping for the arbitrary member is stored in the plan group). After reconciliation, arbitrary members may be locked from deletion. Thus, in the example illustrate, a user may be able to delete "Bangalore" until the mapping to "Kochi" is established. Once the mapping is established, the user may no longer be able to delete "Bangalore" (or remove "Kochi" from the workforce plan 4328).

In a particular embodiment, the unique dimension member that represents an arbitrary member may have a display name (e.g., "Bangalore") and a unique member identifier (ID). The unique member ID may be determined by the WFP engine 4330 based on a dimension that the unique dimension member belongs to (e.g., "Location") and a randomly generated globally unique identifier (GUID). In an illustrative example, the unique member identifier has the following format: [DimensionId].[GUID] (e.g., [Location].[b286cb0514bc4a62a8a757925bf5e509].

In addition to adding the arbitrary member to the plan group, the WFP engine 4330 may add arbitrary member rows to a list of "promoted rows" in the workforce plan 4328. As used herein a "promoted row" is a row that is explicitly defined to be included in the grid associated with the workforce plan 4328, even if the data for the promoted row is empty or all zeros. For example, both child rows 4416, 4420 may be added to the workforce plan 4328 as promoted rows, so that the child rows 4416, 4420 are displayed, as shown in FIG. 44, even though the child rows 4416, 4420 have zero headcounts, as shown in FIG. 44.

In a particular embodiment, the list of promoted rows is saved as a list of row keys. A row key may be an ordered list of dimension member IDs that indicates the corresponding row's position within the workforce plan 4328. For example, a row key for the first child row 4416 may be:

[Org].[Products],[Location].

[b286cb0514bc4a62a8a757925bf5e509]

where "b286cb0514bc4a62a8a757925bf5e509" is the GUID. A row key for the second child row 4420 may be:

[Org].[Sales],[Location].

[b286cb0514bc4a62a8a757925bf5e509]

The same GUID is used in the above examples because both row keys correspond to the same arbitrary dimension member "Bangalore." After the WFP engine 4330 updates the plan group with new arbitrary member(s) and the workforce plan 4328 with the list of promoted row keys, the WFP engine 4330 may perform a process for updating a structure of the workforce plan 4328, as described below with reference to FIGS. 46 and 47.

Figure 46:
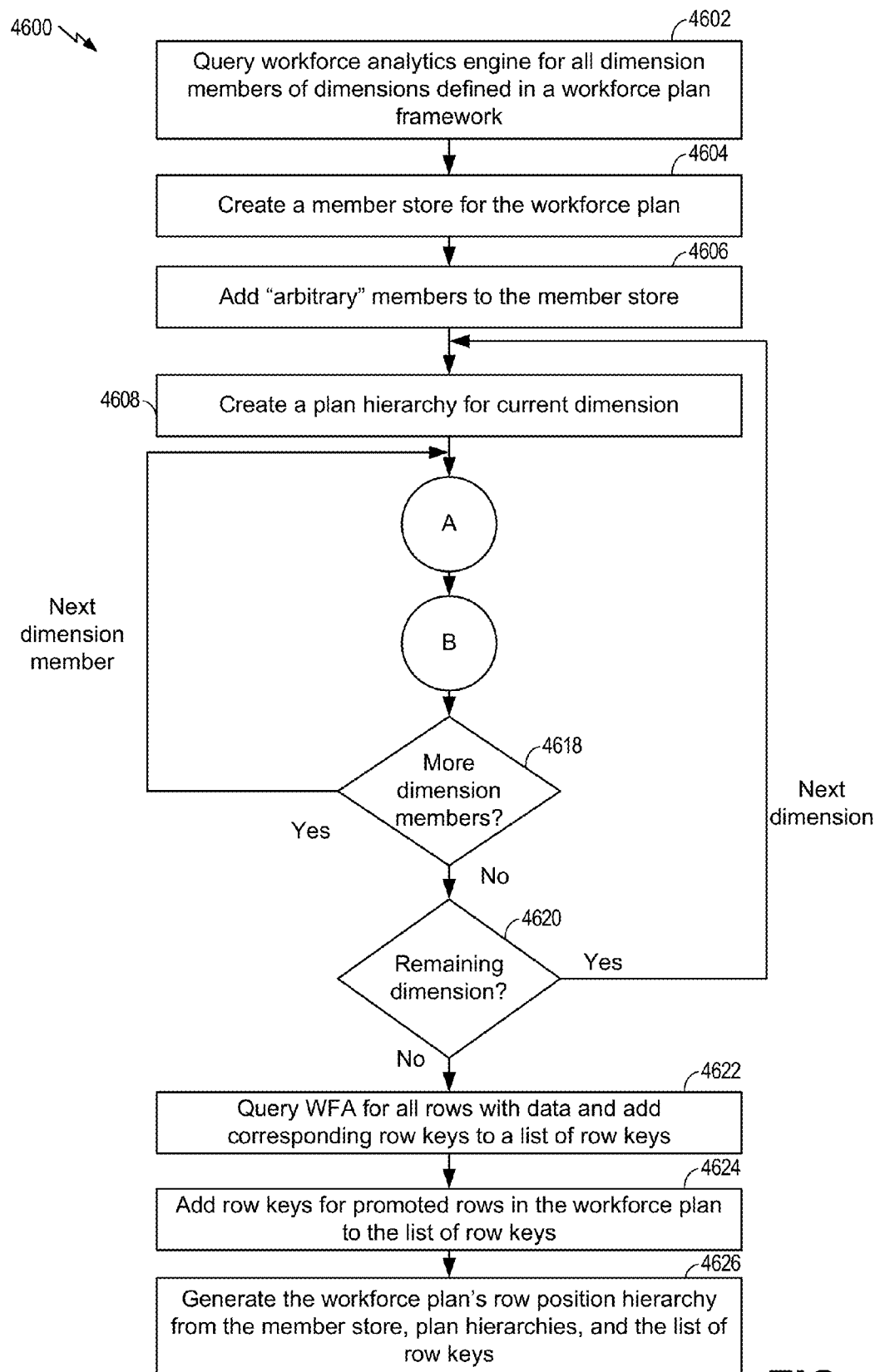
FIG. 46 illustrates a first part of a particular embodiment of a method of operation at a workforce planning application.
Figure 47:
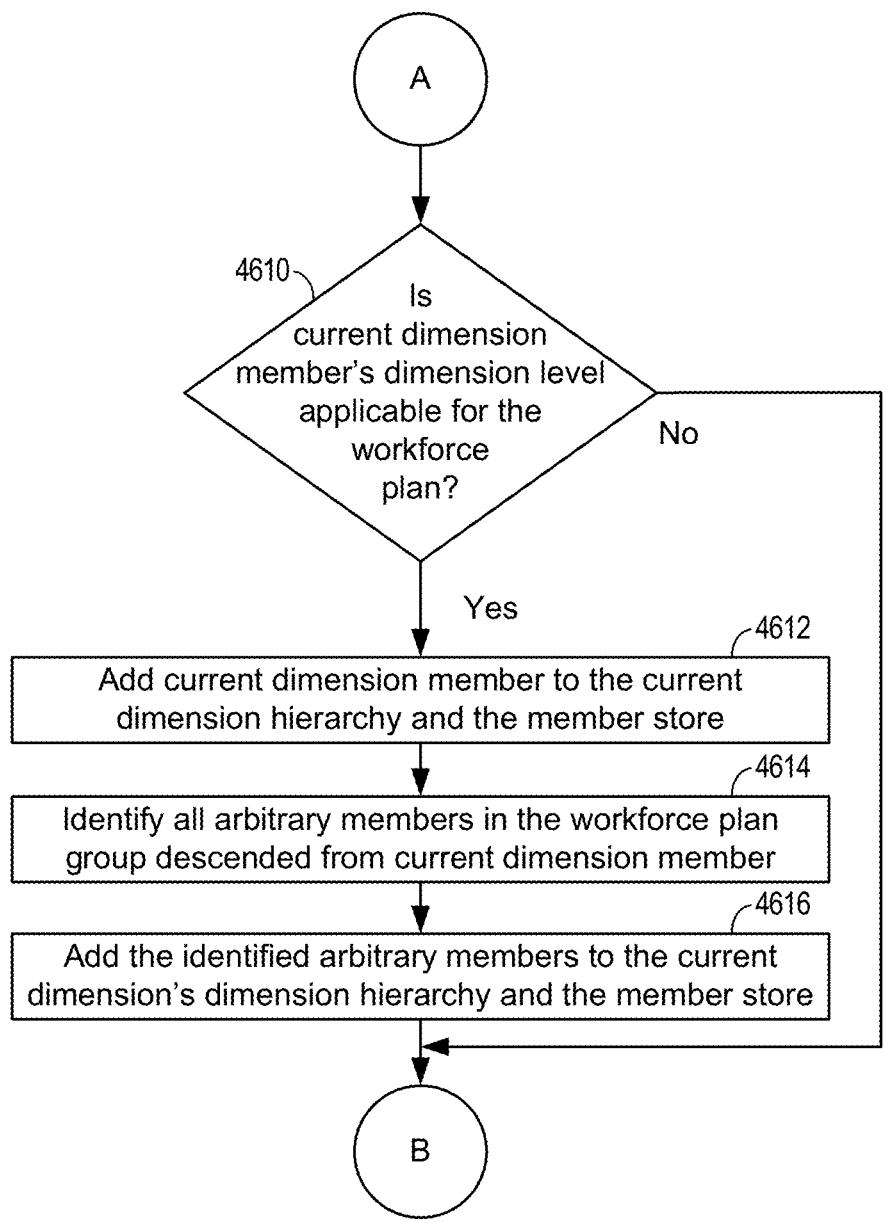
FIG. 47 illustrates a second part of the method of FIG. 46.

Referring to FIGS. 46 and 47 a method 4600 of updating a plan structure of a workforce plan is shown. The method 4600 may be performed by a WFP engine, such as the WFP engine 4330, such as after new arbitrary member(s) have been added to a workforce plan, such as the workforce plan 4328.

The method 4600 includes querying a WFA engine for all dimension members of dimensions defined in a workforce plan framework, at 4602. For example, the WFP engine 4330 may query the WFA engine 4340 for a list of all dimension members tracked by the WFA engine 4340 that are members of dimensions included in the dimensional framework of the workforce plan 4328. It should be noted that the list of all dimension members may include dimension members that belong to dimension levels are not in the workforce plan 4328. For example, if the "Location" dimension includes a "Country" level and a "City" level, the list may include countries (e.g., Canada, USA, etc.) as well as cities in those countries (e.g., Vancouver, Chicago, New York, etc.), regardless of whether any particular country or city (or the Country level or City level) is included in the workforce plan.

The method 4600 further includes creating (e.g., allocating) a member store for the workforce plan, at 4604, and adding arbitrary members to the member store, at 4606. The member store may be a "flat" data structure that will eventually store all arbitrary and non-arbitrary dimension members included in the workforce plan. For example, in the case of the workforce plan 4328, the member store may be allocated at step 4604, and may eventually store "Products," "Sales," "Chicago," "Vancouver," and "Bangalore" (which may subsequently be reconciled with "Kochi," as further described herein).

The method 4600 further includes iteratively processing dimension hierarchies for each dimension of the dimensional framework of the workforce plan. For example, at 4608, the method 4600 includes creating (e.g., allocating) a plan hierarchy for a "current" dimension. Continuing to FIG. 47, the method 4600 may iteratively process all dimension members of the "current" dimension. For example, if the "current dimension" is "Location," the method 4600 may include, at 4610, determining whether a "current" dimension member's level is applicable for the workforce plan. To illustrate, if the "current" dimension member is a country, then the level would not be applicable to the workforce plan 4328, because the workforce plan 4328 only includes cities, not country. Thus, for countries, the method 4600 may advance to 4618.

Conversely, for a city, such as "Bangalore," the method 4600 may advance to 4612, which includes adding the current dimension member to the member store and the plan hierarchy for the "Location" dimension (which as allocated at step 4608). The method 4600 may also include identifying all arbitrary members in the workforce plan that are descendants of the current dimension member, at 4614, and adding such arbitrary members to the plan hierarchy and the member store, at 4616. In a particular embodiment, if a dimension member already exists in the member store, "adding" the dimension member to the member store again does not result in duplicative storage of the dimension member (i.e., dimension members are stored only once in the member store).

Returning to FIG. 46, the method 4600 includes determining, at 4618, whether there are remaining dimension members in the "current" dimension to process according to the steps shown in FIG. 47. If so, the method 4600 returns to 4610 for the next such dimension member. If not, the method 4600 includes determining whether there is any remaining dimension to be processed, at 4620. If so, the method 4600 returns to 4608. Otherwise, the method 4600 includes querying the WFA engine for all rows with data and adding the row keys of such rows to a list of row keys, at 4622. For example, the WFP engine 4330 may query the WFA engine 4340 for all rows (corresponding to members in the member store) for which the WFA engine 4340 has data. The WFP engine 4330 may receive a list of row keys from the WFA engine 4340 and may add the row keys to a list of row keys.

The method 4600 further includes adding row keys for promoted rows in the workforce plan to the list of row keys, at 4624. For example, the WFP engine 4330 may add the list of promoted rows, as described above, to the list of row keys. The method 4600 further includes generating the workforce plan's row position hierarchy from the member store, the plan hierarchies for each dimension, and the list of row keys, at 4626. For example, the WFP engine 4330 may generate a row position hierarchy for the workforce plan 4328 based on the member store, the plan hierarchies of dimensions of the workforce plan 4328 (i.e., "Reporting Organization" and "Location," and the list of row keys.

In particular embodiments, the WFP application described herein may enable multiple users to collaborate to work on arbitrary member rows of a workforce plan. A user may add new arbitrary member rows to a plan and create a sub-plan containing those rows. A sub-plan user may then see the new rows and be able to update values of the sub-plan and submit the sub-plan to an owner of the parent plan for consolidation, as described with reference FIGS. 30-39.

Referring to FIG. 48 example GUIs 4802, 4812 that may be displayed by an instance of a WFP application client (e.g., the first client instance 4312 and the second client instance 4322) are shown. A sub-plan GUI 4802 may correspond to the sub-plan display 4327. The sub-plan GUI 4802 may display a sub-plan of the workforce plan 4328 displayed by the GUIs 4402, 4412. In particular, the sub-plan may be a sub-plan detailing the first parent row 4414 (e.g., "Products"). Thus, the sub-plan GUI 4802 illustrates that arbitrary members added to a workforce plan may be included in information displayed by WFP client instances (e.g., the second client instance 4322) that are operating on a sub-plan of the workforce plan.

When the WFP engine 4330 creates a sub-plan for the workforce plan 4328, any promoted rows within the promoted rows list of the workforce plan 4328, within the sub-plan's context and dimensions, are added to the sub-plan's list of promoted row keys. For example, for the Products sub-plan shown in the sub-plan GUI 4802, the context may be [Org].[Products]. The Products sub-plan's dimensions may be Location: City, Role. When a sub-plan is created at a row (e.g., the first child row 4416) corresponding to an arbitrary dimension member (e.g., Bangalore), the sub-plan's context may include the arbitrary member ID of the arbitrary dimension member. For example, the context may be [Org].[Products], [Location].[b286cb0514bc4a62a8a757925bf5e509]. As described above, promoted rows list of the workforce plan 4328 may include entries corresponding to the first child row 4416 and to the second child row 4420. A first row key (e.g., [Org].[Products], [Location].[b286cb0514bc4a62a8a757925bf5e509]) corresponding to the first child row 4416 may be added, by the WFP engine 4330, to a promoted rows list of the Products sub-plan because the first row key is within the Products sub-plan's context (e.g., [Org].[Products]) and because the dimension of the first row key (e.g., "Location") is within the dimensions of the Products sub-plan. The WFP engine 4330 may exclude the second child row 4420 from the Products sub-plan's promoted rows list because a second row key (e.g., [Org].[Sales], [Location].[b286cb0514bc4a62a8a757925bf5e509]) is outside of the Products sub-plan's context. After adding the appropriate promoted row keys from the workforce plan 4328 sub-plan, the WFP engine 4330 may update a plan structure of the sub-plan using the method 4600 described above.

Further, arbitrary rows may be added to sub-plans. For example, FIG. 48 further shows an updated sub-plan GUI 4812 in which an arbitrary sub-row 4814 has been added. In the illustrated example, the arbitrary sub-row 4814 corresponds to an additional arbitrary dimension member "New India Ops" of the "Role" dimension. As explained above, the WFP engine 4330 may consolidate data added in the Products sub-plan with the workforce plan 4328. To consolidate the arbitrary sub-row 4814 with the workforce plan 4328, the WFP engine 4330 may determine whether a dimension and dimension level of the arbitrary dimension member "New India Ops" exits in the dimensional framework of the workforce plan 4328. If the dimension and dimension level of the arbitrary dimension member exist in the workforce plan 4328, the WFP engine 4330 may add the row key associated with the arbitrary sub-row 4814 to the list of promoted rows of the workforce plan 4328. The promoted arbitrary sub-row 4814 row added to the list of promoted rows in the workforce plan 4328 may be an "equivalent row key." The equivalent row key (e.g., [Org].[Products],[Location].[b286cb0514bc4a62a8a757925bf5e509], [Role].[fe3196b21b0742d79e4aa770e23d5204]) may be determined by combining the context of the sub-plan (e.g., [Org].[Products]) with the arbitrary sub-row's 4814 row key in the sub-plan (e.g., [Location].[b286cb0514bc4a62a8a757925bf5e509], [Role].[fe3196b21b0742d79e4aa770e23d5204]). Once the WFP engine 4330 has added appropriate promoted row keys from the sub-plan to the list of promoted rows in the workforce plan 4328, the WFP engine 4330 may copy data in the sub-plan into the corresponding rows in the main workforce plan 4328 and aggregate data up the row hierarchy, as described above.

If the dimension or dimension level of "New India Ops" does not exist in the workforce plan 4328, the WFP engine 4330 may update values of an ancestor row of the arbitrary sub-row 4814 in the workforce plan 4328, as shown in an updated workforce plan GUI 4902 of FIG. 49. In the updated workforce plan GUI 4902, values of the first child row 4416 have been updated by the WFP engine 4330 based on values of the arbitrary sub-row 4814. That is, the forecasted headcount values of 50, 50, and 50 for January, February, and March 2015 corresponding to "New India Ops" in the Products sub-plan have been added to "Bangalore" under "Products" in the main workforce plan.

Figure 50:
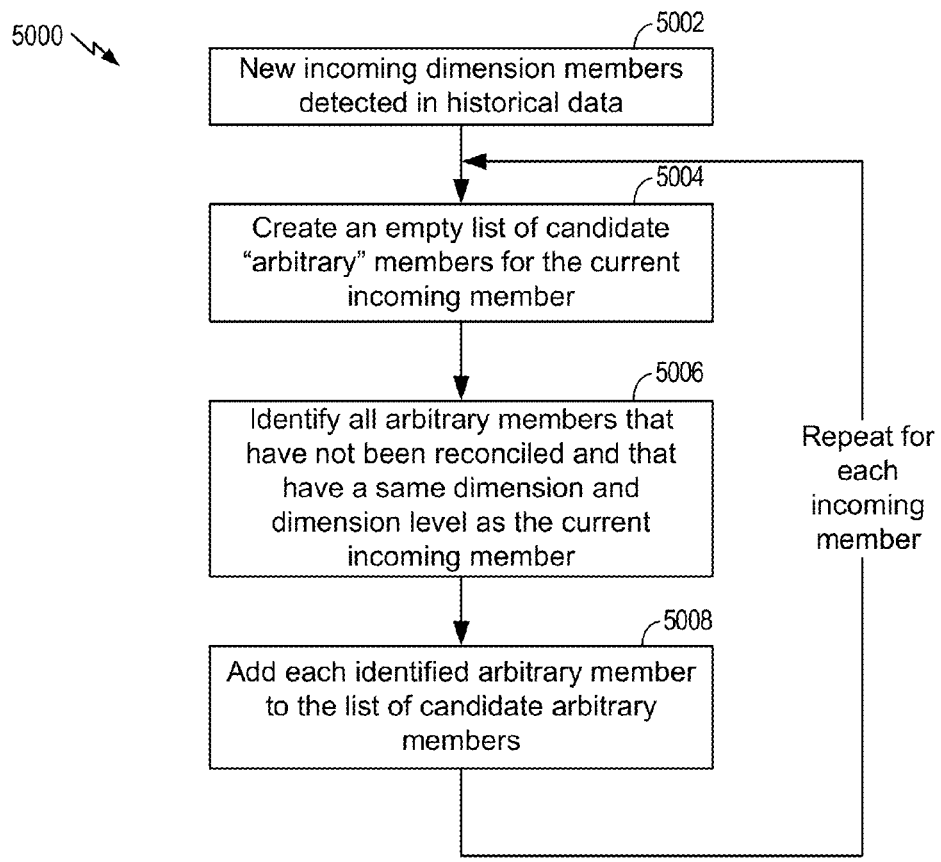
FIG. 50 illustrates a particular embodiment of a method that may be performed in conjunction with operation of a workforce planning application.

As explained above, the WFP engine 4330 may further support reconciling historical data received from the WFA engine 4340 with arbitrary dimension members that have been added to the workforce plan 4328. Referring to FIG. 50, a method 5000 that may be performed by an WFP engine, such as the WFP engine 4330, to reconcile new dimension members detected in historical data with arbitrary dimension members that have been added to workforce plan is shown.

The method 5000 includes detecting incoming new dimension members in historical data received from a WFA, at 5002. For example, the WFP engine 4330 may detect that "Kochi" is a new dimension member in the actual data 4342 received from the WFA engine 4340. The method 5000 further includes creating an empty list of candidate arbitrary members for an incoming dimension member, at 5004. The method 5000 further includes identifying all arbitrary members that have not been reconciled and that have a same dimension and dimension level as the current incoming member, at 5006, and adding each identified arbitrary member to the list of candidate arbitrary members, at 5008. For example, the WFP engine 4330 may identify that the "Bangalore" arbitrary dimension member has the same dimension/dimension level (e.g., Location: City) as the incoming "Kochi" dimension member, and that "Bangalore" is thus a candidate match for "Kochi." In response, "Bangalore" may be added to the list of candidate matches for "Kochi."

Figure 51:
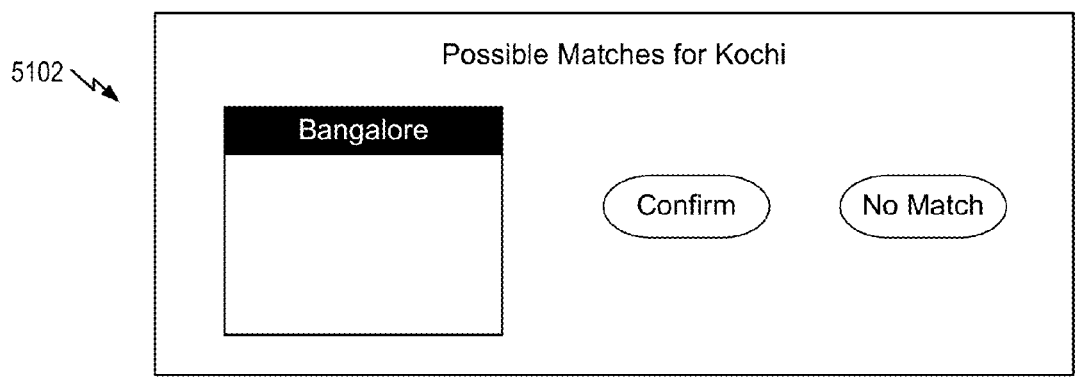
FIG. 51 illustrates another example of a GUI that may be displayed in conjunction with operation of a workforce planning application.

Referring to FIG. 51, a confirmation GUI 5102 is shown that may be used to receive input confirming that a candidate member in the list populated using the method 5000 is a match. The confirmation GUI 5102 may correspond to the match prompt 4319, as described above with reference to FIG. 43. As shown in FIG. 51, the confirmation GUI 5102 displays "Bangalore" as a potential match for "Kochi." A user, such as the first user 4314, may interact with the confirmation GUI 5102 via a user interface device, such as the first user interface device 4311. For example, the user 4314 may input the confirmation input 4315 confirming that the Bangalore arbitrary dimension member matches the Kochi dimension member (i.e., the company ended up opening an office in Kochi instead of in Bangalore.

In response to the confirmation input 4315, the WFP engine 4330 may map the Kochi dimension member to the Bangalore arbitrary dimension member for all plans in the plan group of the workforce plan 4328, as described above. For example, as shown in FIG. 52, a reconciled workforce plan GUI 5202 shows that the label "Bangalore" has been replaced with "Kochi," and historical data for "Kochi" has been added for January 2014.

Referring to FIG. 53, a reconciled sub-plan GUI 5302 is shown. The reconciled sub-plan GUI 5302 may correspond to the updated sub-plan GUI 4812. Although not shown, "New India Ops" has been reconciled with "Operations." Therefore, the actual headcount of 48 Operations employees in Kochi (as determined in January 2014) has been added to the sub-plan.

In accordance with various embodiments of the present disclosure, the methods, functions, and modules described herein may be implemented by software programs executable by a computer system. Further, in exemplary embodiments, implementations can include distributed processing, component/object distributed processing, and parallel processing. Alternatively, virtual computer system processing can be used to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-53. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in one or more computer-readable or a processor-readable devices, such as a centralized or distributed database, and/or associated caches and servers. The terms "computer-readable device" and "processor-readable device" also include device(s) capable of storing instructions for execution by a processor or causing a computer system to perform any one or more of the methods or operations disclosed herein. Examples of such devices include, but are not limited to, random access memory (RAM), flash memory, read-only memory (ROM), programmable read-only memory (PROM), erasable programmable read-only memory (EPROM), electrically erasable programmable read-only memory (EEPROM), register-based memory, solid-state memory, a hard disk, a removable disk, a disc-based memory (e.g., compact disc read-only memory (CD-ROM)), or any other form of storage device. A computer-readable or processor-readable device is not a signal.

In a particular embodiment, an apparatus includes first means for storing a set of data values, a first data value in the set of data values corresponding to at least a first dimension member of a dimension of a multidimensional dataset, the dimension member having a dimension level in a hierarchy of the dimension. For example, the first means for storing may include a memory associated with the workforce analytics engine 4340, such as a random access memory (RAM), a disk-based memory, a solid state memory, a register file, a network-attached storage (NAS), another memory, a component of the storage 4050, the client data 4333, 4316, or 4326, or any combination thereof, configured to store actual/historical data associated with an enterprise, such as headcount values, cost metrics, etc. The multidimensional dataset may be a workforce plan, such as the workforce plan 4328.

The apparatus may also include means for processing the multidimensional dataset to identify a second dimension member that is included in the multidimensional dataset, the second dimension member identified based on the second dimension member being included in the same dimension and having the same dimension level as the first dimension member. The second dimension member is identified in response to the first dimension member being excluded from the multidimensional dataset. For example, the means for processing may include processing logic, a processor, a hardware comparator, a field-programmable gate array (FPGA) device, an integrated circuit, or another device that is configured to determine whether two dimension members are in the same dimension and are at the same dimension level in a dimensional hierarchy for the dimension. In a particular embodiment, the means for processing is a part of the WFP engine 4330. For example, the means for processing may include processing logic corresponding to one or more components of the server framework 4030, including but not limited to one or more of the model-based forecaster 4040, the controller layer 4031, the service layer 4032, or the data models 4033. In an illustrative embodiment, the means for processing corresponds to hardware, software, or a combination thereof configured to execute an algorithm, such as one or more of the methods 4600 or 5000 or portion(s) thereof.

The apparatus may include second means for storing mapping data to link the first dimension member to the second dimension member. In a particular embodiment, the second means for storing includes a memory associated with a workforce planning application. Alternatively, or in addition, the second means for storing may include a RAM, a disk-based memory, a solid state memory, a register file, a NAS, another memory or data structure stored in the memory (e.g., a data structure associated with a plan group), a component of the storage 4050, or the client data 4333, 4316, or 4326, any combination thereof, configured to store mappings corresponding to reconciliation between arbitrary and actual dimension members.

The apparatus may include means for automatically updating the multidimensional dataset based at least in part on the mapping data. In a particular embodiment, the means for automatically updating is a part of the WFP engine 4330. For example, the means for automatically updating may include processing logic corresponding to one or more components of the server framework 4030, including but not limited to one or more of the model-based forecaster 4040, the controller layer 4031, the service layer 4032, or the data models 4033. In an illustrative embodiment, the means for processing corresponds to hardware, software, or a combination thereof configured to execute operations of a method, such as one or more of the methods 4600 or 5000, or portion(s) thereof.

The apparatus may further include means for generating a prompt for confirmation that the second dimension member is a match for the first dimension member. In a particular embodiment, the means for generating a prompt is a part of the WFP engine 4330. For example, the means for generating a prompt may include processing logic corresponding to one or more components of the server framework 4030, including but not limited to one or more of the model-based forecaster 4040, the controller layer 4031, the service layer 4032, or the data models 4033. In an illustrative embodiment, the means for processing corresponds to hardware, software, or a combination thereof configured to execute operations of a method, such as one or more of the methods 4600 or 5000, or portion(s) thereof. The prompt may correspond to the match prompt 4319.

The apparatus may further include means for receiving input responsive to the prompt. For example, the input may confirm that the second dimension member is a match for the first dimension member. In a particular embodiment, the means for receiving input may include a mouse, a keyboard, a touch screen, an input device associated with the client instances 4010, 4312, or 4322, the user interface device 4311 or 4321, another device configured to receive user input, or any combination thereof. The input may correspond to the confirmation input 4315.

In another particular embodiment, a method includes generating, at a processor of a computing device, a workforce plan including forecasted headcount values associated with a plurality of dimension members of a plurality of dimensions. The method further includes receiving, at the processor, input to create a first dimension member of a particular dimension of the plurality of dimensions, where the particular dimension has an associated dimension level in a hierarchy corresponding to the particular dimension. The method further includes storing, by the processor, data associated with the first dimension member to a data store associated with the workforce plan and receiving, at the processor, headcount values associated with a second dimension member that differs from the first dimension member. The method includes generating a graphical user interface (GUI) indicating that the first dimension member is determined to be a potential match for the second dimension member based on the first dimension member being a member of the particular dimension and having the same dimension level as the second dimension member.

In another particular embodiment, a computer readable storage device stores instructions that, when executed by a processor, cause the processor to perform operations. The operations include generating a workforce plan that is based on a dimensional framework, where the dimensional framework identifies dimensions and levels of the dimensions that are included in the workforce plan, where the dimensional framework further identifies hierarchical relationships between the dimension levels included in the workforce plan, and where the workforce plan includes rows associated with dimension members of the dimension levels in the workforce plan, the rows arranged based on the hierarchical relationships between the dimension levels. The operations further include receiving user input to create a sub-plan of the workforce plan and to associate the sub-plan with a sub-planner. The operations further include receiving data from the sub-planner, where the data includes a row of values associated with a particular dimension member that differs from the dimension members included in the workforce plan. The operations further include integrating the data into the workforce plan.

Although one or more of the foregoing embodiments are described in the context of workforce planning, it is to be understood that the techniques of the present disclosure may additionally or alternatively be used in other contexts. As illustrative non-limiting examples, the described systems and methods may be used in conjunction with other types of multidimensional data sets/plans, such as those for territory planning, resource planning, etc.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for workforce resource planning comprising:
 storing a multidimensional dataset in a memory of a computing device, the multidimensional dataset comprising a workforce plan of a business enterprise, the multidimensional dataset comprising a plurality of dimension members associated with a dimension level of a plurality of dimension levels, each of the plurality of dimension members comprising an identifier and a numerical component;

detecting, at a processor, a first dimension member to replace one of the dimension members of the multidimensional dataset, wherein the first dimension member comprises a first identifier and a first numerical component;

iterating, by the processor, through at least a portion of the multidimensional dataset to identify one or more candidate dimension members of the multidimensional dataset to be replaced, wherein the one or more candidate dimension members are identified based on a dimension level of the one or more candidate dimension members matching a dimension level of the first dimension member and based on data associated with the one or more candidate dimension members;

initiating display of a graphical user interface (GUI) to display each of the one or more candidate dimension members and a prompt requesting input of whether to replace the one or more candidate dimension members with the first dimension member;

receiving an input indicating to replace a particular dimension member of the one or more candidate dimension members with the first dimension member, wherein a first cell of a first row of a grid is associated with an identifier of the particular dimension member and a second cell of the first row is associated with a numerical component of the particular dimension member; and after receiving the input indicating to replace the particular dimension member with the first dimension member, storing, in the memory by the processor, mapping data that associates the second cell of the first row associated with the particular dimension member with the numerical component of the first dimension member.

2. The method of claim 1, wherein the identifier of the first dimension member corresponds to a first city of an existing office location, wherein the identifier of the particular dimension member corresponds to a second city of a forecasted office location, and wherein the plurality of dimension levels is hierarchically organized.

3. The method of claim 2, wherein the numerical component of the first dimension member corresponds to a headcount of the office location, wherein the numerical component of the particular dimension member corresponds to a forecasted headcount of the office location, wherein the identifier of the first dimension member corresponds to a first name of the first city, and wherein the identifier of the particular dimension member corresponds to a second name of the second city.

4. The method of claim 2, further comprising storing, in the memory, a set of row keys corresponding to the workforce plan, each key of the set of row keys corresponding to a combination of dimension members of the multidimensional dataset and usable to populate the grid corresponding to the workforce plan with historical data associated with the combination of dimension members.

5. The method of claim 2, further comprising initiating display of a second GUI that includes rows of values associated with the dimension members of the workforce plan, and wherein data of one or more rows associated with the particular dimension member is changed based on the first dimension member, wherein the data comprises forecast, simulated, or arbitrary data, and wherein the particular dimension member is a simulated dimension member.

6. The method of claim 2, wherein the dimension level of the first dimension member corresponds to a location, and wherein the dimension level of the particular dimension member corresponds to the location.

7. The method of claim 6, wherein a first plurality of dimension levels of the first dimension member corresponds to a country, a state within the country, and a city within the state, and wherein a second plurality of dimension levels of the particular dimension member corresponds to the country, the state, and the city.

8. The method of claim 1, wherein the numerical component of each dimension member is stored in a compact cell data structure comprising a first script object notation object, and wherein the identifier of each dimension member is stored in a compact cell structure comprising a second script object notation object.

9. The method of claim 1, further comprising initiating display of a second GUI, the second GUI displaying a first identifier corresponding to the first dimension member, a first set of numbers corresponding to the numerical component of the first dimension member, and a second set of numbers corresponding to a numerical component of the particular dimension member, the first identifier updating a second identifier of the second GUI, the second identifier corresponding to the particular dimension member.

10. An apparatus for workforce resource planning comprising:

a memory configured to store a multidimensional dataset, the multidimensional dataset comprising a workforce plan of a business enterprise, wherein the multidimensional dataset comprises a plurality of dimension members associated with a dimension level of a plurality of dimension levels, each of the plurality of dimension members comprising an identifier and a numerical component; and a processor configured to:
detect, at a processor, a first dimension member to replace one of the dimension members of the multidimensional dataset, wherein the first dimension member comprises a first identifier and a first numerical component;

iterate, by the processor, through at least a portion of the multidimensional dataset to identify a one or more candidate dimension members of the plurality of dimension members to be replaced, wherein the one or more candidate dimension members are identified based on a dimension level of the one or more candidate dimension members matching a dimension level of the first dimension member and based on data associated with the one or more candidate dimension members;

initiate display of a graphical user interface (GUI) to display each of the one or more candidate dimension members and a prompt requesting input of whether to replace the one or more candidate dimension members with the first dimension member;

receive the input indicating to replace a particular dimension member of the one or more candidate dimension members with the first dimension member, wherein a first cell of a first row of a grid is associated with an identifier of the particular dimension member and a second cell of the first row is associated with the numerical component of the particular dimension member; and store, in the memory, mapping data that associates the second cell of the first row associated with the particular dimension member with the numerical component of the first dimension member.

11. The apparatus of claim 10, wherein the memory comprises a base hypercube that is configured to store the plurality of dimension levels and the plurality of dimension members, and wherein the plurality of dimension levels is hierarchically organized.

12. The apparatus of claim 11, wherein the base hypercube comprises an N-dimensional online analytic processing (OLAP) cube.

13. The apparatus of claim 12, wherein the memory comprises a first cache configured to store a plurality of workforce plan models, a second cache configured to store forecasted data, and a database.

14. A computer readable storage device storing instructions that, when executed by a processor, cause the processor to perform operations including:
 storing a multidimensional dataset in a memory of a computing device, the multidimensional dataset comprising a workforce plan of a business enterprise, wherein the multidimensional dataset comprises a plurality of dimension members associated with a dimension level of a plurality of dimension levels, each of the plurality of dimension members comprising an identifier and a numerical component;
 detecting, at a processor, a first dimension member to replace one of the dimension members of the plurality of dimension members, wherein the first dimension member comprises a first identifier and a first numerical component;
 iterating, by the processor, through at least a portion of the multidimensional dataset to identify one or more candidate dimension members of the plurality of dimension members to be replaced, wherein the one or more candidate dimension members are identified based on a dimension level of the one or more candidate dimension members matching a dimension level of the first dimension member and based on data associated with the one or more candidate dimension members;
 initiating display of a graphical user interface (GUI) to display each of the one or more candidate dimension members and a prompt requesting input of whether to replace the one or more candidate dimension members with the first dimension member;
 receiving an input indicating to replace a particular dimension member of the one or more candidate dimension members with the first dimension member, wherein a first cell of a first row of a grid is associated with an identifier of the particular dimension member and a second cell of the first row is associated with a numerical component of the particular dimension member; and
 storing, in the memory by the processor, mapping data that associates the second cell of the first row of the particular dimension member with the numerical component of the first dimension member.

15. The computer readable storage device of claim 14, wherein the operations further comprise, in response to receiving the input:
 storing an indication that the first dimension member matches the one or more candidate dimension members; and
 replacing at least one value of a row of a second GUI with a corresponding value associated with the first dimension member.

16. The computer readable storage device of claim 14, wherein the operations further comprise, after storing the mapping data, updating the GUI to reflect an association between the first dimension member and the numerical component of the particular dimension member.

17. The method of claim 1, wherein the multidimensional dataset includes a plurality of multidimensional data subsets, wherein at least one multidimensional data subset of the plurality of multidimensional data subsets comprises dimension members, and wherein storing mapping data that associates the numerical component of the first dimension member of the multidimensional dataset and the numerical component of the particular dimension member of the multidimensional dataset further comprises storing second mapping data that associates a second identifier of a third dimension member of the at least one multidimensional data subset and a second numerical component of a fourth dimension member of the at least one multidimensional data subset.

18. The method of claim 17, wherein the at least one multidimensional data subset of the plurality of multidimensional data subsets corresponds to a workforce sub-plan of the business enterprise, wherein the first dimension member corresponds to a first city of an existing office location, wherein the particular dimension member corresponds to a second city of a forecasted office location, wherein the third dimension member corresponds to a product line associated with the first city, wherein the fourth dimension member corresponds to the product line, wherein the second identifier corresponds to a name of the first city, and wherein the second numerical component corresponds to data associated with the product line.

19. The method of claim 1, wherein the GUI is displayed at a first computing device associated with a first user, and wherein security data associated with the first dimension member indicates that the first computing device is authorized to display the GUI.

20. The method of claim 19, further comprising sending a portion of the multidimensional dataset to a second computing device associated with a second user, and wherein the portion of the multidimensional dataset comprises a subplan of the workforce plan.

* * * * *